(12) United States Patent
Hunt et al.

(10) Patent No.: US 12,488,388 B2
(45) Date of Patent: Dec. 2, 2025

(54) INTELLIGENTLY DETERMINING TERMS OF A CONDITIONAL FINANCE OFFER

(71) Applicant: Block, Inc., San Francisco, CA (US)

(72) Inventors: Taylor Hunt, San Francisco, CA (US); Xingjie Liu, San Francisco, CA (US)

(73) Assignee: Block, Inc., Oakland, CA (US)

( * ) Notice: Subject to any disclaimer, the term of this patent is extended or adjusted under 35 U.S.C. 154(b) by 0 days.

(21) Appl. No.: 17/972,684

(22) Filed: Oct. 25, 2022

(65) Prior Publication Data

US 2023/0063206 A1 Mar. 2, 2023

Related U.S. Application Data

(63) Continuation of application No. 16/405,873, filed on May 7, 2019, now abandoned.

(51) Int. Cl.
*G06Q 40/03* (2023.01)
*G06Q 20/20* (2012.01)
(Continued)

(52) U.S. Cl.
CPC ............ *G06Q 40/03* (2023.01); *G06Q 20/20* (2013.01); *G06Q 20/24* (2013.01); *G06Q 20/40* (2013.01)

(58) Field of Classification Search
CPC ...... G06Q 40/03; G06Q 20/24; G06Q 20/405; G06Q 20/20; G06Q 20/40; G06Q 30/0207; G06Q 20/102; G06Q 20/3267; G06Q 20/3823; G06Q 20/4012; G06Q 30/0609; G06Q 30/0611; G06Q 40/12;
(Continued)

(56) References Cited

U.S. PATENT DOCUMENTS

| 8,504,438 B2 | 8/2013 | Bennett et al. |
| 9,251,538 B1 * | 2/2016 | Shakkarwar ............ H04L 67/02 |

(Continued)

FOREIGN PATENT DOCUMENTS

WO 2020/226796 A1 11/2020

OTHER PUBLICATIONS

Advisory Action mailed Jun. 17, 2021, for U.S. Appl. No. 16/405,873, of Taylor H. et al., filed May 7, 2019.
(Continued)

*Primary Examiner* — Avia Salman
(74) *Attorney, Agent, or Firm* — Polsinelli PC

(57) ABSTRACT

Some examples include providing an application for installation on a user device of a user of a payment service, and receiving transaction data associated with transactions of the user. A request to finance a transaction for the user is received via a user interface of the application. Based on the received transaction data, terms for financing the transaction are determined, with one term including a down payment to be satisfied prior to the user receiving the financing. The financed funds are accessible via a payment instrument that is initially associated with a locked state. After the down payment has been satisfied, the payment instrument is unlocked and becomes usable in the unlocked state. A payment request associated with the transaction includes payment data associated with the payment instrument. Based on receiving the payment request, the financing is issued and a repayment schedule is generated based on the terms.

17 Claims, 16 Drawing Sheets

(51) Int. Cl.
*G06Q 20/24* (2012.01)
*G06Q 20/40* (2012.01)

(58) Field of Classification Search
CPC .... G06Q 20/065; G06Q 20/10; G06Q 20/206;
G06Q 20/227; G06Q 20/229; G06Q
20/348; G06Q 20/351; G06Q 20/3552;
G06Q 20/401; G06Q 20/403; G06Q
40/02; G06Q 20/322; G06Q 20/326;
G06Q 20/36; G06Q 30/06; G06Q
30/0641; G07F 7/0886; G07F 7/0893;
G07F 7/1025; G07F 7/1091; G07F 7/08;
G07F 7/1008; G06N 20/00; G06F 3/048;
G06F 8/65; G06F 9/44568; G06F 9/542;
G06F 9/543; H04L 67/10; H04L 67/306;
H04L 67/34; H04M 1/72406; H04M
1/72412
USPC .......................................................... 705/16
See application file for complete search history.

(56) References Cited

U.S. PATENT DOCUMENTS

| | | | |
|---|---|---|---|
| 9,454,753 | B2 | 9/2016 | Wohied et al. |
| 9,501,791 | B2 | 11/2016 | Denny |
| 9,824,394 | B1* | 11/2017 | Boates .................. G06Q 20/405 |
| 9,836,739 | B1 | 12/2017 | Borovsky et al. |
| 2003/0041012 | A1* | 2/2003 | Grey ....................... G06Q 30/08 |
| | | | 705/37 |
| 2010/0010930 | A1 | 1/2010 | Allen |
| 2010/0082481 | A1* | 4/2010 | Lin .................... G06Q 20/3278 |
| | | | 705/41 |
| 2011/0112946 | A1 | 5/2011 | Porter |
| 2011/0191162 | A1* | 8/2011 | Blackhurst ......... G06Q 30/0239 |
| | | | 705/14.39 |
| 2013/0080327 | A1 | 3/2013 | Baldrick et al. |
| 2014/0019352 | A1 | 1/2014 | Shrivastava |
| 2014/0129366 | A1 | 5/2014 | Mudhar |
| 2014/0172577 | A1 | 6/2014 | Rephlo |
| 2014/0279525 | A1 | 9/2014 | Mohsenzadeh |
| 2015/0332237 | A1 | 11/2015 | Aaron et al. |
| 2016/0171555 | A1* | 6/2016 | Buerger ................. G06Q 30/02 |
| | | | 705/14.66 |
| 2016/0314529 | A1 | 10/2016 | Dolle et al. |
| 2017/0011399 | A1* | 1/2017 | Steinlicht ........... G06Q 20/3263 |
| 2018/0232762 | A1 | 8/2018 | Greene et al. |
| 2020/0357051 | A1 | 11/2020 | Hunt et al. |
| 2020/0357052 | A1 | 11/2020 | Hunt et al. |

OTHER PUBLICATIONS

Advisory Action mailed Nov. 18, 2021, for U.S. Appl. No. 16/405,916, of Taylor H. et al., filed May 7, 2019.
Advisory Action mailed Oct. 4, 2022, for U.S. Appl. No. 16/405,873, of Taylor H. et al., filed May 7, 2019.
Final Office Action mailed Aug. 3, 2021, for U.S. Appl. No. 16/405,916, of Taylor H. et al., filed May 7, 2019.
Final Office Action mailed Feb. 22, 2021, for U.S. Appl. No. 16/405,873, of Taylor H. et al., filed May 7, 2019.
Final Office Action mailed Jan. 23, 2020, for U.S. Appl. No. 16/405,873, of Taylor Hunt et al., filed May 7, 2019.
Final Office Action mailed May 27, 2022, for U.S. Appl. No. 16/405,873, of Taylor H. et al., filed May 7, 2019.
International Search Report and Written Opinion for International Application No. PCT/US2020/026633, mailed Jun. 12, 2020.
Non-Final Office Action mailed Aug. 21, 2020, for U.S. Appl. No. 16/405,873, of Taylor H. et al., filed May 7, 2019.
Non-Final Office Action mailed Dec. 17, 2021, for U.S. Appl. No. 16/405,916, of Taylor H. et al., filed May 7, 2019.
Non-Final Office Action mailed Feb. 19, 2021, for U.S. Appl. No. 16/405,916, of Taylor H. et al., filed May 7, 2019.
Non-Final Office Action mailed Jul. 31, 2019, for U.S. Appl. No. 16/405,873, of Taylor Hunt et al., filed May 7, 2019.
Non-Final Office Action mailed Oct. 4, 2021, for U.S. Appl. No. 16/405,873, of Taylor H. et al., filed May 7, 2019.

* cited by examiner

700

RECEIVE A PAYMENT FOR REPAYING AT LEAST A PORTION OF THE LOAN, WHEREIN THE PAYMENT IS ASSOCIATED WITH THE PAYMENT INFORMATION PROVIDED FOR SATISFYING THE TERM OF THE CONDITIONAL FINANCE OFFER
702

REDUCE A BALANCE OF THE LOAN BASED AT LEAST IN PART ON THE PAYMENT
704

INTELLIGENTLY DETERMINING TERMS OF A CONDITIONAL FINANCE OFFER

CROSS-REFERENCE TO RELATED APPLICATION

This application is a continuation of, and claims priority to, U.S. patent application Ser. No. 16/405,873, filed May 7, 2019, and which is incorporated by reference herein.

BACKGROUND

Consumers often require (or opt to use) financing to make purchases. For instance, consumers may utilize personal loans and/or lines of credit to purchase items from merchants. A personal loan enables a consumer to receive a lump sum of money at the time the personal loan is generated, and the consumer is expected to repay the loan amount in fixed installments (e.g., daily, monthly, yearly, etc.) for an agreed upon term. Personal loans are fixed debt, such that consumers cannot borrow more than the loan amount without applying for another loan (e.g., via submission of a new loan application).

BRIEF DESCRIPTION OF THE DRAWINGS

The above and other features of the present disclosure, its nature and various advantages, will be more apparent upon consideration of the following detailed description, taken in conjunction with the accompanying drawings, which are briefly described below.

In the figures, the left-most digit(s) of a reference number identifies the figure in which the reference number first appears. The use of the same reference numbers in different figures indicates similar or identical items or features. The figures are not drawn to scale.

DETAILED DESCRIPTION

Figure 1:
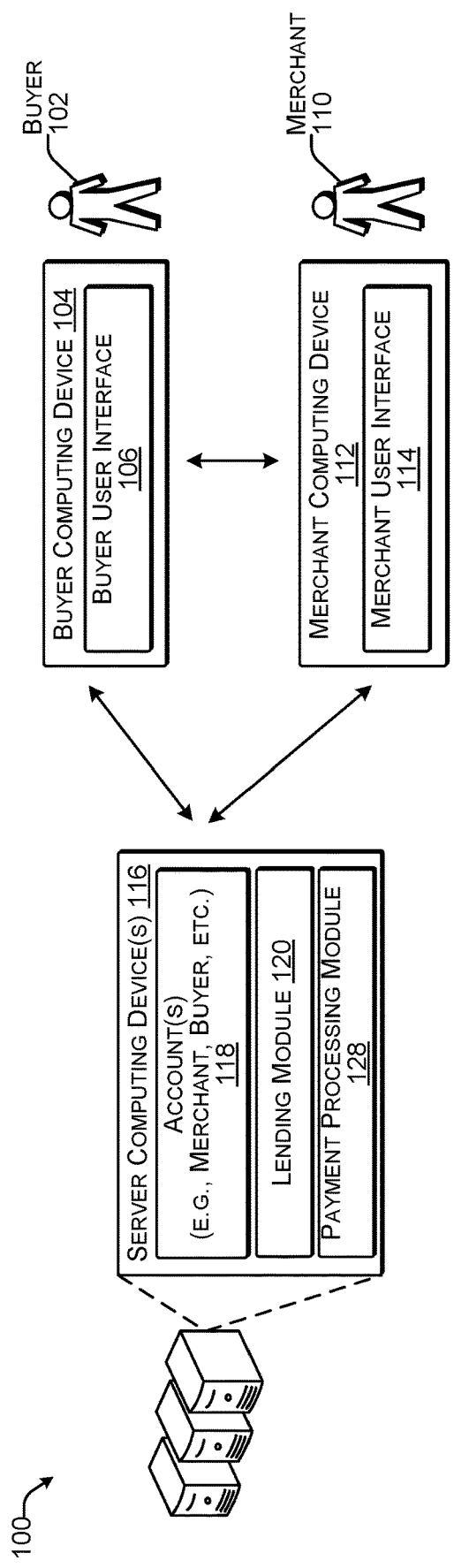
FIG. 1 illustrates an example environment for, among other things, presenting a conditional finance offer to a buyer.
Figure 1:
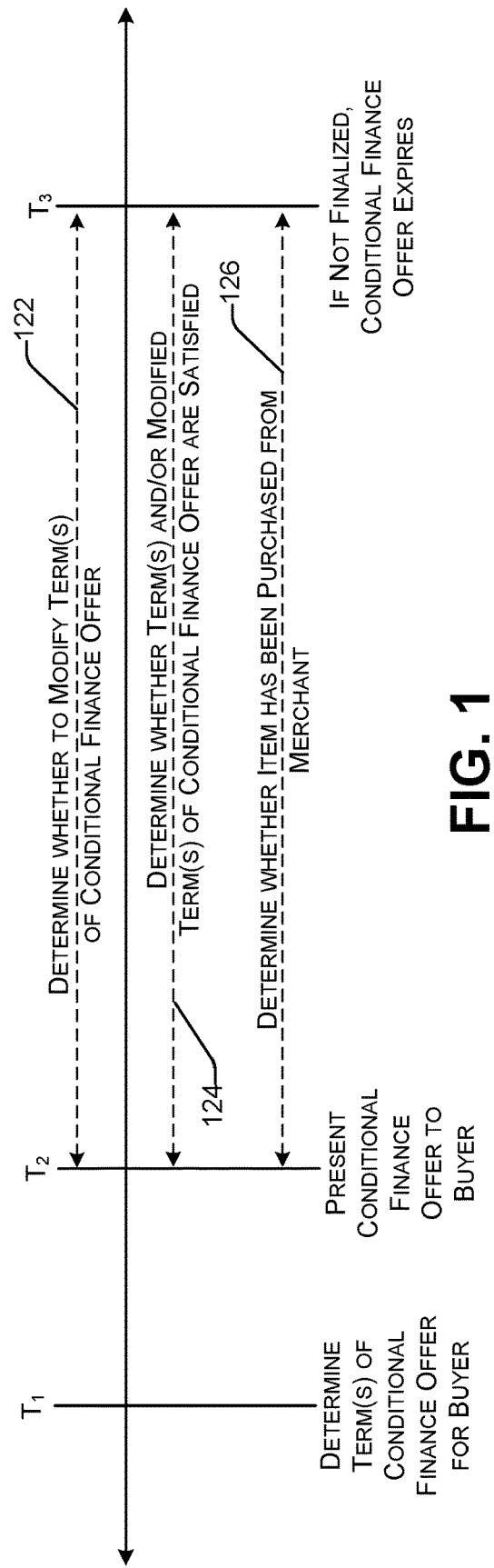

Techniques described herein are directed to managing conditional finance offers and resulting loans. A service provider can offer loans or other types of financing to buyers (or other types of consumers). In some examples, certain buyers can be required to satisfy certain terms before the service provider will issue them loans. For example, a high-risk buyer (e.g., a buyer with little or no credit, a buyer who has not been verified, etc.) can be required to provide a down payment or otherwise offer security before the service provider issues them a loan. In some examples, a buyer can apply for a loan at a point-of-sale (POS) (e.g., the time and/or place where a transaction is completed) such that if they are required to pay a down payment, they can do so at that time (e.g., at the POS). In such examples, the amount of the loan, and thus the amount of the down payment, is easy to ascertain based on the cost of an item and/or the transaction at the POS.

However, in other examples, a buyer can apply for a loan prior to a transaction at the POS. In such examples, the amount of the loan is not as easy to ascertain because the cost of an item and/or the transaction can change between when the buyer applied (and was approved) for the loan and the POS transaction. Therefore, when the buyer is required to submit a down payment prior to the service provider issuing the loan, the amount of the down payment can be difficult to ascertain (because the cost of the item and/or transaction is difficult to ascertain). Similarly, a level of risk associated with the buyer can change between when the buyer applied (and was approved) for the loan and the POS, further making the ability to determine the amount (or even terms) of the down payment challenging. Moreover, if the buyer is required to pay a down payment at the time of approval of the loan application and prior to the time when the loan is used (e.g., at the POS), such funds can be tied up and thus, unavailable to the buyer. In some examples, the buyer may decide not to use the loan, and if the down payment is already paid, the buyer may need to request a refund and so on.

Techniques described herein are directed to managing conditional finance offers and loans resulting from such conditional finance offers. In at least one example, the service provider described above can determine that a buyer is approved for a loan, but such approval is conditional on the satisfaction of one or more terms (e.g., terms of a conditional finance offer). In some examples, the service provider can perform a risk (or other) assessment to determine whether the buyer is required to securitize the financing offer, satisfy one or more terms and if so, to what extent (e.g., an amount of a down payment, a number of verification questions that need to be answered, a number of other users required for verification, and so on). Then, the service provider can present a conditional finance offer to the buyer. The conditional finance offer can be associated with one or more terms that must be satisfied prior to finalizing the finance offer and issuing (or, "generating") the loan. As will be described below, the one or more terms can include, but are not limited to, a down payment term, a verification term, and so on.

In the case of a finance offer being conditional on a down payment, the service provider can prompt the buyer to provide payment information associated with a source of funds, such as a bank account. The buyer can provide the payment information in an effort to satisfy the down payment term of the conditional finance offer. In at least one example, the service provider can receive the payment information and can refrain from sending an authorization request to the bank associated with the bank account (or other relevant entity) until an item is ready to be purchased using funds associated with the conditional finance offer. That is, the service provider can wait until the buyer is ready to use funds available via the conditional finance offer to send an authorization request to the bank (e.g., computing devices associated therewith). If the source of funds is legitimate and has a sufficient amount of funds to pay the down payment, the bank can return an indication that the payment information is authorized for the amount of the down payment and a hold can be placed on the amount of funds equal to the down payment (however no money is moved at that time). In at least one example, the service provider can subsequently send the capture and settlement request, at which time the amount of funds equal to the down payment can be transferred from the bank to the service provider. However, if the authorization request is denied the service provider can refrain from generating the loan. That is, if the authorization request is denied, the service provider can cancel the conditional finance offer.

In an alternative example, when the buyer provides the payment information (or, shortly thereafter), the service provider can send an authorization request to the bank associated with the bank account (e.g., computing devices associated therewith). If the source of funds is legitimate and has a sufficient amount of funds to pay the down payment, the bank can return an indication that the payment information is authorized for the amount of the down payment and a hold can be placed on the amount of funds equal to the down payment (however no money is moved at that time). In at least one example, the service provider can refrain from sending a capture and settlement request to capture the funds at that time. That is, the service provider can wait until an item is purchased (or ready to be purchased) using funds available via the conditional finance offer before sending the capture and settlement request, at which time the amount of funds equal to the down payment can be transferred from the bank to the service provider. In at least one example, however, the authorization of the payment information can expire prior to when the item is purchased (and the capture and settlement request is sent). In such an example, the service provider may send additional authorization requests until the item is purchased or the conditional finance offer expires.

In some examples, a term of a conditional finance offer can be modified after the original term is determined (e.g., upon determining that a buyer is approved for a loan). For instance, in at least one example, the service provider can determine whether to modify the original term at the time the buyer provides payment information for satisfying a down payment term of the conditional finance offer (e.g., in association with a request to activate a payment instrument associated with the conditional finance offer). In additional or alternative examples, the service provider can determine whether to modify the original term at the POS (e.g., when the buyer desires to use funds available via the conditional finance offer to purchase item(s) from a merchant). In at least one example, the service provider can receive one or more signals after the original term is determined. Such signals can include information about the buyer, information about the merchant, information about the item(s) to which the conditional finance offer corresponds, an amount of time that has lapsed from when the conditional finance offer was presented to the buyer, etc. The service provider can use such signals to determine whether to modify the original term. In the case where the term is a down payment term, such a modification can amount to an increase of the amount of the down payment, a decrease of the amount of the down payment, the omission of the down payment term, a change to the means for securing the offer, and so on.

When the buyer decides to purchase item(s) from a merchant to which the conditional finance offer pertains, the buyer can present information associated with the conditional finance offer to the merchant selling such item(s). In some examples, such information can be a number or string of numbers, e.g., similar to a debit/credit card number, associated with a payment instrument linked to the conditional finance offer. Responsive to receiving, from the merchant (e.g., a POS device of the merchant), the information associated with the conditional finance offer, the service provider can generate the loan so long as the term(s) of the conditional finance offer are satisfied. That is, the service provider can disperse the funds to the buyer (or the merchant on behalf of the buyer) and the loan can enter repayment (e.g., loan servicing). In at least one example, the service provider can make an association between the buyer, the merchant, and the loan in a database or other data structure associated with the service provider.

The service provider can use the loan to satisfy at least a portion of the cost of the transaction between the buyer and the merchant. In at least one example, the loan can have a balance that is based at least in part on the cost of the transaction and/or item(s) associated with the transaction (e.g., in view of the amount for which the buyer was originally approved). The balance can include processing fees and/or interest. However, the balance can reflect the down payment provided. That is, in at least one example, the balance of the loan can amount to the total cost of the transaction and/or the amount for which the buyer was originally approved (e.g., whichever is less), loan processing fees, and/or interest, less the amount of the down payment. In at least one example, the buyer can repay the loan in one or more payments (e.g., installments). In some examples, the buyer can repay the loan using the same source of funds provided for satisfying the down payment term of the conditional offer. That is, in some examples, the same source of funds can be used for multiple events of a finance offer and subsequently issued loan. In at least one example, the source of funds can be a stored balance associated with an account of the buyer. In additional or alternative examples, at least a portion of the loan can be repaid with another source of funds. In some examples, such payments can be made automatically, without requiring further input from the buyer.

While techniques described herein are directed to "loans," techniques described herein can be applicable to any type of financing product, such as cash advances, loans, credit, and so forth.

Techniques described herein are directed to managing conditional finance offers via a distributed system of merchant computing devices and/or buyer computing devices that are in communication with one or more server computing devices of a service provider. That is, techniques described herein are directed to a specific implementation—or, a practical application—of utilizing a distributed system of merchant computing devices and/or buyer computing devices that are in communication with one or more server computing devices of a service provider to generate conditional finance offers (e.g., on a per-item basis based on intelligent underwriting, as described below) and manage such conditional finance offers, as described below. As described above, existing technologies associated with loan servicing are deficient in that for buyers who apply for a loan and are subsequently presented with a conditional finance offer prior to using the loan at the POS, funds are unnecessarily withheld from the buyers and the service provider can be exposed to increased risk (e.g., of a down payment being inadequate for a particular purchase). Furthermore, some efforts to achieve solutions to the aforementioned problem require repeated submission of authorization requests for an amount of a down payment until a loan is generated. Techniques described herein, however, can delay, or extend, the authorization and capture/settlement of funds for a down payment until the conditional finance offer is called upon for use in a transaction, thereby providing various computational efficiencies (by eliminating the need to send an authorization request periodically until the loan is generated). Furthermore, by performing computations to determine down payments at the time finance offers are generated and/or presented to buyers (e.g., via a pre-analysis of sorts), techniques described herein enable faster determinations for issuing loans at the POS. That is, techniques described herein offer improvements to financing and/or loan generation technology.

The unconventional configuration of the distributed system described herein enables a remotely-located service provider to present a conditional finance offer to a buyer for the buyer to use for a transaction with a particular merchant. The term(s) of the conditional finance offer and/or the term(s) of the loan issued as a result of finalizing the finance offer can be particular to the buyer (and, in some examples based on the particular merchant and/or the transaction). That is, techniques described herein enable server computing device(s) that are remotely-located from end-users to customize finance offers for individual buyers. Accordingly, techniques described herein are directed to a specific, discrete implementation of utilizing a distributed system of merchant computing devices and/or buyer computing devices that are in communication with one or more server computing devices of a service provider to generate conditional finance offers and, upon satisfaction of term(s) associated with such conditional finance offers, generate loans. Such techniques not only streamline lending, but techniques described herein provide a particular arrangement of elements that offer technical improvement over conventional techniques for generating conditional finance offers and, upon satisfaction of term(s) associated with such conditional finance offers, generating loans (e.g., which are often limited to a one-size-fits-all lending scheme for loan generation). As described herein, artificial intelligence, machine learning, and the like can be used to dynamically modify terms associated with conditional finance offers thereby adding intelligence to an otherwise one-size-fits-all lending scheme for loan generation. Thus, techniques described herein improve an existing technological process.

Furthermore, the distributed system described herein enables the use of merchant data associated with multiple, different merchants and buyer data associated with multiple, different buyers to be aggregated and analyzed to generate conditional finance offers with terms that are customized for particular buyers and/or groups of buyers. That is, techniques described herein enable the remotely-located server computing device(s) associated with a service provider to determine financing for eligible buyers for making purchases at certain select merchants based at least partially on information related to past transactions conducted by a plurality of different merchants that use the service provider (e.g., for payment processing services). For instance, techniques described herein are directed to intelligent underwriting of buyer financing based on machine learning related to buyer purchase behavior and merchant POS information. Such intelligent underwriting permits, in at least one example, the distributed system described to enable buyers to easily obtain financing in a real-time manner (e.g., without working through paperwork and lengthy loan applications) for an item to be purchased in-store while the buyer is at a POS location (e.g., a brick-and-mortar store) of a merchant and/or in association with an ecommerce transaction. Additionally or alternatively, as described herein, techniques described herein enable buyers to be approved for financing prior to, or after, a transaction has been completed. Furthermore, as described herein, the distributed system enables the service provider to determine custom financing terms and/or conditional finance offer terms for buyers based on past purchase activity and/or past financing activity, or such activities of similar buyers/merchants. That is, the distributed system described herein is directed to a practical application of intelligently generating conditional finance offers and subsequently, if the term(s) of the conditional finance offers are satisfied, generating loans for buyers to use with different merchants.

As described below, various graphical user interfaces (GUIs) can be presented to facilitate techniques described herein. In some examples, various user interface features, some that are particular to buyers where down payments are desired, can improve user interaction with loan application processes. That is, as described below, some of the techniques described herein are directed to user interface features presented via GUIs to improve interaction between buyers and computing devices, thereby streamlining the generation of finance offers, the presentation of the finance offers, and/or the generation of the loans resulting from the finance offers. Furthermore, such features are changed dynamically based on the profile of the user involved in the conditional financing offer. As such, techniques described herein are directed to improvements to computing systems. Additional technical improvements are described throughout with reference to FIGS. 1-16.

FIG. 1 illustrates an example environment 100 for, among other things, presenting a conditional finance offer to a buyer.

In environment 100, a buyer 102 interacts with a buyer computing device 104, for example, via a buyer user interface 106. A buyer 102 (which can also be referred to as a consumer, a customer, etc.) can be any entity that interacts with merchants to acquire items (e.g., goods, services, etc.) from a merchant. A merchant 110 (which can also be referred to as a seller, etc.) can be any entity that offers items (e.g., goods, services, etc.) for acquisition (e.g., sale, lease, borrow, free, etc.). Merchants can have physical stores (e.g., brick-and-mortar stores, mobile stores, etc.) and/or online stores (e.g., ecommerce websites). In some examples, merchants can have one or more agents (e.g., employees, independent contractors, etc.) that work for, or on behalf of, the merchants. While a single buyer 102 and single merchant 110 are illustrated in FIG. 1, in practice, multiple buyers and/or multiple merchants are present in such an environment. In some examples, the merchant 110 and buyer 102 can also be users on a peer-to-peer (P2P) platform or a peer-to-business (P2B) platform.

In at least one example, the merchant 110 can interact with a merchant computing device 112 via a merchant user interface 114, to among other things, perform transactions, such as POS transactions. In at least one example, the merchant user interface 114 can be presented via a web browser, or the like, via a display of the merchant computing device 112. In at least one example, the merchant user interface 114 can be presented via an application, such as a mobile application or desktop application, which is provided by a service provider, or which can be an otherwise dedicated application. The merchant user interface 114 can enable the merchant 110 to participate in POS transactions with buyers, such as the buyer 102, and/or to receive other services from the service provider. As described in more detail below, the merchant user interface 114 can enable the merchant 110 to obtain payment information to satisfy a cost of a transaction with a buyer, such as the buyer 102. The merchant computing device 112 can transmit the payment information to a service provider (e.g., server computing device(s) associated therewith) that provides payment processing services. The service provider, which can be an intermediary between the merchant computing device 112 and one or more card networks, issuers, acquirers, and the like, can transmit the payment information to the one or more card networks, issuers, acquirers, and the like (e.g., computing device(s) associated therewith) to request and/or receive authorization for the transaction.

As described above, in an example, the buyer 102 can interact with the buyer computing device 104 via the buyer user interface 106 to, among other things, request a loan to purchase at least one item from a merchant, such as the merchant 110. In at least one example, the buyer user interface 106 can be presented via a web browser, or the like, via a display of the buyer computing device 104. In at least one example, the buyer user interface 106 can be presented via an application, such as a mobile application or desktop application, which is provided by a service provider, or which can be an otherwise dedicated application. The buyer user interface 106 can enable the buyer 102 to request a loan and/or perform one or more inputs to facilitate techniques described herein.

In at least one example, the buyer computing device 104 and/or the merchant computing device 112 can exchange data with one or more server computing devices 116. The server computing device(s) 116 can be associated with a service provider that provides, among other services, lending services, payment processing services, etc. as described herein. For the purpose of this discussion, actions attributed to the service provider can be performed by functional components of the server computing device(s) 116. Additional details associated with such functional components are described below.

In at least one example, the server computing device(s) 116 can store account(s) 118 associated with users that subscribe to services of the service provider or otherwise access service(s) of the service provider. The accounts 118, which can additionally or alternatively be referred to as "profiles," can be stored in a data structure (e.g., database, data store, etc.) that is stored on the server computing device(s) 116 and/or stored remotely from the server computing device(s) 116 and accessible to the server computing device(s) 116 (e.g., via cloud storage). The accounts 118 can store information associated with merchant(s) (e.g., the merchant 110), buyer(s) (e.g., the buyer 102), etc. For instance, the accounts 118 can store data associated with buyer purchase behavior and merchant POS information, which can be used for executing techniques described herein. Additional details associated with the accounts 118 are described below.

In some examples, the buyer 102 can desire to purchase item(s) from the merchant 110 using a loan. In such examples, the buyer 102 (e.g., via the buyer computing device 104) can send a request for a loan to the server computing device(s) 116. In at least one example, the request can be sent from the buyer user interface 106 (e.g., based on an interaction between the buyer user interface 106 and the buyer 102). The request can indicate particular item(s) (offered for sale by a merchant) for which the buyer 102 is requesting the loan, an amount for which the buyer is requesting to borrow, a merchant for which the buyer 102 is requesting the loan (e.g., a merchant where the buyer 102 intends to use the loan), a combination of the foregoing, etc. As will be described with more detail below, in some examples, the buyer 102 can submit a request for a loan prior to interacting with a merchant (e.g., prior to entering a physical location of a merchant, etc.), during an interaction with a merchant (e.g., while at a physical location of a merchant, during a checkout flow of a transaction (e.g., online or offline), etc.), or after interacting with a merchant (e.g., after a transaction has been processed, etc.).

In at least one example, a lending module 120, which can be a functional component of the server computing device(s) 116, can receive the request and can determine whether the buyer 102 is qualified for a loan and/or terms of the loan. For instance, the lending module 120 can analyze the request in view of the accounts 118 (e.g., of the buyer 102 and/or the relevant merchant 110, buyers similar to the buyer 102, merchants similar to the merchant 110, etc.) and one or more other lending risk signals (e.g., indicative of creditworthiness) to determine whether the buyer 102 qualifies for the loan and/or the terms of the loan. For the purpose of this discussion, "terms of a loan" can include, but are not limited to, an amount of the loan, an interest rate associated with repayment of the loan, a repayment period associated with the loan, a frequency of repayment of the loan, an amount of an installment for repaying the loan, etc. In at least one example, the lending module 120 can utilize machine-trained data models (e.g., data models trained using supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.), statistical models, etc.), statistics, or other processes for determining whether the buyer 102 is qualified for the loan and/or terms of the loan. That is, in some examples, the lending module 120 can determine custom terms for a particular buyer (e.g., buyer 102) based at least in part on buyer purchase behavior (e.g., of the buyer and/or of other, similar buyers) and/or merchant POS information (e.g., of a particular merchant and/or of other similar merchants). In some examples, the lending module 120 can utilize past financing activity of the buyer (e.g., buyer 102) and/or similar buyers for determining whether the buyer 102 is qualified for the loan and/or terms of the loan.

Based at least in part on determining that the buyer 102 is qualified for the loan, and the terms of the loan, the lending module 120 can notify the buyer 102. In at least one example, a buyer 102 can be notified that they are qualified for a loan prior to arriving at a physical location of a merchant or prior to the buyer 102 settling an online transaction. For instance, in such an example, an offer can be made to the buyer 102 in anticipation of the buyer 102 interacting with a merchant, responsive to determining an intent of the buyer 102 to purchase an item, responsive to the buyer 102 adding an item to a virtual cart, responsive to the buyer 102 viewing an item, etc. In at least one example, the lending module 120 can notify the buyer 102 via a notification presented via the buyer user interface 106 (e.g., an in-app notification, a user interface element presented via a GUI, etc.), an email, a text message, a push notification, etc. In some examples, such a notification can be a finance offer for a loan (e.g., and associated terms of the loan) which the buyer 102 can accept and, responsive to the buyer 102 accepting the offer, the lending module 120 can generate the loan, i.e., associate the loan between the merchant 110 and buyer 102 in a database or other data structure. In additional or alternative examples, such a notification can alert the buyer 102 that the buyer 102 is qualified for a loan and the terms of the loan, but the lending module 120 can refrain from generating the loan until one or more terms associated with a finance offer are satisfied. That is, in some examples, a finance offer can be conditioned on the satisfaction of one or more terms.

As described above, in some examples, the lending module 120 can determine that the buyer 102 is qualified for a loan, but only if the buyer 102 satisfies one or more terms. That is, the lending module 120 can determine that the buyer 102 is conditionally approved for a loan. As illustrated in the environment 100, $T_1$ represents a first time at which the lending module 120 determines term(s) of a conditional finance offer for the buyer 102. In at least one example, a conditional finance offer can be associated with one or more terms that must be satisfied before the service provider can finalize the finance offer (and thereby generate a loan). Such terms can include a down payment term (e.g., an amount of funds that the buyer 102 must provide before the service provider can finalize the finance offer), a verification term (e.g., knowledge-based verification using one or more questions, verification via one or more other users associated with the environment 100, etc.), a security deposit, a collateral, and the like.

In at least one example, the lending module 120 can analyze the accounts 118 (e.g., of the buyer 102 and/or the relevant merchant 110, buyers similar to the buyer 102, merchants similar to the merchant 110, etc.) and one or more other lending risk signals (e.g., indicative of creditworthiness) to determine whether the buyer 102 requires a conditional finance offer and if the buyer 102 requires a conditional finance offer, the term(s) associated with the conditional finance offer. In at least one example, the lending module 120 can utilize machine-trained data models, statistics, or other processes for determining whether the buyer 102 requires a conditional finance offer and/or the term(s) of the conditional finance offer. That is, in some examples, the lending module 120 can determine custom terms for a particular buyer (e.g., buyer 102) based at least in part on buyer purchase behavior (e.g., of the buyer and/or of other, similar buyers) and/or merchant POS information (e.g., of a particular merchant and/or of other similar merchants). In some examples, the lending module 120 can utilize past financing activity of the buyer (e.g., buyer 102) and/or similar buyers for determining whether the buyer 102 requires a conditional finance offer and/or the term(s) of the conditional finance offer. Furthermore, in some examples, the lending module 120 can utilize future transaction activity (e.g., item(s) and/or merchant(s) with which the buyer 102 intends to transact with) for determining whether the buyer 102 requires a conditional finance offer and/or the term(s) of the conditional finance offer. In some implementations, the lending module 120 can determine how to secure the finance offer, e.g., using a down payment, collateral, a security deposit, additional data that improves buyer's risk standing, and so on. The lending module 120 can thus determine an amount of a down payment term (if required), a number of verification questions that the buyer 102 is required to answer for identity verification (if required), a number of users that buyer 102 is required to interact with for identity verification (if required), and so on based at least in part on machine-trained data models and so forth.

In at least one example, responsive to determining term(s) of the conditional finance offer for the buyer 102, the lending module 120 can present the conditional finance offer to the buyer 102, as shown at $T_2$. The conditional finance offer can be associated with a period of time after which the conditional finance offer expires. In the environment 100, $T_3$ represents the end of the period of time after which the conditional finance offer expires. That is, in the environment 100, the conditional finance offer is valid between $T_2$ and $T_3$ and if the term(s) of the conditional finance offer are not satisfied by $T_3$, the conditional finance offer will expire.

In at least one example, during the period of time between $T_2$ and $T_3$, the lending module 120 can receive one or more signals, for instance associated with the buyer 102, the merchant 110, a payment instrument of the buyer 102, etc. The one or more signals can include, but are not limited to, a time delay since the conditional finance offer is presented to the buyer 102, a change to a credit score of the buyer 102, modified transaction history of the buyer 102 (e.g., the buyer 102 can buy item(s) from the merchant 110 or other merchants), an addition of a bank account to an account of the buyer 102, a change to inventory of the merchant 110 (e.g., the merchant 110 can sell item(s), thereby reducing their inventory, or acquire new items), a change to a location of the merchant 110 (e.g., the merchant 110 can open a new location or have a mobile business), a change to a cost of an item (e.g., the item price can increase or decrease), and so on. In at least one example, the lending module 120 can determine whether to modify term(s) of the conditional finance offer, as shown by operation 122, based at least in part on the signal(s) received. For instance, if the signal(s) indicate that the buyer 102 has become riskier to the service provider, the lending module 120 can determine to modify the term(s) of the conditional finance offer. As an example, the lending module 120 can increase the amount of a down payment term or require additional verification. Or, if the signal(s) indicate that the buyer 102 has become less risky to the service provider, the lending module 120 can decrease an amount of or eliminate a down payment term or reduce the amount of verification required of the buyer 102.

Furthermore, during the period of time between $T_2$ and $T_3$, the lending module 120 can determine whether term(s) and/or modified term(s) of the conditional finance offer are satisfied, as illustrated at operation 124. In the case where a term of the conditional finance offer is a down payment term, the lending module 120 can determine whether the buyer 102 provided payment information associated with a source of funds for satisfying the down payment term. Or, in the case where a term of the conditional finance offer is a verification term, the lending module 120 can determine whether the buyer 102 has answered one or more verification questions to verify an identity of the buyer 102, thereby satisfying the verification term associated with the conditional finance offer. Further, the lending module 120 can receive an indication that one or more other users associated with the service provider (e.g., other buyers, merchants, etc.) have verified the identity of the buyer 102, thereby satisfying the verification term associated with the conditional finance offer. If the lending module 120 does not determine that the term(s) and/or modified term(s) of the conditional finance offer are satisfied by $T_3$, the conditional finance offer expires. In some examples, the conditional finance offer is canceled (as opposed to being declined).

In at least one example, the lending module 120 can determine whether an item has been purchased (or, is in the process of being purchased), as illustrated by operation 126. In some examples, a buyer 102 is required to purchase an item from the merchant associated with the original request within the period of time between when the conditional finance offer is presented to the buyer 102 (e.g., $T_2$) and when the conditional finance offer expires (e.g., $T_3$). That is, in some examples, purchasing an item can be a term of the conditional finance offer. In at least one example, the server computing device(s) 116 can receive transaction data from POS transactions between merchants and buyers, such as the buyer 102 and the merchant 110, for example via the payment processing module 128. In some examples, the lending module 120 can access the transaction data, or an indication based thereon, to determine whether an item has been purchased from the merchant 110. If an item is purchased from the merchant 110 prior to the time at which the conditional finance offer expires (e.g., $T_3$), the lending module 120 can finalize the finance offer and thereby generate a loan for the buyer 102. In at least one example, an item must be purchased prior to the expiration of the conditional finance offer (e.g., $T_3$) but may not be purchased until term(s) (or modified term(s)) of the conditional finance offer are satisfied.

As described above, if the modified term(s) and/or term(s) of the conditional finance offer are not satisfied by the time the conditional finance offer expires (e.g., $T_3$), the conditional finance offer will expire. However, if the modified term(s) and/or term(s) of the conditional finance offer are satisfied prior to expiration of the conditional finance offer (e.g., $T_3$), the lending module 120 can finalize the finance offer. That is, the lending module 120 can finalize the finance offer and generate a loan. In at least one example, the amount of the loan can be based on the cost of the item purchased by the buyer 102 from the merchant 110. As such, when the buyer 102 purchases the item from the merchant 110, the lending module 120 can generate the loan for an amount of the purchase price of the item unless the amount of the purchase price of the item is more than the amount of the loan for which the buyer 102 is originally approved. That is, the amount of the loan can equal the lesser of either the total cost of the transaction or the amount that the buyer 102 was originally preapproved.

For the purpose of discussion, a loan can be "generated" when the funds are disbursed (e.g., to the buyer 102 or the merchant on the buyer's 102 behalf) and an association is made between the buyer, the merchant, and the loan (e.g., in a database or other data structure). After a loan is generated, the loan enters loan servicing and/or repayment wherein the buyer 102 repays the total amount of the loan, plus agreed-to interest and/or financing fee(s), over time. In at least one example, when the buyer 102 is required to provide a down payment as a term of the conditional finance offer, the balance of the loan can amount to the cost of the item or the total amount for which the buyer 102 was originally approved (e.g., whichever is less), loan processing fees, and/or interest, less the amount of the down payment. In some examples, the buyer 102 can repay the loan via one or more installments. An indication of the loan can be stored in association with an account of the buyer 102 in the accounts 118.

Figure 2:
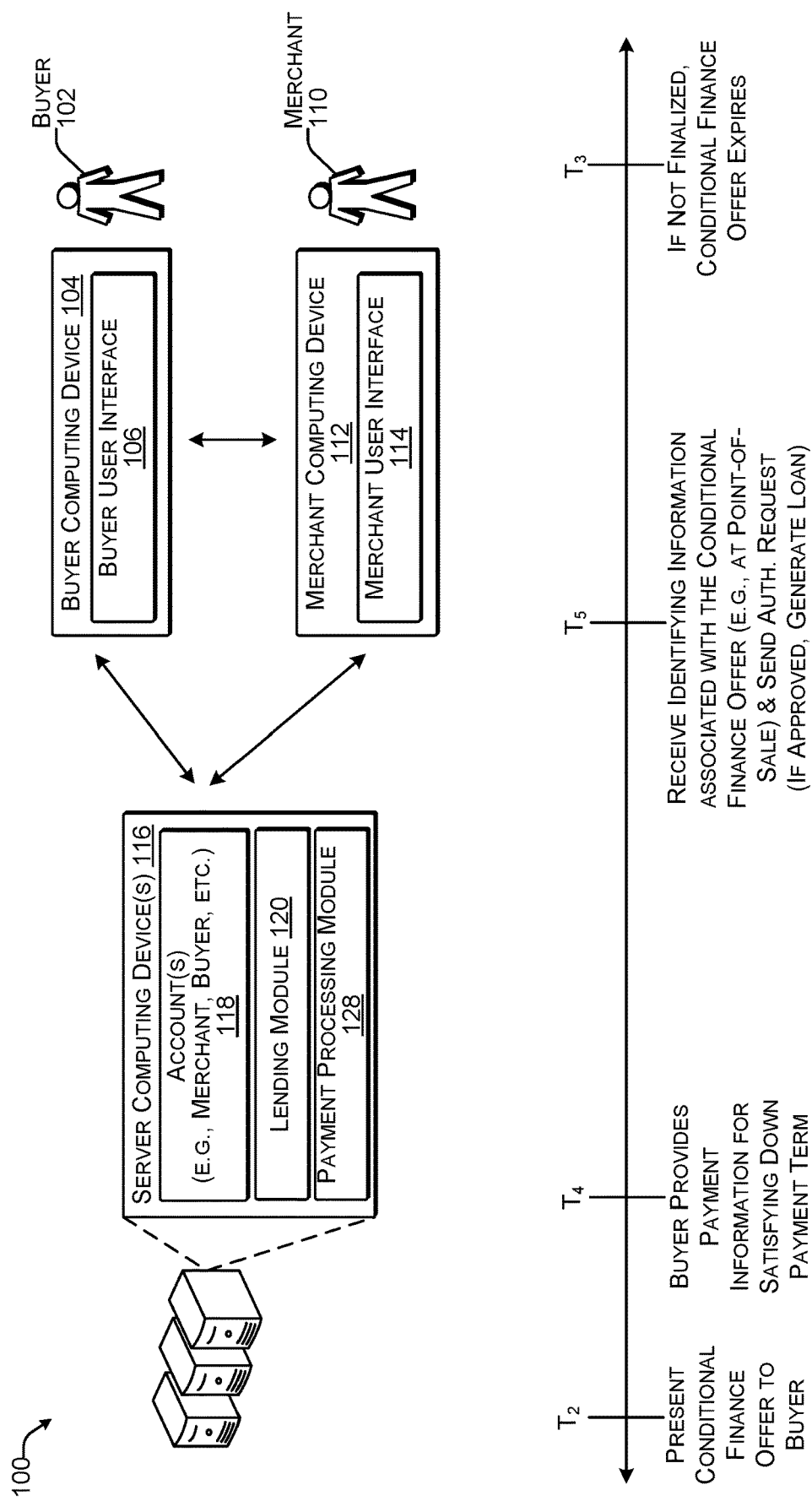
FIG. 2 illustrates additional details associated with the example environment described above with reference to FIG. 1.

FIG. 2 illustrates additional details associated with the example environment 100 described above with reference to FIG. 1. In FIG. 2, the period of time between when the conditional finance offer is presented to the buyer 102 (e.g., $T_2$), either on the buyer computing device 104 or the merchant computing device 112, and the conditional finance offer expires (e.g., $T_3$) is illustrated.

In at least one example, responsive to presenting the conditional finance offer to the buyer 102, the lending module 118 can prompt the buyer 102 to provide payment information associated with a source of funds, for instance, if the conditional finance offer is conditioned on the receipt of a down payment. In such an example, at $T_4$, the buyer 102 can interact with the buyer user interface 106 to input payment information associated with a source of funds for satisfying the down payment term of the conditional finance offer. In at least one example, the source of funds can be associated with a bank account of the buyer 102. In an additional or alternative example, the source of funds can be associated with an account maintained by the service provider on behalf of the buyer 102 (e.g., funds received from peer-to-peer payments from other users in the environment 100, funds transferred by the buyer 102 from a linked bank account, etc.). In the example illustrated in FIG. 2, the lending module 120 can refrain from sending an authorization request to one or more card networks, issuers, acquirers, and the like (e.g., computing device(s) associated therewith) until the buyer 102 requests access to funds associated with the conditional finance offer (e.g., at the POS). However, the lending module 120 can provide the buyer 102 with identifying information associated with the conditional finance offer that the buyer 102 can subsequently present to a merchant, such as the merchant 110, at the POS. In some examples, the conditional finance offer can be associated with a payment instrument such as a digital card or physical card and, in such examples, the identifying information can be a number associated with the digital card or physical card.

The buyer 102 can participate in a transaction with the merchant 110 to purchase one or more item(s). The buyer 102 can provide the identifying information, such as the number associated with the digital card or physical card, associated with the conditional finance offer to the merchant 110 at the POS. The service provider can receive the identifying information associated with the conditional finance offer via the payment processing module 128 (e.g., with additional transaction data indicating item(s) to be purchased, an indication of the merchant from whom the item(s) are being purchased, a cost of the item(s), and so on). The payment processing module 128 can determine that the identifying information is associated with a conditional finance offer. The payment processing module 128 can notify the lending module 120 that the identifying information associated with the conditional finance offer has been received. The lending module 120 can send an authorization request to authorize the payment information provided for satisfying the down payment term for an amount of the down payment term to one or more card networks, issuers, acquirers, and the like (e.g., computing device(s) associated therewith). In some examples, the lending module 120 can determine whether to modify term(s) of the conditional finance offer prior to sending the authorization request based on one or more signals received between when the buyer 102 provided the payment information for satisfying the down payment term (e.g., $T_2$) and the identifying information associated with the conditional finance offer is received (e.g., $T_4$).

In at least one example, if the payment information provided for satisfying the down payment term is legitimate and has a sufficient amount of funds to pay the down payment, the one or more card networks, issuers, acquirers, and the like (e.g., computing device(s) associated therewith) can return an indication that the payment information is authorized for the amount of the down payment and a hold can be placed on the amount of funds equal to the down payment (however no money is moved at that time). In such an example, the lending module 120 can associate a valid state to the authorization request and the authorization can remain valid for a period of time after which the authorization expires (and is associated with an invalid state). If the payment information provided for satisfying the down payment term is authorized (e.g., associated with a valid state), the lending module 120 can subsequently capture (and settle) the funds for the amount of the down payment and can finalize the conditional finance offer. That is, based on the payment information provided for satisfying the down payment term satisfying the down payment term, the lending module 120 can generate the loan. If the payment information provided for satisfying the down payment term is not authorized for the amount of the down payment, the conditional finance offer can be canceled.

Figure 3:
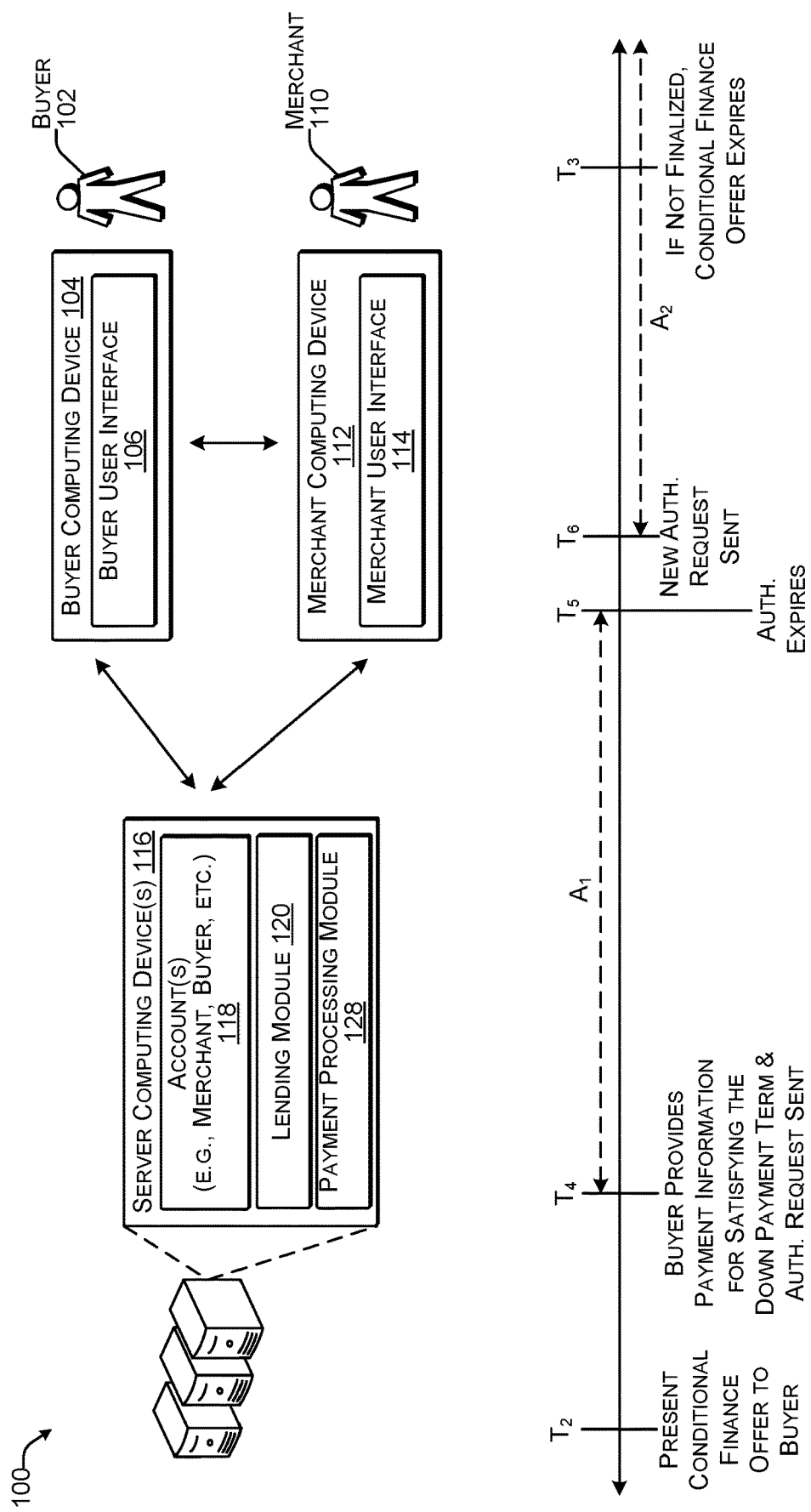
FIG. 3 illustrates additional details associated with the example environment described above with reference to FIG. 1.

FIG. 3 illustrates additional details associated with the example environment 100 described above with reference to FIG. 1. In FIG. 3, the period of time between when the conditional finance offer is presented to the buyer 102 (e.g., $T_2$) and the conditional finance offer expires (e.g., $T_3$) is illustrated. Like in FIG. 2, in at least one example, responsive to presenting the conditional finance offer to the buyer 102, the lending module 118 can prompt the buyer 102 to provide payment information associated with a source of funds, for instance, if the conditional finance offer is conditioned on the receipt of a down payment. In such an example, at $T_4$, the buyer 102 can interact with the buyer user interface 106 to input payment information associated with a source of funds for satisfying the down payment term of the conditional finance offer.

Unlike in FIG. 2, where the lending module 120 refrains from sending an authorization request until the buyer 102 desires to use the funds available from the conditional finance offer (e.g., at the POS), in an example illustrated in FIG. 3, the lending module 120 can send the authorization request responsive to receiving the payment information provided for satisfying the down payment term (e.g., via the payment processing module 128). In at least one example, if the payment information provided for satisfying the down payment term is legitimate and has a sufficient amount of funds to pay the down payment, the one or more card networks, issuers, acquirers, and the like (e.g., computing device(s) associated therewith) can return an indication that the payment information is authorized for the amount of the down payment and a hold can be placed on the amount of funds equal to the down payment (however no money is moved at that time). In such an example, the lending module 120 can associate a valid state to the authorization request and the authorization can remain valid for a period of time (e.g., $A_1$) after which the authorization request can expire (and is associated with an invalid state). That is, the lending module 120 can send the authorization request at $T_4$ (or a substantially similar time as $T_4$). In FIG. 2, the authorization is set to expire at $T_5$. In at least one example, the period of time associated with the valid authorization (e.g., $A_1$) can be dynamically determined and, in some examples, can be shorter than the period of time for which the conditional finance offer is valid. Additional details are described below.

If no purchase has been made by the time the authorization (e.g., $A_1$) expires at $T_5$, the lending module 120 can send a new authorization request. In at least one example, the new authorization request can be sent without the buyer 102 intervening or otherwise providing input to cause the new authorization request to be sent. That is, the new authorization request can be sent using the payment information provided at $T_4$. As such, the state of the authorization remains active thereby ensuring that when the buyer 102 is ready to purchase the item(s) from the merchant 110, there will be no lag time and the lending module 120 can capture funds for the down payment at substantially the same time. The down payment will be authorized, and the loan can be generated without having to send another authorization request to ensure that the down payment term of the conditional finance offer is satisfied. That is, at $T_5$ or after a time after $T_5$, the lending module 120 can send a subsequent authorization request. This time is shown as $T_6$ in FIG. 3. The period of time during which the second authorization is valid is illustrated as $A_2$, which can extend beyond $T_3$, when the conditional finance offer expires. While there is a gap of time shown between $T_5$ and $T_6$, in an additional or alternative example, the subsequent authorization request can be sent at $T_5$ instead of at a time after $T_5$.

Figure 4:
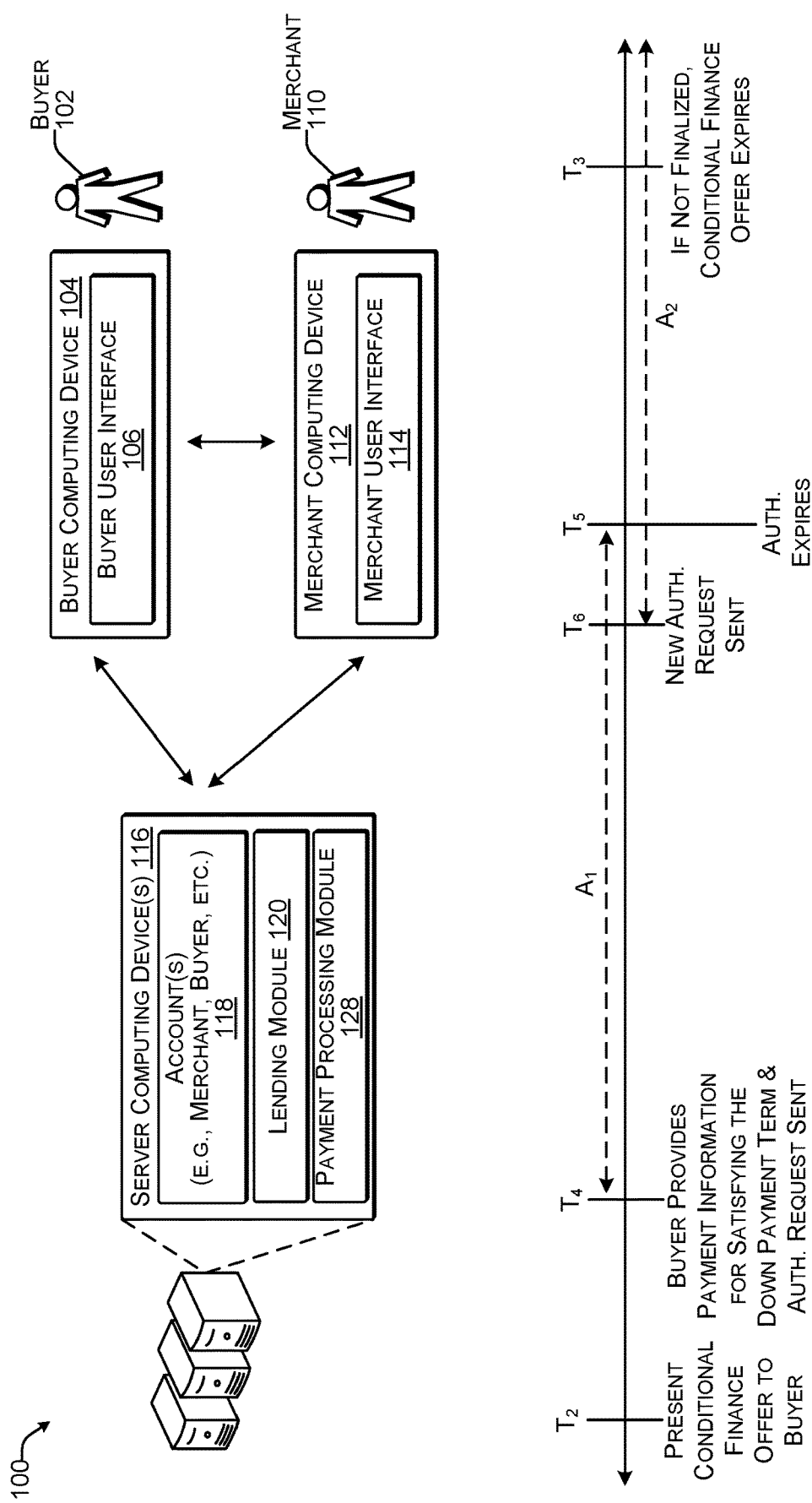
FIG. 4 illustrates additional details associated with the example environment described above with reference to FIG. 1.

FIG. 4 illustrates additional details associated with the example environment 100 described above with reference to FIG. 1. FIG. 4 is substantially identical to FIG. 3; however, in FIG. 4, the lending module 128 can determine whether item(s) have been purchased prior to the time when the authorization (e.g., $A_1$) expires (e.g., $T_5$). If no purchase has been made prior to the time the authorization (e.g., $A_1$) expires at $T_5$, the lending module 120 can send a new authorization request (e.g., at $T_6$) prior to the expiration of the authorization (e.g., $A_1$) to ensure that when the buyer 102 is ready to purchase the item(s) from the merchant 110, there will be no lag time and the lending module 120 can capture funds for the down payment at substantially the same time. That is, unlike in FIG. 3, where there is a period of time between $T_5$ and $T_6$ during which an authorization is not valid (e.g., is associated with an invalid state), in FIG. 4, an authorization is valid for the full duration of the period of time during which the conditional finance offer is valid (e.g., not expired) (e.g., $T_2$ to $T_3$) by the nature of the additional authorization request being sent prior to the expiration of the first authorization request (e.g., $T_5$). That is, in FIG. 4, the authorization is associated with a valid state from $T_4$ to $T_3$ by the nature of the lending module 120 submitting a new authorization request at $T_6$.

While FIGS. 3 and 4 illustrate two authorization requests being sent, in additional or alternative examples, any number of authorization requests can be sent during the period of time which the conditional finance offer is valid (e.g., from $T_2$ to $T_3$). As described above, the authorization periods (e.g., the time during which an authorization is valid, such as $A_1$ and/or $A_2$) can be dynamically determined. In some examples, such an amount of time can be determined using a machine-trained data model, statistics, etc. based on a characteristic of the buyer 102, the merchant 110, merchant classification code (MCC), card network identity, card issuer characteristics, transaction data associated with the transaction (e.g., for the item(s)), etc. For instance, in at least one example, the period of time associated with a valid authorization (e.g., $A_1$ and/or $A_2$) can be determined based on analysis of prior requests (e.g., authorization and/or capture)

associated with the merchant and/or other merchants (e.g., similar or otherwise). By preempting the need to send an authorization request, the subsequent authorization requests can be sent without buyer intervention. So, from a buyer's perspective, an authorization request is approved once for a duration of time. However, at the back-end, multiple authorization requests are exchanged between the server computing device(s) 116 (e.g., the payment processor) and issuers to accommodate for the buyer 102 to make a purchase during the time the conditional finance offer is valid. This also allows the server computing device(s) 116 (e.g., the payment processor) to initiate a capture of funds whenever the buyer 102 is ready to make a purchase, without the usual delays associated with authorization.

In at least one example, if the buyer 102 does not purchase the item(s) prior to the expiration of the conditional finance offer (e.g., $T_3$), the down payment will not be collected (e.g., the lending module 120 (via the payment processing module 128) can refrain from capturing the funds associated with the down payment) and the conditional finance offer will expire. However, if the buyer 102 intends to use funds available via the conditional finance offer at a POS, the buyer 102 can provide the identifying information associated with the conditional finance offer at the POS. As described above, responsive to receiving the identifying information associated with the conditional finance offer at the POS, and because an authorization request has already been sent, the lending module 120 can send a capture and settlement request (e.g., via the payment processing module 128) to one or more card networks, issuers, acquirers, and the like (e.g., computing device(s) associated therewith) to capture funds for satisfying the down payment term for an amount of the down payment term. In some examples, the lending module 120 can determine whether to modify term(s) of the conditional finance offer prior to sending the capture and settlement request. If the term(s) are modified, a new authorization request may be sent prior to sending the capture and settlement request. After the funds have been captured, the lending module 120 can finalize the conditional finance offer at the POS. That is, based on the payment information provided for satisfying the down payment term satisfying the down payment term, the lending module 120 can generate the loan.

While FIGS. 1-4 are described with reference to "loans," and more specifically, purchase finance loans; as described above, techniques described herein can be applicable to other types of financing and/or debt (e.g., cash advances, credit, bills, etc.). Furthermore, while FIGS. 2-4 are directed to examples where a term of the conditional finance offer is a down payment, in additional or alternative examples, a term can be a verification term. A verification term can require the buyer 102 to answer one or more questions about the buyer 102 for knowledge-based verification. In at least one example, the lending module 120 can access information about the buyer 102 in from the account(s) 118 and can generate questions for such knowledge-based verification using such information. Furthermore, in some examples, the lending module 120 can access information about the buyer 102 from one or more third-party service providers that enable access to such information. In an additional or alternative example, a verification term can require the buyer 102 to physically visit one or more merchants that utilize services of the service provider and/or participate in transactions with such merchant(s).

FIGS. 5-9 are flowcharts showing example methods involving techniques as described herein. The methods illustrated in FIGS. 5-9 are described with reference to FIGS. 1-4 for convenience and ease of understanding. However, the methods illustrated in FIGS. 5-9 are not limited to being performed using components described in FIGS. 1-4, and such components are not limited to performing the methods illustrated in FIGS. 5-9. Additional details associated with the computing device(s) and the environment 100 are described below with reference to FIGS. 15 and 16.

The methods 500-900 are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the methods 500-900 can be combined in whole or in part with each other or with other methods.

Figure 5:
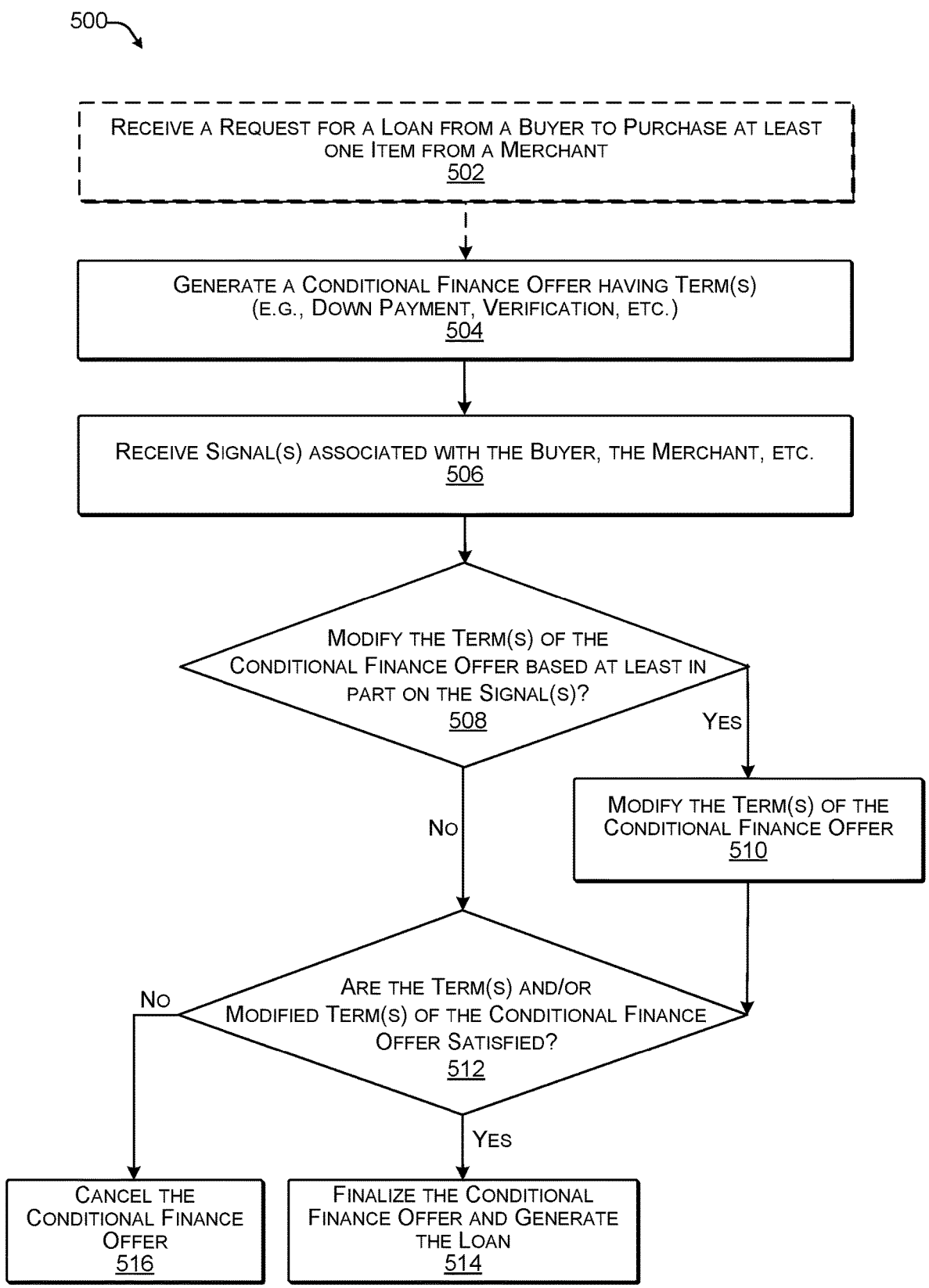
FIG. 5 illustrates an example process for presenting a conditional finance offer to a buyer.

FIG. 5 illustrates an example process 500 for presenting a conditional finance offer to a buyer.

Block 502, which can be optional in some examples, illustrates receiving a request for a loan from a buyer to purchase at least one item from a merchant. In an example, a buyer 102 can interact with the buyer computing device 104 via the buyer user interface 106 to, among other things, request a loan to purchase an item from a merchant, such as the merchant 110. In such an example, the buyer 102 (e.g., via the buyer computing device 104) can send a request for a loan to the server computing device(s) 116. In at least one example, the request can be sent from the buyer user interface 106 (e.g., based on an interaction between the buyer user interface 106 and the buyer 102) to the server computing device(s) 116. The request can indicate particular item(s) (offered for sale by a merchant) for which the buyer 102 is requesting the loan, an amount for which the buyer 102 is requesting to borrow, a merchant for which the buyer 102 is requesting the loan (e.g., a merchant where the buyer 102 intends to use the loan), a combination of the forgoing, etc. Examples of GUIs from which the buyer 102 can submit a request is described below. In some examples, the buyer 102 can submit a request for a loan prior to interacting with a merchant (e.g., prior to entering a physical location of a merchant, etc.), during an interaction with a merchant (e.g., while at a physical location of a merchant, during a checkout flow of a transaction (e.g., online or offline), etc.), or after interacting with a merchant (e.g., after a transaction has been processed, etc.). In at least one example, the lending module 120 can receive the request.

Block 504 illustrates generating a conditional finance offer having term(s) (e.g., down payment, verification, etc.). In at least one example, the lending module 120 can receive the request and can determine whether the buyer 102 is qualified for a loan and/or terms of the loan. In another example, the lending module 120 can determine whether the buyer 102 is qualified for a loan without direct interest or interaction from the buyer 102. In yet another example, such a flow may be triggered by a merchant 110, e.g., to promote their business or encourage purchase at a certain merchant location. The lending module 120 can analyze the request in view of the accounts 118 (e.g., of the buyer 102 and/or the relevant merchant 110, buyers similar to the buyer 102, merchants similar to the merchant 110, item that is being purchased or may be purchased, etc.) and one or more other lending risk signals (e.g., indicative of creditworthiness) to determine whether the buyer 102 qualifies for the loan and/or the terms of the loan. In at least one example, the lending module 120 can utilize machine-trained data models, statistics, or other processes for determining whether the buyer 102 is qualified for the loan and/or terms of the loan. That is, in some examples, the lending module 120 can determine custom terms for a particular buyer (e.g., buyer 102) based at least in part on buyer purchase behavior (e.g., of the buyer and/or of other, similar buyers) and/or merchant POS information (e.g., of a particular merchant and/or of other similar merchants). In some examples, the lending module 120 can utilize past financing activity of the buyer (e.g., buyer 102) and/or similar buyers for determining whether the buyer 102 is qualified for the loan and/or terms of the loan.

In some examples, the lending module 120 can determine that the buyer 102 is qualified for a loan, but only if the buyer 102 satisfies one or more terms. In such examples, the lending module 120 can determine term(s) of a conditional finance offer for the buyer 102. That is, in at least one example, a conditional finance offer can be associated with one or more terms that must be satisfied before the service provider can finalize the finance offer (and thereby generate a loan). Such terms can include a down payment term (e.g., an amount of funds that the buyer 102 must provide before the service provider can finalize the finance offer), a verification term (e.g., knowledge-based verification using one or more questions, verification via one or more other users associated with the environment 100, etc.), a security deposit, a collateral, and the like.

That is, in at least one example, the lending module 120 can analyze the accounts 118 (e.g., of the buyer 102 and/or the relevant merchant 110, buyers similar to the buyer 102, merchants similar to the merchant 110, etc.) and one or more other lending risk signals (e.g., indicative of creditworthiness) to determine whether the buyer 102 requires a conditional finance offer and if so, the term(s) associated with the conditional finance offer. In at least one example, the lending module 120 can utilize machine-trained data models, statistics, or other processes for determining whether the buyer 102 requires a conditional finance offer and/or the term(s) of the conditional finance offer. That is, in some examples, the lending module 120 can determine custom terms for a particular buyer (e.g., buyer 102) based at least in part on buyer purchase behavior (e.g., of the buyer and/or of other, similar buyers) and/or merchant POS information (e.g., of a particular merchant and/or of other similar merchants). In some examples, the lending module 120 can utilize past financing activity of the buyer (e.g., buyer 102) and/or similar buyers for determining whether the buyer 102 requires a conditional finance offer and/or the term(s) of the conditional finance offer. Furthermore, in some examples, the lending module 120 can utilize future transaction activity (e.g., item(s) and/or merchant(s) with which the buyer 102 intends to transact with) for determining whether the buyer 102 requires a conditional finance offer and/or the term(s) of the conditional finance offer. The lending module 120 can thus determine an amount of a down payment term (if required), a number of verification questions that the buyer 102 is required to answer for identity verification (if required), a number of users that buyer 102 is required to interact with for identity verification (if required), and so on based at least in part on machine-trained data models and so forth.

In at least one example, responsive to determining term(s) of the conditional finance offer for the buyer 102, the lending module 120 can present the conditional finance offer to the buyer 102. That is, based at least in part on determining that the buyer 102 is qualified for the loan, and the terms of the loan and/or a finance offer associated with the loan, the lending module 120 can notify the buyer 102. In at least one example, a buyer 102 can be notified prior to arriving at a physical location of a merchant or prior to the buyer 102 settling an online transaction. For instance, in such an example, an offer can be made to the buyer 102 in anticipation of the buyer 102 interacting with a merchant, responsive to determining an intent of the buyer 102 to purchase an item, responsive to the buyer 102 adding an item to a virtual cart, responsive to the buyer 102 viewing an item, etc. In at least one example, the lending module 120 can notify the buyer 102 via a notification presented via the buyer user interface 106 (e.g., an in-app notification, a user interface element presented via a GUI, etc.), an email, a text message, a push notification, etc. In some examples, such a notification can alert the buyer 102 that the buyer 102 is qualified for a loan and the terms of the loan, but that the buyer 102 is required to satisfy one or more terms before the loan is generated.

Block 506 illustrates receiving signal(s) associated with the buyer, the merchant, etc. In at least one example, the lending module 120 can receive one or more signals, for instance associated with the buyer 102, the merchant 110, a payment instrument of the buyer 102, etc. The one or more signals can include, but are not limited to, a time delay since the conditional finance offer is presented to the buyer 102, a change to a credit score of the buyer 102, modified transaction history of the buyer 102 (e.g., the buyer 102 can buy item(s) from the merchant 110 or other merchants), an addition of a bank account to an account of the buyer 102, a change to inventory of the merchant 110 (e.g., the merchant 110 can sell item(s), thereby reducing their inventory, or acquire new items), a change to a location of the merchant 110 (e.g., the merchant 110 can open a new location or have a mobile business), a change to a cost of an item (e.g., the item price can increase or decrease), and so on.

Block 508 illustrates determining whether to modify the term(s) of the conditional finance offer based at least in part on the signal(s). In at least one example, the lending module 120 can determine whether to modify term(s) of the conditional finance offer based at least in part on the signal(s) received. In some examples, the lending module 120 can determine whether to modify the original term at the time the buyer 102 provides payment information for satisfying a down payment term of the conditional finance offer (e.g., in association with a request to activate a payment instrument associated with the conditional finance offer). In additional or alternative examples, the lending module 120 can determine whether to modify the original term at the POS (e.g., when the buyer 102 desires to use funds available via the conditional finance offer to purchase item(s) from a merchant).

If the signal(s) necessitate a change to the term(s) of the conditional finance offer, the lending module 120 can modify the term(s) of the conditional finance offer, as illustrated in block 510. In at least one example, the signal(s) can necessitate a change to the term(s) of the conditional finance offer if circumstances associated with the conditional finance offer change by more than a threshold. For instance, the signal(s) can indicate that risk associated with the buyer 102 has increased or decreased more than a threshold, thereby necessitating a change to the term(s) of the conditional finance offer. Additionally or alternatively, the signal(s) can indicate that an inventory of the merchant 110 and/or a price of an item has changed more than a threshold, thereby necessitating a change to the terms of the conditional finance offer. As described above, the lending module 120 can increase what is required by a term (e.g., increase an amount of a down payment, increase a number of verification questions to be answered, etc.), decrease what is required by a term (e.g., increase an amount of a down payment, increase a number of verification questions to be answered, etc.), or eliminate a term altogether. For instance, if the signal(s) indicate that the buyer 102 has become riskier to the service provider, the lending module 120 can increase the amount of a down payment term or require additional verification. Or, if the signal(s) indicate that the buyer 102 has become less risky to the service provider, the lending module 120 can decrease an amount of or eliminate a down payment term or reduce the amount of verification required of the buyer 102. That is, the lending module 120 can vary the amount of the down payment term, remove the down payment term, replace the down payment term with another term for securing the finance offer, and so on.

Block 512 illustrates determining whether the term(s) and/or modified term(s) of the conditional finance offer are satisfied. In at least one example, the lending module 120 can determine whether term(s) and/or modified term(s) of the conditional finance offer are satisfied. In the case where a term of the conditional finance offer is a down payment term, the lending module 120 can determine whether the buyer 102 provided payment information associated with a source of funds for satisfying the down payment term. Or, in the case where a term of the conditional finance offer is a verification term, the lending module 120 can determine whether the buyer 102 has answered one or more verification questions to verify an identity of the buyer 102, thereby satisfying the verification term associated with the conditional finance offer. Further, the lending module 120 can receive an indication that one or more other users associated with the service provider (e.g., other buyers, merchants, etc.) have verified the identity of the buyer 102, thereby satisfying the verification term associated with the conditional finance offer. If the lending module 120 determines that the term(s) and/or modified term(s) of the conditional finance offer are satisfied before the conditional finance offer expires, the lending module 120 can finalize the conditional finance offer and generate a loan, as illustrated in block 514. That is, based on the payment information provided for satisfying the down payment term satisfying the down payment term, the lending module 120 can generate the loan. The lending module 120 can disperse the funds to the buyer 102 (or the merchant 110 on behalf of the buyer 102) and the loan can enter repayment (e.g., loan servicing). In at least one example, the lending module 120 can make an association between the buyer 102, the merchant 110, and the loan in a database or other data structure associated with the server computing device(s) 116. In at least one example, the amount of the loan can be based on the cost of the item purchased by the buyer 102 from the merchant 110. That is, when the buyer 102 purchases the item from the merchant 110, the lending module 120 can generate the loan for the lesser of an amount of the transaction or an amount for which the buyer 110 was originally authorized.

However, if the modified term(s) and/or term(s) of the conditional finance offer are not satisfied by the time the conditional finance offer expires, the conditional finance offer will expire and thus the conditional finance offer is canceled, as illustrated in block 516.

Figure 6:
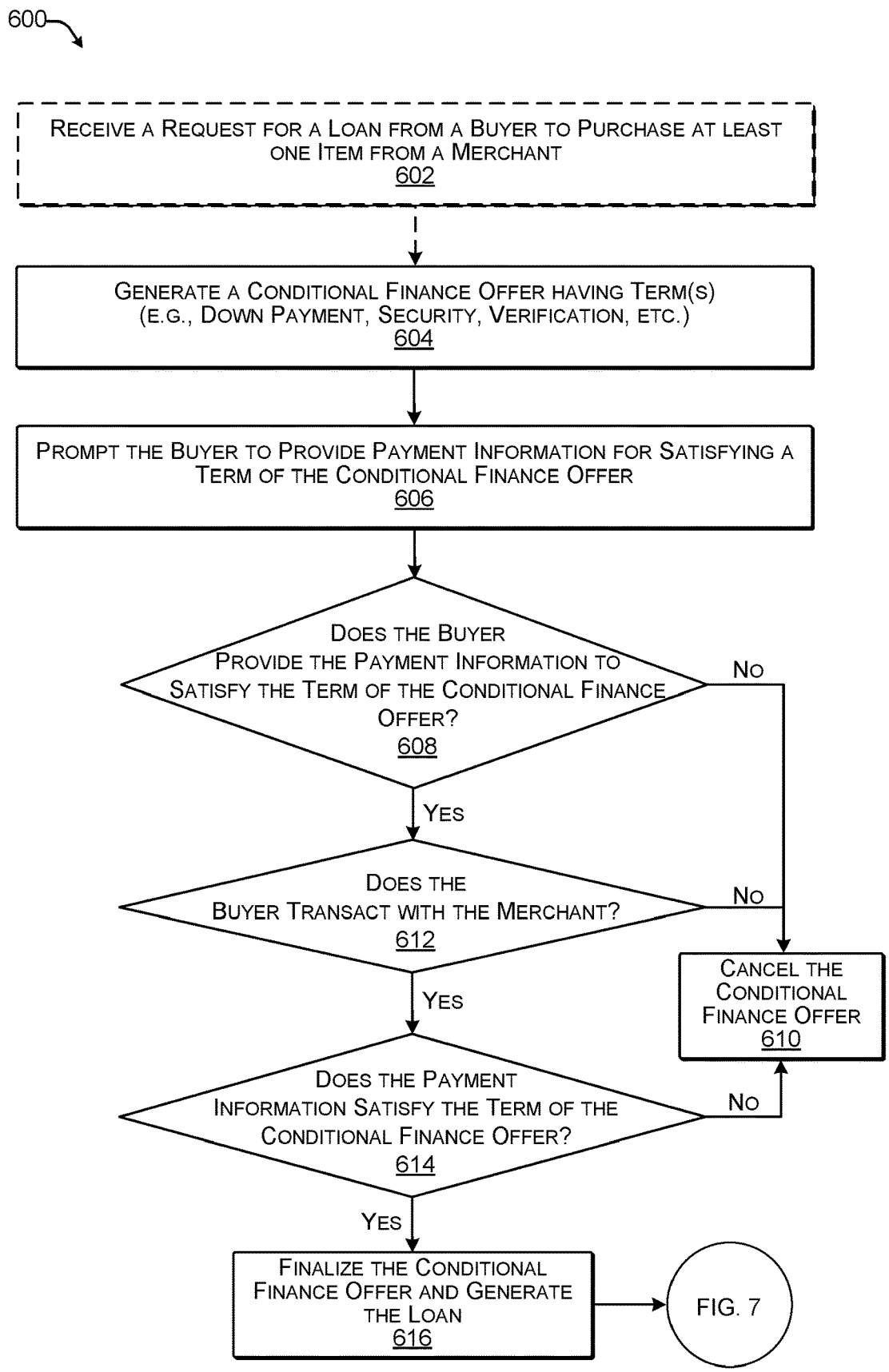
FIG. 6 illustrates an example process for determining whether to finalize a conditional finance offer.

FIG. 6 illustrates an example process 600 for determining whether to finalize a conditional finance offer.

Block 602, which can be optional in some examples, illustrates receiving a request for a loan from a buyer to purchase at least one item from a merchant. In an example, a buyer 102 can interact with the buyer computing device 104 via the buyer user interface 106 to, among other things, request a loan to purchase an item from a merchant, such as the merchant 110. In such an example, the buyer 102 (e.g., via the buyer computing device 104) can send a request for a loan to the server computing device(s) 116. In at least one example, the request can be sent from the buyer user interface 106 (e.g., based on an interaction between the buyer user interface 106 and the buyer 102) to the server computing device(s) 116. The request can indicate particular item(s) (offered for sale by a merchant) for which the buyer 102 is requesting the loan, an amount for which the buyer 102 is requesting to borrow, a merchant for which the buyer 102 is requesting the loan (e.g., a merchant where the buyer 102 intends to use the loan), a combination of the forgoing, etc. Examples of GUIs (GUIs) from which the buyer 102 can submit a request is described below. In some examples, the buyer 102 can submit a request for a loan prior to interacting with a merchant (e.g., prior to entering a physical location of a merchant, etc.), during an interaction with a merchant (e.g., while at a physical location of a merchant, during a checkout flow of a transaction (e.g., online or offline), etc.), or after interacting with a merchant (e.g., after a transaction has been processed, etc.). In at least one example, the lending module 120 can receive the request.

Block 604 illustrates generating a conditional finance offer having term(s) (e.g., down payment, verification, etc.). In at least one example, the lending module 120 can receive the request and can determine whether the buyer 102 is qualified for a loan and/or terms of the loan. In another example, the lending module 120 can determine whether the buyer 102 is qualified for a loan without direct interest or interaction from the buyer 102. In yet another example, such a flow may be triggered by a merchant 110, e.g., to promote their business or encourage purchase at a certain merchant location. The lending module 120 can analyze the request in view of the accounts 118 (e.g., of the buyer 102 and/or the relevant merchant 110, buyers similar to the buyer 102, merchants similar to the merchant 110, item that is being purchased or may be purchased, etc.) and one or more other lending risk signals (e.g., indicative of creditworthiness) to determine whether the buyer 102 qualifies for the loan and/or the terms of the loan. In at least one example, the lending module 120 can utilize machine-trained data models, statistics, or other processes for determining whether the buyer 102 is qualified for the loan and/or terms of the loan. That is, in some examples, the lending module 120 can determine custom terms for a particular buyer (e.g., buyer 102) based at least in part on buyer purchase behavior (e.g., of the buyer and/or of other, similar buyers) and/or merchant POS information (e.g., of a particular merchant and/or of other similar merchants). In some examples, the lending module 120 can utilize past financing activity of the buyer (e.g., buyer 102) and/or similar buyers for determining whether the buyer 102 is qualified for the loan and/or terms of the loan.

In some examples, the lending module 120 can determine that the buyer 102 is qualified for a loan, but only if the buyer 102 satisfies one or more terms. In such examples, the lending module 120 can determine term(s) of a conditional finance offer for the buyer 102. That is, in at least one example, a conditional finance offer can be associated with one or more terms that must be satisfied before the service provider can finalize the finance offer (and thereby generate a loan). Such terms can include a down payment term (e.g., an amount of funds that the buyer 102 must provide before the service provider can finalize the finance offer), a verification term (e.g., knowledge-based verification using one or more questions, verification via one or more other users associated with the environment 100, etc.), a security deposit, a collateral, and the like.

That is, in at least one example, the lending module 120 can analyze the accounts 118 (e.g., of the buyer 102 and/or the relevant merchant 110, buyers similar to the buyer 102, merchants similar to the merchant 110, etc.) and one or more other lending risk signals (e.g., indicative of creditworthiness) to determine whether the buyer 102 requires a conditional finance offer and if so, the term(s) associated with the conditional finance offer. In at least one example, the lending module 120 can utilize machine-trained data models, statistics, or other processes for determining whether the buyer 102 requires a conditional finance offer and/or the term(s) of the conditional finance offer. That is, in some examples, the lending module 120 can determine custom terms for a particular buyer (e.g., buyer 102) based at least in part on buyer purchase behavior (e.g., of the buyer and/or of other, similar buyers) and/or merchant POS information (e.g., of a particular merchant and/or of other similar merchants). In some examples, the lending module 120 can utilize past financing activity of the buyer (e.g., buyer 102) and/or similar buyers for determining whether the buyer 102 requires a conditional finance offer and/or the term(s) of the conditional finance offer. Furthermore, in some examples, the lending module 120 can utilize future transaction activity (e.g., item(s) and/or merchant(s) with which the buyer 102 intends to transact with) for determining whether the buyer 102 requires a conditional finance offer and/or the term(s) of the conditional finance offer. The lending module 120 can thus determine an amount of a down payment term (if required), a number of security questions that the buyer 102 is required to answer for identity verification (if required), a number of users that buyer 102 is required to interact with for identity verification (if required), and so on based at least in part on machine-trained data models and so forth.

In at least one example, responsive to determining term(s) of the conditional finance offer for the buyer 102, the lending module 120 can present the conditional finance offer to the buyer 102. That is, based at least in part on determining that the buyer 102 is qualified for the loan, and the terms of the loan and/or a finance offer associated with the loan, the lending module 120 can notify the buyer 102. In at least one example, a buyer 102 can be notified prior to arriving at a physical location of a merchant or prior to the buyer 102 settling an online transaction. For instance, in such an example, an offer can be made to the buyer 102 in anticipation of the buyer 102 interacting with a merchant, responsive to determining an intent of the buyer 102 to purchase an item, responsive to the buyer 102 adding an item to a virtual cart, responsive to the buyer 102 viewing an item, etc. In at least one example, the lending module 120 can notify the buyer 102 via a notification presented via the buyer user interface 106 (e.g., an in-app notification, a user interface element presented via a GUI, etc.), an email, a text message, a push notification, etc. In some examples, such a notification can alert the buyer 102 that the buyer 102 is qualified for a loan and the terms of the loan, but that the buyer 102 is required to satisfy one or more terms before the loan is generated.

Block 606 illustrates prompting the buyer to provide payment information for satisfying a term of the conditional finance offer. In at least one example, responsive to presenting the conditional finance offer to the buyer 102, the lending module 118 can prompt the buyer 102 to provide payment information associated with a source of funds, for instance, if the conditional finance offer is conditioned on the receipt of a down payment.

Block 608 illustrates determining whether the buyer provides the payment information to satisfy the term of the conditional finance offer. In at least one example, the buyer 102 can interact with the buyer user interface 106 to input payment information associated with a source of funds for satisfying the down payment term of the conditional finance offer. In at least one example, the source of funds can be associated with a bank account of the buyer 102. In an additional or alternative example, the source of funds can be associated with an account maintained by the service provider on behalf of the buyer 102 (e.g., funds received from peer-to-peer payments from other users in the environment 100, funds transferred by the buyer 102 from a linked bank account, etc.).

In at least one example, responsive to receiving the payment information associated with the source of funds, the lending module 120 can provide the buyer 102 with identifying information associated with the conditional finance offer that the buyer 102 can subsequently present to a merchant, such as the merchant 110, at the POS. In some examples, the conditional finance offer can be associated with a payment instrument, such as a digital card or physical card and, in such examples, the identifying information can be a number associated with the digital card or physical card.

If the buyer 102 does not provide the payment information to satisfy the term of the conditional finance offer, the conditional finance offer can expire and thus, the lending module 120 can cancel the conditional finance offer as illustrated in block 610.

Block 612 illustrates determining whether the buyer transacts with the merchant. In at least one example, the lending module 120 can determine whether at least one item has been purchased by the buyer 102 from the merchant 110. In some examples, a buyer 102 is required to purchase an item from the merchant 110 associated with the original request within the period of time between when the conditional finance offer is presented to the buyer 102 and when the conditional finance offer expires. That is, in some examples, purchasing an item can be a term of the conditional finance offer. In at least one example, the server computing device(s) 116 can receive transaction data from POS transactions between merchants and buyers, such as the buyer 102 and the merchant 110, for example via the payment processing module 128. In some examples, the lending module 120 can access the transaction data, or an indication based thereon, to determine whether one or more items have been purchased from the merchant 110. If item(s) are purchased from the merchant 110 prior to the time at which the conditional finance offer expires, the lending module 120 can determine whether the payment information provided to satisfy the down payment term of the conditional finance offer satisfies the down payment term, as illustrated in block 614. However, if the buyer 102 does not purchase any item(s) from the merchant 110 prior to when the conditional finance offer expires, the lending module 120 can cancel the conditional finance offer, as illustrated in block 610.

As described above, the buyer 102 can provide the identifying information associated with the conditional finance offer to the merchant 110 at the POS. The service provider can receive the identifying information associated with the conditional finance offer via the payment processing module 128 (e.g., with additional transaction data indicating item(s) to be purchased, an indication of the merchant from whom the item(s) are being purchased, a cost of the item(s), and so on). The payment processing module 128 can determine that the identifying information is associated with a conditional finance offer. The payment processing module 128 can notify the lending module 120 that the identifying information associated with the conditional finance offer has been received. In at least one example, responsive to receiving an indication that the identifying information has been received, the lending module 120 can send an authorization request to authorize the payment information provided for satisfying the down payment term for an amount of the down payment term to one or more card networks, issuers, acquirers, and the like (e.g., computing device(s) associated therewith). In some examples, the lending module 120 can determine whether to modify term(s) of the conditional finance offer prior to sending the authorization request based on one or more signals received between when the buyer 102 provided the payment information for satisfying the down payment term and the identifying information associated with the conditional finance offer is received.

Block 616 illustrates finalizing the conditional finance offer and generating a loan. If the payment information provided for satisfying the down payment term is authorized, the lending module 120 can capture the funds for the amount of the down payment and can finalize the conditional finance offer. That is, based on the payment information provided for satisfying the down payment term satisfying the down payment term, the lending module 120 can generate the loan. The lending module 120 can disperse the funds to the buyer 102 (or the merchant 110 on behalf of the buyer 102) and the loan can enter repayment (e.g., loan servicing). In at least one example, the lending module 120 can make an association between the buyer 102, the merchant 110, and the loan in a database or other data structure associated with the server computing device(s) 116. In at least one example, the amount of the loan can be based on the cost of the item purchased by the buyer 102 from the merchant 110. That is, when the buyer 102 purchases the item from the merchant 110, the lending module 120 can generate the loan for the lesser of an amount of the transaction or an amount for which the buyer 110 was originally authorized.

If the payment information provided for satisfying the down payment term is not authorized for the amount of the down payment, the conditional finance offer can be canceled, as illustrated in block 610, unless the buyer 102 provides different payment information that is subsequently authorized prior to expiration of the conditional finance offer.

Figure 7:
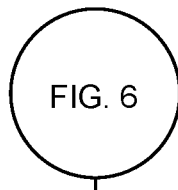
FIG. 7 illustrates an example process for repaying at least a portion of a loan generated based on a conditional finance offer.

FIG. 7 illustrates an example process 700 for repaying at least a portion of a loan generated based on a conditional finance offer.

Block 702 illustrates receiving a payment for repaying at least a portion of the loan, wherein the payment is associated with the payment information provided for satisfying the term of the conditional finance offer. After the loan is generated, the loan can have a balance that is based at least in part on the cost of the transaction (e.g., the lesser of the amount of the transaction or the amount for which the buyer 110 was originally authorized). The balance can include processing fees and/or interest. However, the balance can reflect the down payment provided. That is, the balance of the loan can amount to the total cost of the transaction or the amount for which the buyer 102 was originally authorized (whichever is less), loan processing fees, and/or interest, less the amount of the down payment.

In at least one example, the buyer 102 can repay the loan in one or more payments (e.g., installments). The lending module 120 can receive payment information for repaying at least a portion of the loan. In some examples, the buyer 102 can repay the loan using the same source of funds (e.g., same payment information) provided for satisfying the down payment term of the conditional offer. That is, in some examples, the same source of funds can be used for multiple events of a finance offer and subsequently issued loan. In at least one example, the source of funds can be a stored balance associated with an account of the buyer 102. In additional or alternative examples, at least a portion of the loan can be repaid with another source of funds. In some examples, such payments can be made automatically, without requiring further input from the buyer 102. The same source of funds need not be used for each payment made for repayment of the loan.

Block 704 illustrates reducing a balance of the loan based at least in part on the payment. Based at least in part on the buyer 102 submitting a payment, the lending module 120 can reduce the balance of the loan by an amount that is based at least in part on the payment.

Figure 8:
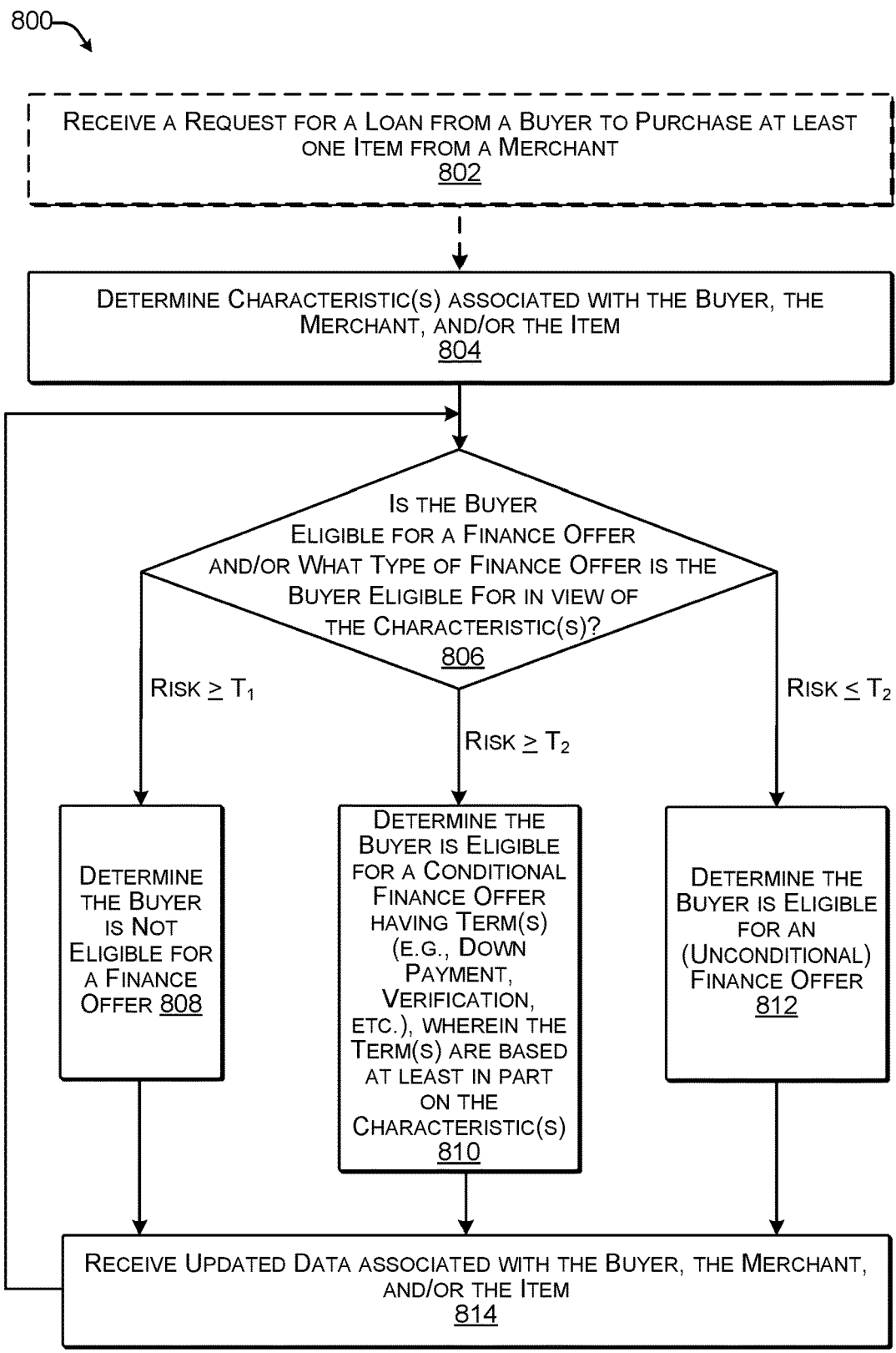
FIG. 8 illustrates an example process for generating a conditional finance offer.

FIG. 8 illustrates an example process 800 for generating a conditional finance offer.

Block 802, which can be optional in some examples, illustrates receiving a request for a loan from a buyer to purchase at least one item from a merchant. In an example, a buyer 102 can interact with the buyer computing device 104 via the buyer user interface 106 to, among other things, request a loan to purchase an item from a merchant, such as the merchant 110. In such an example, the buyer 102 (e.g., via the buyer computing device 104) can send a request for a loan to the server computing device(s) 116. In at least one example, the request can be sent from the buyer user interface 106 (e.g., based on an interaction between the buyer user interface 106 and the buyer 102). The request can indicate particular item(s) (offered for sale by a merchant) for which the buyer 102 is requesting the loan, an amount for which the buyer is requesting to borrow, a merchant for which the buyer 102 is requesting the loan (e.g., a merchant where the buyer 102 intends to use the loan), a combination of the forgoing, etc. An example of a GUI from which the buyer 102 can submit a request is described below. In some examples, the buyer 102 can submit a request for a loan prior to interacting with a merchant (e.g., prior to entering a physical location of a merchant, etc.), during an interaction with a merchant (e.g., while at a physical location of a merchant, during a checkout flow of a transaction (e.g., online or offline), etc.), or after interacting with a merchant (e.g., after a transaction has been processed, etc.). In at least one example, the lending module 120 can receive the request.

Block 804 illustrates determining characteristic(s) associated with the buyer, the merchant, and/or the item. In at least one example, the lending module 120 can determine characteristic(s) associated with the buyer 102, the merchant 110, and/or the item that the buyer 102 desires to purchase from the merchant 110. In some examples, the lending module 120 can access the accounts 118 associated with the service provider to determine such characteristics. Additional details associated with data that is stored in association with the accounts 118 is described below. Additionally, the lending module 120 can access an inventory of the merchant 110 to determine characteristic(s) associated with the item.

In at least one example, characteristic(s) of the buyer 102 can indicate that the buyer 102 is a high-risk buyer in that the buyer 102 has multiple lines of credit, has not linked a bank account to its account with the service provider, has participated in transactions with merchant(s) that are not verified or have been flagged for fraud. Alternatively, in at least one example, characteristic(s) of the buyer 102 can indicate that the buyer 102 is a low-risk buyer in that the buyer 102 has previously received a loan from the service provider that was timely repaid, the buyer 102 has a linked bank account to its account with the service provider, and so forth. Furthermore, characteristic(s) of the merchant 110 can indicate a geolocation of the merchant, a merchant category code (MCC) of the merchant 110, a pricing structure associated with the merchant 110 (e.g., discount, luxury, etc.), item(s) offered for sale by the merchant 110, and the like. Characteristic(s) of the item(s) that the buyer 102 desires to purchase can include a cost of the item, a type of the item, and the like.

In at least one example, the lending module 120 can determine whether the buyer 102 is eligible for a finance offer and/or what type of finance offer the buyer 102 is eligible for in view of the characteristic(s), as illustrated in block 806. In at least one example, the lending module 120 can analyze the accounts 118 (e.g., of the buyer 102 and/or the relevant merchant 110, buyers similar to the buyer 102, merchants similar to the merchant 110, etc.) and one or more other lending risk signals (e.g., indicative of creditworthiness) to determine whether the buyer 102 is eligible for an offer and/or what type of offer the buyer 102 is eligible for. In at least one example, the lending module 120 can utilize machine-trained data models, statistics, or other processes for determining whether the buyer 102 is eligible for an offer and/or for which type of offer the buyer 102 is eligible. In at least one example, the lending module 120 can determine a level of risk associated with the buyer 102 based at least in part on the characteristic(s), which can be used to determine whether the buyer 102 is eligible for an offer and/or for which type of offer the buyer 102 is eligible.

In at least one example, if the level of risk satisfies a first threshold (e.g., is greater than or equal to $T_1$), or is within a first range, the lending module 120 can determine that the buyer 102 is too risky and can determine that the buyer 102 is not eligible for a finance offer, as illustrated in block 808. In such an example, the lending module 120 can notify the buyer 102 that they are not eligible for receiving a loan (and can refrain from generating a finance offer for the buyer 102).

However, if the level of risk satisfies a second threshold (e.g., is greater than or equal to $T_2$), which may be lower than the first threshold, or is within a second range, the lending module can determine that the buyer 102 is eligible for an offer so long as the buyer 102 satisfies one or more terms, as illustrated in block 810. That is, in at least one example, the lending module 120 can analyze the accounts 118 (e.g., of the buyer 102 and/or the relevant merchant 110, buyers similar to the buyer 102, merchants similar to the merchant 110, etc.) and one or more other lending risk signals (e.g., indicative of creditworthiness) to determine that the buyer 102 requires a conditional finance offer and the term(s) associated with the conditional finance offer. In at least one example, the lending module 120 can utilize machine-trained data models, statistics, or other processes for determining whether the buyer 102 requires a conditional finance offer and/or the term(s) of the conditional finance offer.

That is, in some examples, the lending module 120 can determine custom terms for a particular buyer (e.g., buyer 102) based at least in part on buyer purchase behavior (e.g., of the buyer and/or of other, similar buyers) and/or merchant POS information (e.g., of a particular merchant and/or of other similar merchants). In some examples, the lending module 120 can utilize past financing activity of the buyer (e.g., buyer 102) and/or similar buyers for determining whether the buyer 102 requires a conditional finance offer and/or the term(s) of the conditional finance offer. Furthermore, in some examples, the lending module 120 can utilize future transaction activity (e.g., item(s) and/or merchant(s) with which the buyer 102 intends to transact with) for determining whether the buyer 102 requires a conditional finance offer and/or the term(s) of the conditional finance offer. The lending module 120 can thus determine an amount of a down payment term (if required), a number of security questions that the buyer 102 is required to answer for identity verification (if required), a number of users that buyer 102 is required to interact with for identity verification (if required), and so on based at least in part on machine-trained data models and so forth. In at least one example, responsive to determining term(s) of the conditional finance offer for the buyer 102, the lending module 120 can present the conditional finance offer to the buyer 102, as described above. The conditional finance offer can be associated with a period of time after which the conditional finance offer expires.

In at least one example, if the level of risk satisfies a third threshold (e.g., is less than $T_2$), which may be the second threshold (as illustrated in FIG. 8) or another threshold, or is within a third range, the lending module can determine that the buyer 102 is eligible for a finance offer that is not conditioned on one or more terms, as illustrated in block 812. In such an example, the lending module 120 can present the finance offer to the buyer 102.

Block 814 illustrates receiving updated data associated with the buyer, the merchant, and/or the item. In at least one example, the lending module 120 can receive updated data which can include a time delay since a finance offer is presented to the buyer 102 ((or not), a change to a credit score of the buyer 102, modified transaction history of the buyer 102 (e.g., the buyer 102 can buy item(s) from the merchant 110 or other merchants), an addition of a bank account to an account of the buyer 102, a change to inventory of the merchant 110 (e.g., the merchant 110 can sell item(s), thereby reducing their inventory, or acquire new items), a change to a location of the merchant 110 (e.g., the merchant 110 can open a new location or have a mobile business), a change to a cost of an item (e.g., the item price can increase or decrease), and so on. In at least one example, the lending module 120 can determine whether to modify a finance offer based at least in part on the updated data received. For instance, if the signal(s) indicate that the buyer 102 has become riskier to the service provider, the lending module 120 can determine that the buyer 102 is not eligible for a finance offer and/or modify the term(s) of the conditional finance offer. As an example, the lending module 120 can increase the amount of a down payment term or require additional verification. Or, if the signal(s) indicate that the buyer 102 has become less risky to the service provider, the lending module 120 can remove the conditionality of the finance offer and/or modify the term(s) of the conditional finance offer. As an example, the lending module 120 can decrease an amount of or eliminate a down payment term or reduce the amount of verification required of the buyer 102. That is, the lending module 120 can utilize the updated data to determine whether to modify the financing offers available to the buyer 102 (between blocks 808 and 812).

Figure 9:
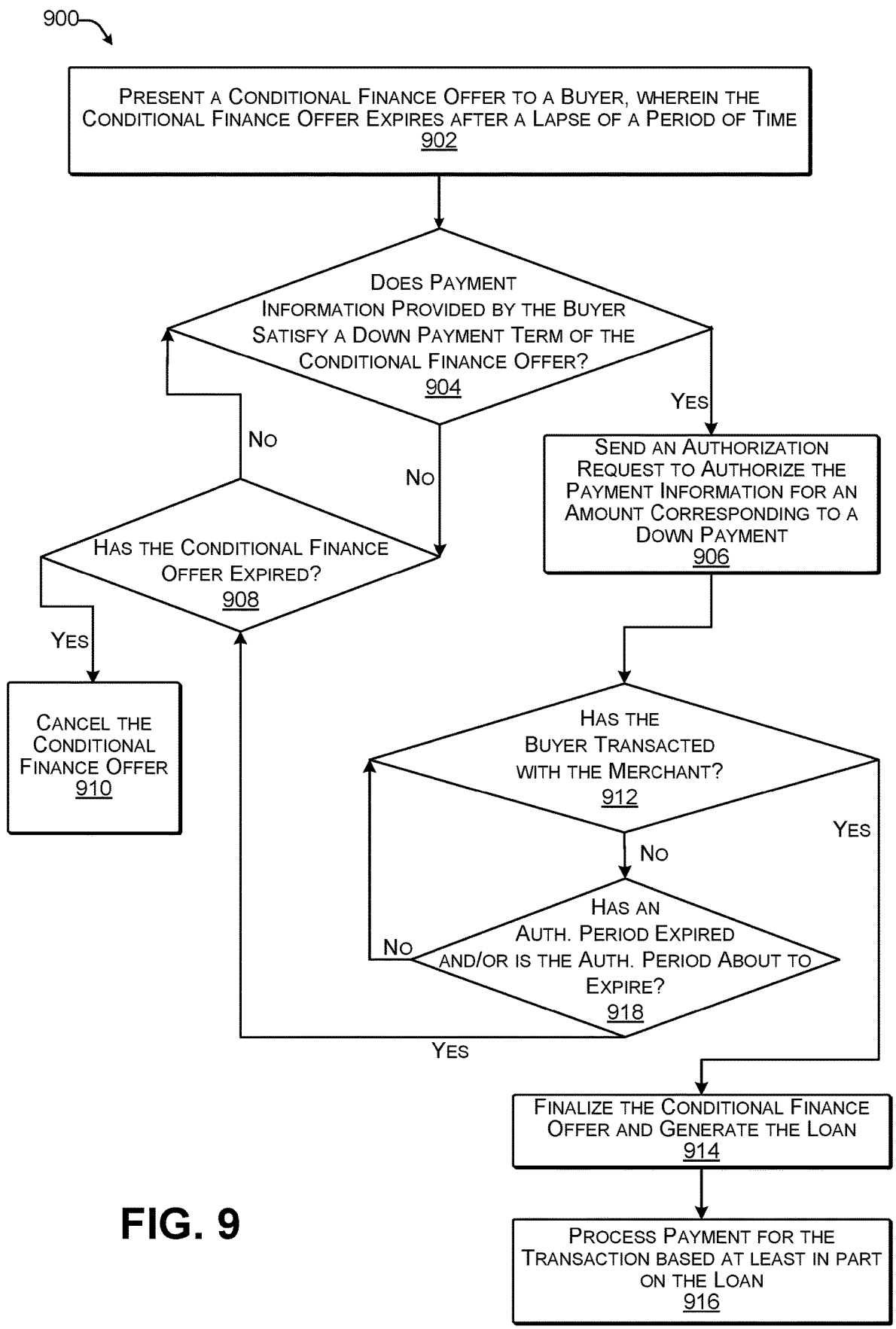
FIG. 9 illustrates an example process for determining whether to finalize a conditional finance offer.

FIG. 9 illustrates an example process 900 for determining whether to finalize a conditional finance offer.

Block 902 illustrates presenting a conditional finance offer to a buyer, wherein the conditional finance offer expires after a lapse of a period of time. As described above, in at least one example, the lending module 120 can determine whether the buyer 102 is qualified for a loan and/or terms of the loan. In some examples, the lending module 120 can determine that the buyer 102 is qualified for a loan, but only if the buyer 102 satisfies one or more terms. That is, the lending module 120 can determine that the buyer 102 is conditionally approved for a loan. In such examples, the lending module 120 can determine term(s) of a conditional finance offer for the buyer 102. That is, in at least one example, a conditional finance offer can be associated with one or more terms that must be satisfied before the service provider can finalize the finance offer (and thereby generate a loan). Such terms can include a down payment term (e.g., an amount of funds that the buyer 102 must provide before the service provider can finalize the finance offer), a verification term (e.g., knowledge-based verification using one or more questions, verification via one or more other users associated with the environment 100, etc.), a security deposit, a collateral, and the like. In at least one example, responsive to determining term(s) of the conditional finance offer for the buyer 102, the lending module 120 can present the conditional finance offer to the buyer 102.

Based at least in part on determining that the buyer 102 is qualified for the loan, and the terms of the loan and/or a finance offer associated with the loan, the lending module 120 can notify the buyer 102. That is, the lending module 120 can present the conditional finance offer to the buyer 102. In at least one example, the lending module 120 can notify the buyer 102 via a notification presented via the buyer user interface 106 (e.g., an in-app notification, a user interface element presented via a GUI, etc.), an email, a text message, a push notification, etc. In some examples, such a notification can alert the buyer 102 that the buyer 102 is qualified for a loan and the terms of the loan, but that the buyer 102 is required to satisfy one or more terms before the loan is generated.

Block 904 illustrates determining whether payment information is provided by the buyer to satisfy the term of the conditional finance offer. In at least one example, the buyer 102 can interact with the buyer user interface 106 to input payment information associated with a source of funds for satisfying the down payment term of the conditional finance offer. In some examples, the buyer 102 can provide payment information responsive to a prompt requesting such. In at least one example, the source of funds can be associated with a bank account of the buyer 102. In an additional or alternative example, the source of funds can be associated with an account maintained by the service provider on behalf of the buyer 102 (e.g., funds received from peer-to-peer payments from other users in the environment 100, funds transferred by the buyer 102 from a linked bank account, etc.).

If the payment information is provided by the buyer 102, in at least one example, responsive to receiving the payment information, the lending module 120 can send an authorization request (e.g., via the payment processing module 128) one or more card networks, issuers, acquirers, and the like (e.g., computing device(s) associated therewith) to request and/or receive authorization for an amount of the down payment, as illustrated in block 906. The authorization can be valid (e.g., associated with a valid state) for a period of time after which the authorization can expire (e.g., associated with an invalid state). In at least one example, the period of time associated with the valid authorization can be dynamically determined and, in some examples, can be shorter than the period of time for which the conditional finance offer is valid.

Block 908 illustrates determining whether the conditional finance offer has expired. As described above, the conditional finance offer can be valid for a period of time after which the conditional finance offer expires. In at least one example, if the payment information has not been provided by the buyer to satisfy the down payment term of the conditional finance offer, the lending module 120 can determine whether the conditional finance offer has expired. If the conditional finance offer has expired, the lending module 120 can cancel the conditional finance offer, as illustrated in block 910. However, if the conditional finance offer has not expired, process 900 can return to block 904 and the lending module 120 can wait for the buyer 102 to input payment information for satisfying the down payment term of the conditional finance offer.

Block 912 illustrates determining whether the buyer has transacted with the merchant. As described above, in at least one example, the lending module 120 can provide the buyer 102 with identifying information associated with the conditional finance offer that the buyer 102 can subsequently present to a merchant, such as the merchant 110, at the POS. In some examples, the conditional finance offer can be associated with a payment instrument such as a digital card or physical card and, in such examples, the identifying information can be a number associated with the digital card or physical card.

In at least one example, the lending module 120 can determine whether the buyer 102 has transacted with the merchant 110 (e.g., to purchase one or more items). In some examples, a buyer 102 is required to purchase an item from the merchant associated with the original request within the period of time between when the conditional finance offer is presented to the buyer 102 and when the conditional finance offer expires. That is, in some examples, purchasing an item can be a term of the conditional finance offer. In at least one example, the server computing device(s) 116 can receive transaction data from POS transactions between merchants and buyers, such as the buyer 102 and the merchant 110, for example via the payment processing module 128. In some examples, the lending module 120 can access the transaction data, or an indication based thereon, to determine whether the item has been purchased.

As described above, the buyer 102 can provide the identifying information associated with the conditional finance offer to the merchant 110 at the POS. The service provider can receive the identifying information associated with the conditional finance offer via the payment processing module 128 (e.g., with additional transaction data indicating item(s) to be purchased, an indication of the merchant from whom the item(s) are being purchased, a cost of the item(s), and so on). The payment processing module 128 can determine that the identifying information is associated with a conditional finance offer. The payment processing module 128 can notify the lending module 120 that the identifying information associated with the conditional finance offer has been received. In at least one example, because an authorization is pending, the lending module 120 can send a capture and settlement request to capture funds for satisfying the down payment term for an amount of the down payment term to one or more card networks, issuers, acquirers, and the like (e.g., computing device(s) associated therewith).

Block 914 illustrates finalizing the conditional finance offer and generating the loan. If the payment information provided for satisfying the down payment term is authorized and subsequently captured when the buyer 102 purchases the item from the merchant 110, the lending module 120 can finalize the conditional finance offer. That is, based on the payment information provided for satisfying the down payment term satisfying the down payment term, the lending module 120 can generate the loan at the POS and use the loan for processing payment for the purchase price of the transaction (e.g., item(s)) based at least in part on the loan, as illustrated in block 916. That is, the lending module 120 can disperse the funds to the buyer 102 (or the merchant 110 on behalf of the buyer 102), which can be used for satisfying the cost of the item(s), and the loan can enter repayment (e.g., loan servicing). In at least one example, the lending module 120 can make an association between the buyer 102, the merchant 110, and the loan in a database or other data structure associated with the server computing device(s) 116.

If the buyer 102 has not transacted with the merchant 110 prior to the time at which the conditional finance offer expires, the lending module 120 can determine whether an authorization period associated with the authorization request (e.g., sent in association with block 906) has expired and/or is about to expire, as illustrated in block 918. If the authorization period has expired and/or is about to expire, process 900 can return to block 908 and the lending module 120 can determine whether the conditional finance offer has expired. If the conditional finance offer has not expired, the lending module 120 can submit another authorization request to authorize payment information for an amount corresponding to the down payment term, as illustrated in block 906 and process 900 can continue until the conditional finance offer has expired and the lending module 120 cancels the conditional finance offer. If the authorization period has not expired, the process 900 can return to block 912 and the lending module 120 can determine (again) whether the buyer 102 has transacted with the merchant 110.

FIGS. 10-14 illustrate various example GUIs that can, among other things, facilitate requesting loans and/or managing conditional finance offers, as described herein. While the GUIs described below with reference to FIGS. 10-14 are described in the context of being presented via a buyer user interface 106, in additional or alternative examples, such GUIs can be presented via a merchant user interface 114 and/or merchant computing device(s) 112 (or any other type of device), and can be subject to interaction by merchants, buyers, or any other users.

Figure 10:
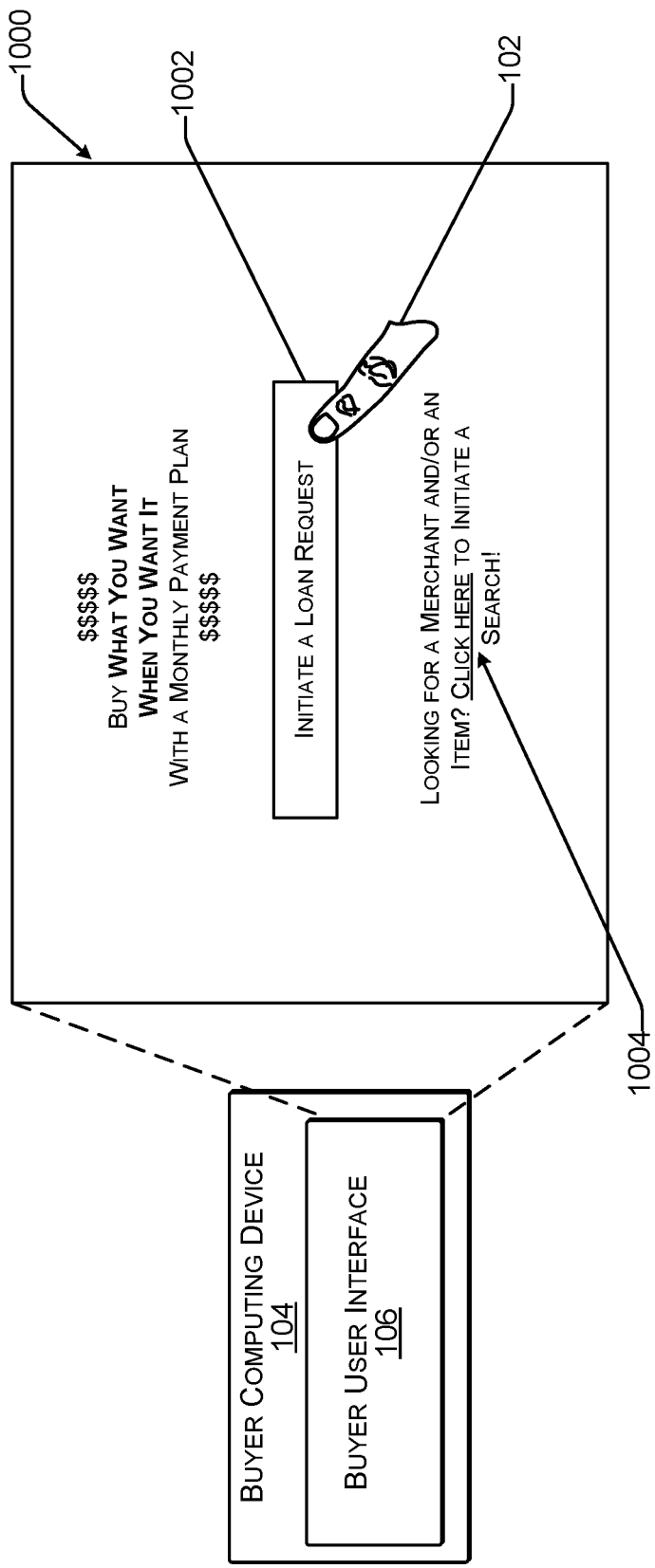
FIG. 10 illustrates an example graphical user interface (GUI) for requesting a loan.

FIG. 10 illustrates an example GUI 1000 for requesting a loan.

In at least one example, the buyer user interface 106 can present the GUI 1000 responsive to a request from the buyer 102 (e.g., by scanning a Quick Response (QR) code at a POS, via an Internet search, etc.). In additional or alternative examples, the buyer user interface 106 can present the GUI 1100 via the buyer computing device 116 based on an observed characteristic of the buyer 102, e.g., without an explicit or direct loan request from a buyer 102. For example, if the buyer 102 is proximate a merchant that offers loans for an item that the buyer 102 has previously purchased, viewed (e.g., online), etc. and/or an item that is related to an item that the buyer 102 has previously purchased, viewed (e.g., online), etc., the buyer user interface 106 can notify the buyer 102 of such information and prompt the buyer 102 to apply for a loan.

In some examples, the buyer 102 may know which merchant they desire to purchase an item from and/or which item. In such examples, the buyer 102 can actuate a selectable control 1002 to initiate a loan request. The buyer user interface 106 can send an indication of the actuation of the selectable control 1002 to the lending module 120 and the lending module 120 can initiate a loan application process.

In some examples, the buyer 102 may not be certain of the merchant for which they want to request a loan. In such examples, the buyer 102 can actuate a different selectable control 1004 to initiate a search for merchants and/or items (or item classifications, merchant category codes (MCCs), etc.) via a GUI, such as the GUI 1100 illustrated in FIG. 11. The buyer user interface 106 can send an indication of the actuation of the selectable control 1004 to the lending module 120 and the lending module 120 can cause a new GUI to be presented via the buyer user interface 106.

Figure 11:
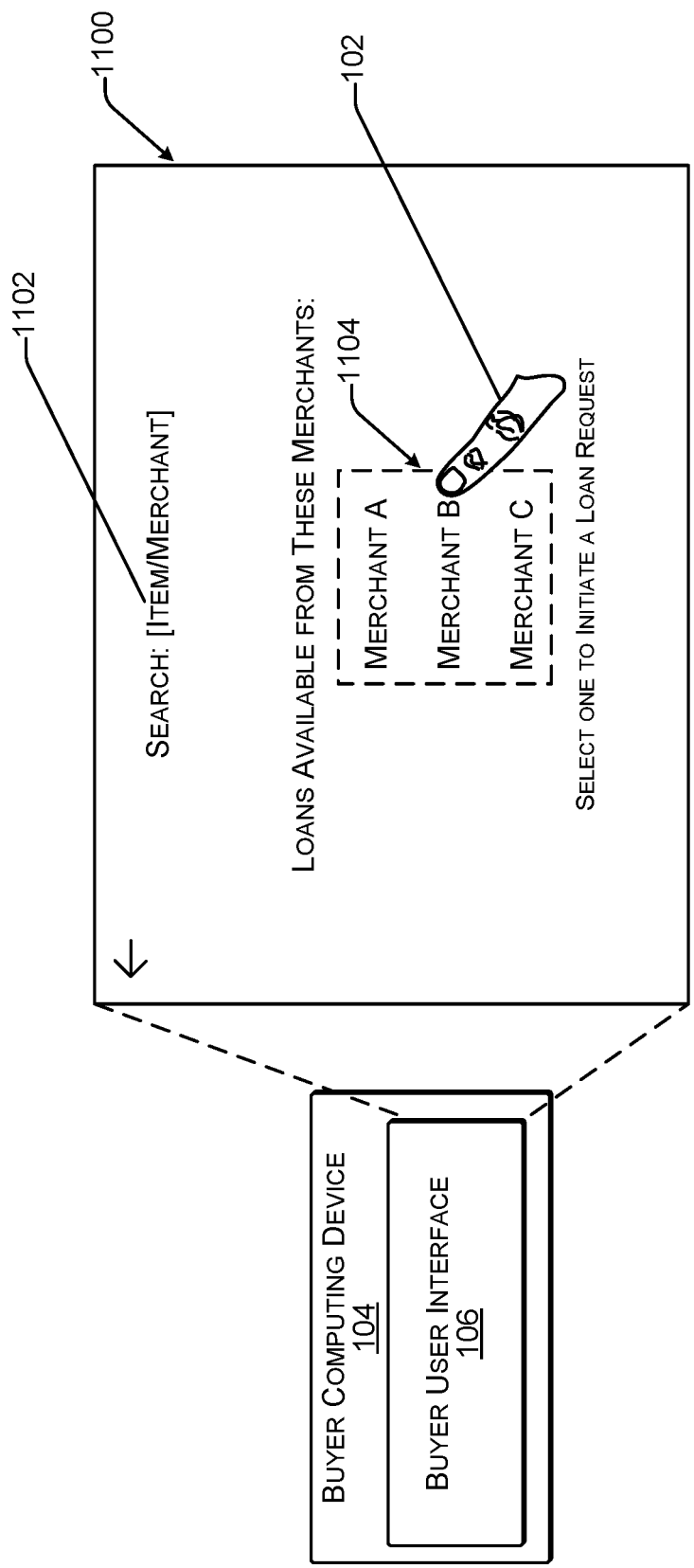
FIG. 11 illustrates an example GUI for requesting a loan via a search mechanism.

FIG. 11 illustrates an example GUI 1100 from which the buyer 102 can identify a merchant for which to request a loan. In some examples, the GUI 1100 is presented as part of an application process (e.g., responsive to the buyer 102 actuating a selectable control 1002 to request a loan). In additional or alternative examples, the GUI 1100 is presented responsive to the buyer 102 requesting the GUI 1100 (e.g., via another selectable control 1004 corresponding to a "search" function or the like).

In at least one example, the GUI 1100 can include a user interface element 1102 which prompts the buyer 102 to input an item, a category of items, a merchant, an MCC, a location, etc. Such an input can be a text input, a spoken input, an image, etc. Responsive to receiving an input, the buyer user interface 106 can submit a query to the server computing device(s) 116. The lending module 120 can receive the query, intelligently discover relevant results, and generate the results. For example, if the input is an item, the lending module 120 can perform a lookup, or other search, of the accounts 118 to identify merchants that (i) offer loans via the service provider and (ii) offer the item for sale, or even similar merchants that offer the same item or similar items. The lending module 120 can generate a list of one or more merchants that both (i) offer loans via the service provider and (ii) offer the item for sale. In some examples, the returned list can be associated with annual percentage rates (APRs) and/or other terms such that the buyer 102 can perform comparison shopping (e.g., for loans) across relevant merchants.

In some examples, the lending module 120 can utilize data stored in association with the accounts 118 to select a subset of the one or more merchants that are most relevant to the buyer 102 to return to the buyer 102 responsive to the query. That is, in at least one example, the lending module 120 can utilize a buyer characteristic (e.g., of the buyer 102 and/or similar buyers) to determine a subset of merchants that are relevant to a buyer 102. In at least one example, the lending module 120 can identify a subset of merchants that are in a particular geolocation of the buyer 102 or are within a threshold distance of the particular geolocation (determined based on a geolocation provided by the buyer 102 (e.g., shipping address, billing address, etc.) and/or as observed from previous transaction data associated with previous transactions of the buyer with merchants of the service provider), a subset of merchants that are within a particular price range (determined based on buyer spending patterns as determined from transaction data associated with previous transactions of the buyer with merchants of the service provider), have a particular rating (determined based on buyer patterns as determined from transaction data associated with previous transactions of the buyer with merchants of the service provider), etc. In some examples, the lending module 120 can rank merchants based on buyer characteristics and/or merchant characteristics, such that the most relevant merchants are presented to the buyer 102 prior to less relevant merchants being presented to the buyer 102. In some cases, the buyer may set preferences of APR rates, merchant locations, merchant, payment mechanisms, payment terms, etc., which may be used to determine relevance. The ranking can be used to aid selection of a loan offer from among several offers.

In at least one example, the lending module 120 can utilize machine-trained data models, statistics, or other processes for identifying relevant merchants and/or ranking merchants based on relevance. For example, a machine-learning mechanism can analyze training data (e.g., buyer data, POS transaction data, merchant data, etc.) to train a data model that outputs a score, or other indication, indicating a relevance of a merchant to a buyer. Such scores, or other indications, can be used to identify relevant merchants and/or subsets of relevant merchants (e.g., based on whether individual scores meet or exceed a threshold, etc.).

Additionally or alternatively, the buyer 102 can search for a particular merchant. That is, the input associated with the user interface element 1102 can be a merchant (instead of an item, as described above). In such an example, responsive to receiving an input, the buyer user interface 106 can submit a query to the server computing device(s) 116. The lending module 120 can receive the query and generate a result. For example, the lending module 120 can perform a lookup, or other search, of the accounts 118 to determine whether the inputted merchant (i) is associated with an account and (ii) offers loans via the service provider. If the merchant (i) is associated with an account and (ii) offers loans via the service provider, the lending module 120 can generate a result. In some examples, whether the merchant (i) is associated with an account and (ii) offers loans via the service provider, or not, the lending module 120 can generate a list of one or more additional merchants that are similar to the merchant, and (i) are associated with an account and (ii) offers loans via the service provider. A merchant may be similar to another merchant based on having a same (or related) MCC, selling the same (or similar) items, being in a same (or proximate) geolocation, etc. In at least one example, the lending module 120 can utilize machine-trained data models, statistics, or other processes to determine similar merchants. For example, a machine-learning mechanism can analyze training data (e.g., POS transaction data, merchant data, etc.) to train a data model that outputs a score, or other indication, indicating a similarity between merchants. Such scores, or other indications, can be used to identify similar merchants and/or subsets of similar merchants (e.g., based on whether individual scores meet or exceed a threshold, etc.).

As described above, in some example, the lending module 120 can utilize characteristic(s) of the buyer 102 to determine which merchant(s) to recommend to the buyer 102 and/or an order for recommending such merchants to the buyer 102.

The lending module 120 can generate a result and send the result back to the buyer user interface 106. The buyer user interface 106 can update the GUI 1100 to include user interface element(s) 1104 that represent the merchant(s) identified by the lending module 120. In some examples, each of the user interface element(s) 1104 can be associated with a selectable control, the actuation of which can comprise an input (or selection). The buyer 102 can interact with the GUI 1100 to select a merchant and the buyer user interface 106 can send an indication of the selection to the lending module 120. The lending module 120 can then use such information in determining whether the buyer 102 is qualified for a loan and/or the terms of the loan.

In at least one example, the selection of a merchant from the list of merchants presented can initiate a loan request. Then, similar to as described above, the buyer user interface 106 can communicate with the lending module 120 to facilitate a loan application.

In some examples, the lending module 120 can cause additional or alternative GUIs to be presented via the buyer user interface 106, which in some examples, can be overlays, pop-ups, or the like. In such examples, the additional or alternative GUIs can be presented to the buyer 102 to enable the buyer 102 to input information for obtaining a loan. That is, such additional or alternative GUIs can be presented as part of a loan application process. In at least one example, the server computing device(s) 116, via the lending module 120, can prompt the buyer 102 for information to determine whether the buyer 102 is qualified for the loan and/or buyer-specific terms. For instance, the buyer user interface 106 can present one or more GUIs to prompt the buyer 102 to provide personal information including, but not limited to, birthday, monthly housing costs, annual salary, Social Verification Number, etc.

In an example where the buyer 102 is associated with an account prior to requesting a new loan, the lending module 120 can perform a look-up, or other search, to access buyer-specific data associated with the buyer 102. In some examples, the lending module 120 can modify a generic application process based on information known about the buyer 102 (from information stored in the account of the buyer 102) such that a returning buyer 102 need not provide as much information as a buyer who is applying for a loan for the first time and/or who does not have an account with the service provider. For instance, in at least one example, if a buyer has already applied for a loan and/or has an account with the service provider, the lending module 120 can prompt the buyer 102 for information about a desired purchase (e.g., amount, etc.) and can cause one or more plans to be presented to the buyer 102, without requiring the buyer 102 to input personal information.

In at least one example, the lending module 120 can prompt the buyer 102 for information associated with a particular purchase. For instance, the lending module 120 can request the buyer 102 provide information including, but not limited to, particular item(s) for which the buyer 102 is requesting the loan, an amount for which the buyer is requesting to borrow, a merchant for which the buyer 102 is requesting the loan (e.g., a merchant where the buyer 102 intends to use the loan if not selected from the list presented), a combination of the forgoing, etc.

Responsive to receiving such information, the lending module 120 can analyze the request in view of the information receive, the accounts 118 (e.g., of the buyer 102 and/or the relevant merchant, buyers similar to the buyer, etc.) and one or more other lending risk signals (e.g., indicative of creditworthiness) to determine whether the buyer 102 qualifies for the loan and/or the terms of the loan. In at least one example, the lending module 120 can utilize machine-trained data models, statistics, or other processes for determining whether the buyer 102 is qualified for the loan and/or terms of the loan. That is, in some examples, the lending module 120 can determine custom terms for a particular buyer (e.g., buyer 102) based at least in part on buyer purchase behavior (e.g., of the buyer and/or of other similar buyers) and/or merchant POS information (e.g., of a particular merchant and/or of other similar merchants). In some examples, the lending module 120 can utilize past financing activity of the buyer (e.g., buyer 102) and/or similar buyers for determining whether the buyer 102 is qualified for the loan and/or terms of the loan.

In at least one example, the lending module 120 can cause multiple plans (e.g., loans and associated terms) to be presented to the buyer 102 (e.g., via the buyer user interface 106) and the buyer 102 can select one of the plans. Additional details associated with customizing financing based on transaction information is described in U.S. patent application Ser. No. 15/814,366, filed on Nov. 15, 2017, issued as U.S. Pat. No. 10,692,140 on Jun. 23, 2020, and the entire contents of which are incorporated by reference herein.

Figure 12:
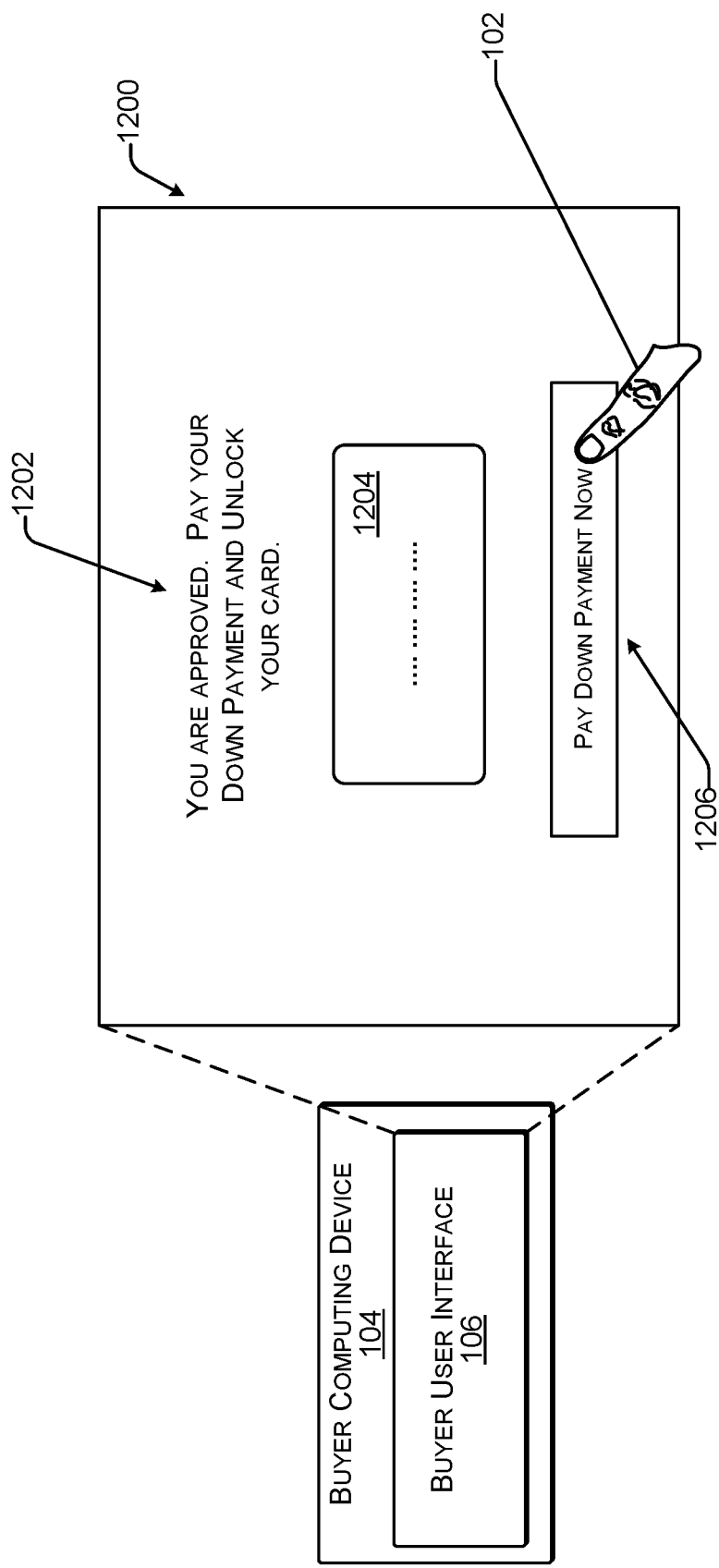
FIG. 12 illustrates an example GUI for presenting information associated with a conditional finance offer.

FIG. 12 illustrates an example GUI 1200 for presenting information associated with a conditional finance offer.

As described above, in at least one example, the lending module 120 can receive the request (e.g., via GUIs 1000 and/or 1100) and can determine whether the buyer 102 is qualified for a loan and/or terms of the loan. For instance, the lending module 120 can analyze the request in view of the accounts 118 (e.g., of the buyer 102 and/or the relevant merchant 110, buyers similar to the buyer 102, merchants similar to the merchant 110, etc.) and one or more other lending risk signals (e.g., indicative of creditworthiness) to determine whether the buyer 102 qualifies for the loan and/or the terms of the loan. Based at least in part on determining that the buyer 102 is qualified for the loan, and the terms of the loan, the lending module 120 can notify the buyer 102, such as via the GUI 1200.

In some examples, the lending module 120 can determine that the buyer 102 is qualified for a loan, but only if the buyer 102 satisfies one or more terms. That is, in at least one example, the lending module 120 can analyze the accounts 118 (e.g., of the buyer 102 and/or the relevant merchant 110, buyers similar to the buyer 102, merchants similar to the merchant 110, etc.) and one or more other lending risk signals (e.g., indicative of creditworthiness) to determine whether the buyer 102 requires a conditional finance offer and if so, the term(s) associated with the conditional finance offer. In at least one example, the lending module 120 can utilize machine-trained data models, statistics, or other processes for determining whether the buyer 102 requires a conditional finance offer and/or the term(s) of the conditional finance offer. That is, in some examples, the lending module 120 can determine custom terms for a particular buyer (e.g., buyer 102) based at least in part on buyer purchase behavior (e.g., of the buyer and/or of other, similar buyers) and/or merchant POS information (e.g., of a particular merchant and/or of other similar merchants). In some examples, the lending module 120 can utilize past financing activity of the buyer (e.g., buyer 102) and/or similar buyers for determining whether the buyer 102 requires a conditional finance offer and/or the term(s) of the conditional finance offer. Furthermore, in some examples, the lending module 120 can utilize future transaction activity (e.g., item(s) and/or merchant(s) with which the buyer 102 intends to transact with) for determining whether the buyer 102 requires a conditional finance offer and/or the term(s) of the conditional finance offer. The lending module 120 can thus determine an amount of a down payment term (if required), a number of security questions that the buyer 102 is required to answer for identity verification (if required), a number of users that buyer 102 is required to interact with for identity verification (if required), and so on based at least in part on machine-trained data models and so forth.

In at least one example, responsive to determining term(s) of the conditional finance offer for the buyer 102, the lending module 120 can present the conditional finance offer to the buyer 102.

As illustrated in FIG. 12, the GUI 1200 can include GUI elements 1202 to notify the buyer 102 that the buyer 102 is approved for a loan and can indicate that the buyer 102 is required to provide payment information to satisfy a down payment term before the loan is issued. In at least one example, the conditional finance offer can be associated with a digital payment instrument 1204, as described above. In such an example, the digital payment instrument 1204 can be presented via the GUI 1200 but the digital payment instrument 1204 can be missing the card number and/or other payment information, or otherwise have the information redacted. The card number and/or other payment information may be provided conditional on the buyer 102 providing payment information to satisfy the down payment. The GUI 1200 can additionally include a selectable control 1206 that, when actuated, can prompt the buyer 102 to input payment information associated with a source of funds for paying the down payment (and thus satisfying the down payment term of the conditional finance offer).

In at least one example, if the lending module 120 determines that a buyer 102 requires a down payment before issuing a loan, the lending module 120 can flag, or otherwise indicate, such in an account of the buyer 102 (e.g., in the account(s) 118). As such, when the buyer 102 requests to activate their payment instrument, the lending module 120 can cause the GUI 1200 to be presented via the buyer user interface 106. That is, not all buyers requesting loans will be presented with the GUI 1200. In contrast, only buyers that the lending module 120 has determined require down payments will be presented with the GUI 1200.

In some examples, the GUI 1200 can be a pop up, an overlay, or any other GUI that is presented on top of another GUI associated with the loan application process. That is, in such examples, the presentation of the GUI 1200 can indicate to the buyer 102 that they cannot complete any subsequent steps of the loan application process without providing their payment information to satisfy the down payment term of their conditional finance offer.

In an example where a term of a conditional finance offer is a verification term, a GUI similar to the GUI 1200 can be presented to the buyer 102. After the buyer 102 answers questions presented via the GUI and/or otherwise satisfies the verification term, the lending module 120 can activate the payment instrument.

Figure 13:
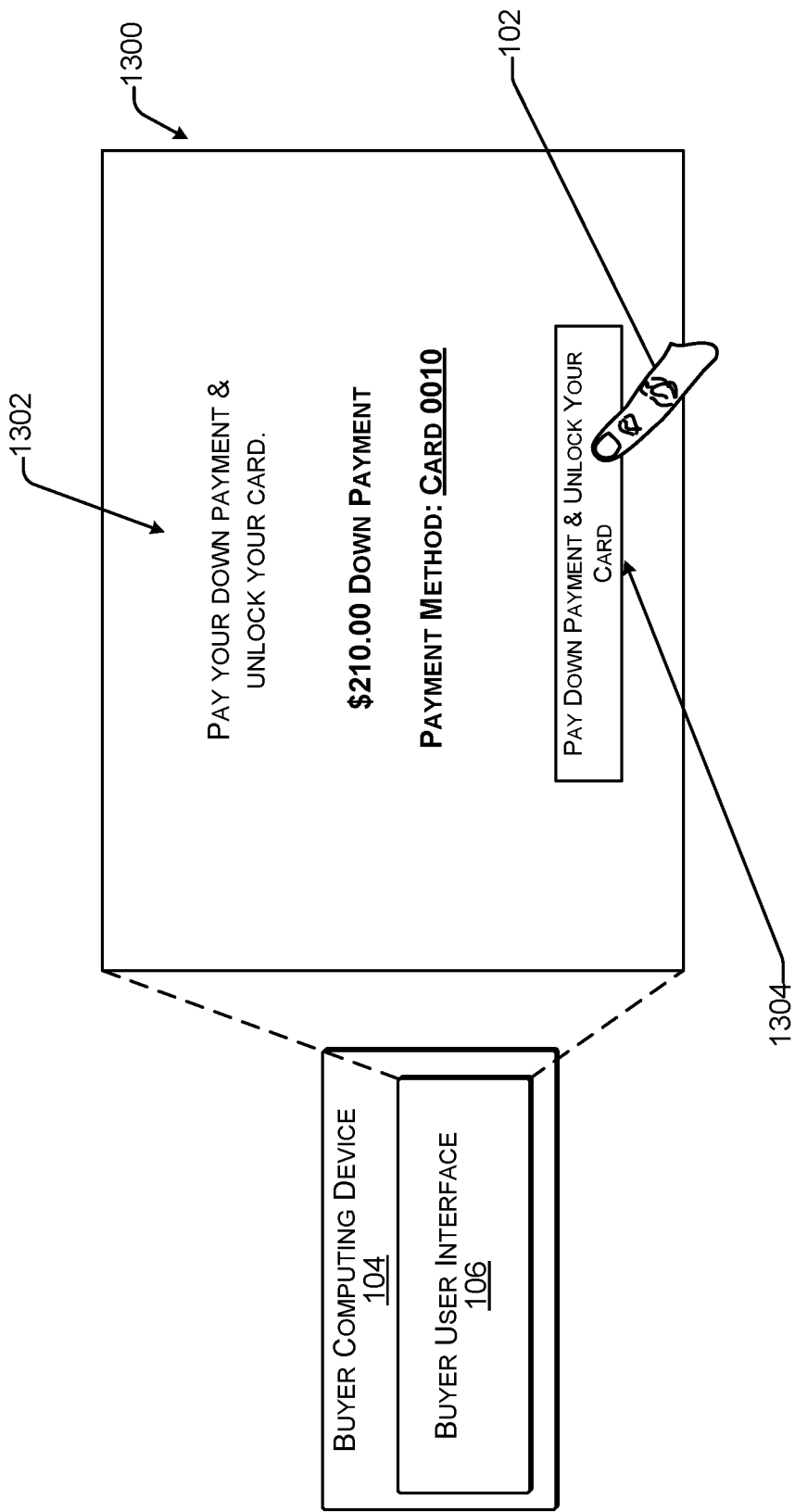
FIG. 13 illustrates an example GUI for prompting a buyer to input payment information to activate a finance offer.

FIG. 13 illustrates an example GUI 1300 for prompting a buyer to input payment information to activate a finance offer. The GUI 1300 can include one or more GUI elements 1302 that present information to the buyer 102, such as an amount of the down payment (e.g., $210.00) and a prompt for the buyer 102 to enter payment information associated with a source of funds for paying the down payment. As described above, the amount of the down payment can be determined based on characteristic(s) of the buyer 102, characteristic(s) of the merchant 110, item(s) to be purchased, and so on. The buyer 102 can input the payment information and can actuate a selectable control 1304 to submit the payment information to pay the down payment. The buyer user interface 106 can securely transmit the payment information to the lending module 120. In some examples, the lending module 120 (e.g., via the payment processing module 128) can send an authorization request to authorize the payment information at the time it is received. In other examples, the lending module 120 can refrain from sending the payment information until a later time, such as at the POS.

Figure 14:
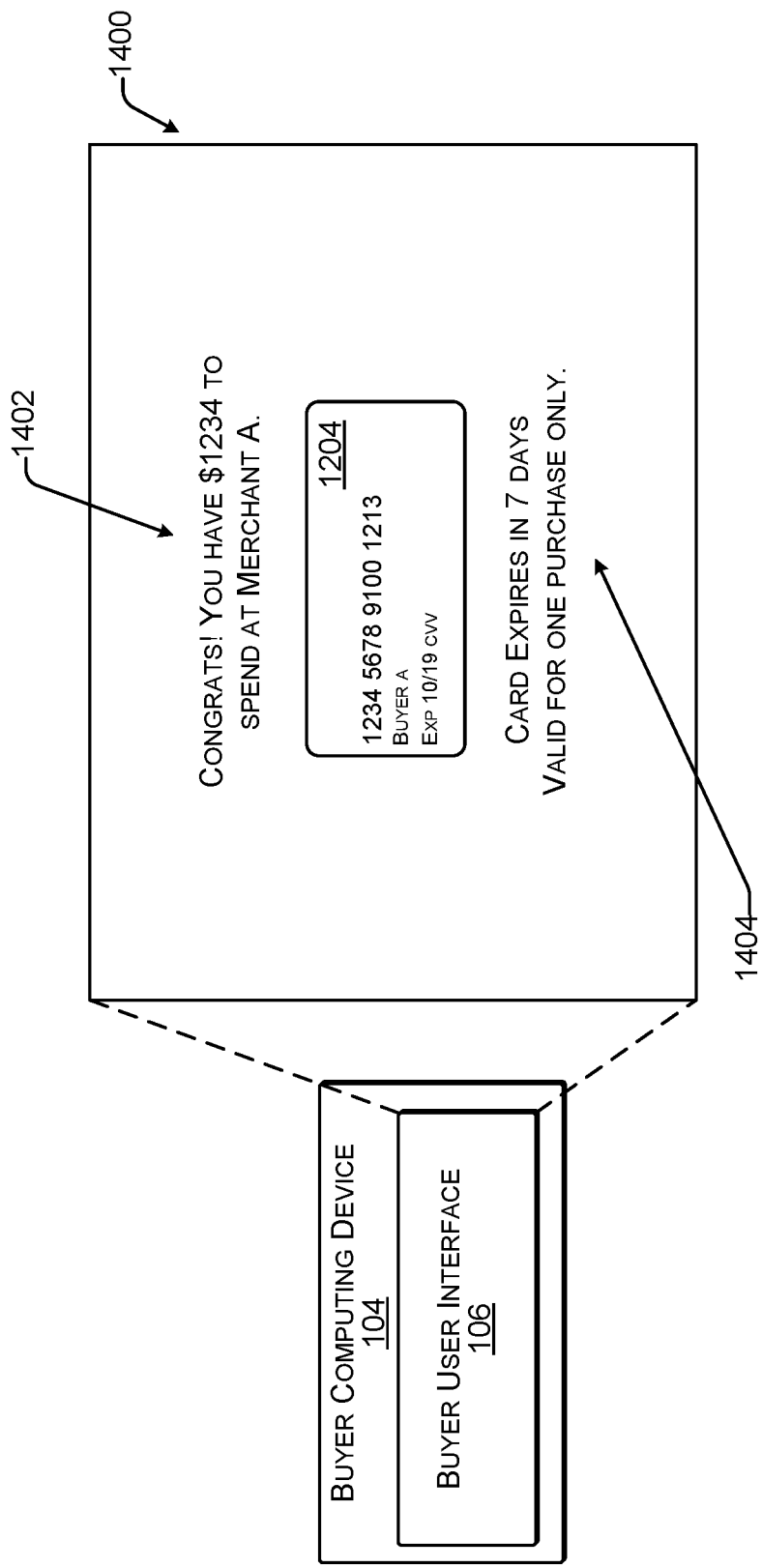
FIG. 14 illustrates an example GUI for presenting information associated with a conditional finance offer that has been activated.

FIG. 14 illustrates an example GUI 1400 for presenting information associated with a conditional finance offer that has been activated. In at least one example, responsive to receiving the payment information to satisfy the down payment term of the conditional finance offer, the lending module 120 can cause the buyer user interface 106 to present the GUI 1400, which notifies the buyer 102 that the buyer 102 has a loan of a particular amount (e.g., $1234) to spend at a particular merchant (e.g., Merchant A) via one or more GUI elements 1402. As described above with reference to FIG. 12, the conditional finance offer can be associated with a digital payment instrument 1204. Now that the buyer 102 has provided payment information to satisfy the down payment term of the conditional finance offer, the card number and/or other payment information is presented in association with the digital payment instrument 1204. As such, the buyer 102 can present the digital payment instrument 1204 and/or the card number and/or other payment information at the POS. The merchant 110 can input the card number and/or other payment information via the merchant user interface 114 and/or receive the card number and/or other payment information via a payment reader associated with the merchant device 112. The merchant user interface 114 can provide the card number and/or other payment information to the lending module 120 for generating the corresponding loan and/or processing payment for a transaction between the buyer 102 and the merchant 110.

The GUI 1400 can include additional GUI elements 1404 that present additional or alternative information to the buyer 102, such as the amount of time that the digital payment instrument 1204 is valid, how the digital payment instrument 1204 can be used, and so on.

In some examples, the conditional finance offer can additionally or alternatively be associated with a physical payment instrument. In at least one example, the physical payment instrument can correspond to the digital payment instrument 1204. In at least one example, responsive to the buyer 102 providing the payment information for satisfying the down payment term of the conditional finance offer, the physical payment instrument can be sent to the buyer 102 (if it is not already in the possession of the buyer 102). If the physical payment instrument is already in the possession of the buyer 102, an account associated with the physical payment instrument can be flagged or otherwise associated with an indication of the conditional finance offer (and terms associated therewith) responsive to the lending module 120 to receiving the payment information to satisfy the down payment term of the conditional finance offer. In at least one example, the account can be associated with the stored balance maintained by the service provider, as described above.

FIGS. 10-14 are non-limiting examples of GUIs that can be presented via the buyer user interface 106. In additional or alternative examples, additional or alternative information can be presented via the GUIs in similar or different configurations. "GUI elements" as described herein can be text elements, image elements, and the like that can offer a visual language to represent information to be communicated to the buyer 102. As described above, the GUIs described with reference to FIGS. 10-14 can be presented via a display of a buyer computing device (e.g., the buyer computing device 104) and/or can be output via another output device (e.g., a buyer-facing display of merchant computing device(s) 112, etc.). In some examples, the GUIs described above in FIGS. 10-14 can be presented via the merchant user interface 114 and/or via a combination of the buyer user interface 106 and the merchant user interface 114. For instance, in at least one example, the GUIs can be presented via the merchant user interface 114 and may be sent to the buyer computing device 104 (e.g., as a copy) upon completion. Additionally or alternatively, some GUIs can be presented on the buyer user interface 106 and other GUIs can be presented on the merchant user interface 114.

Figure 15:
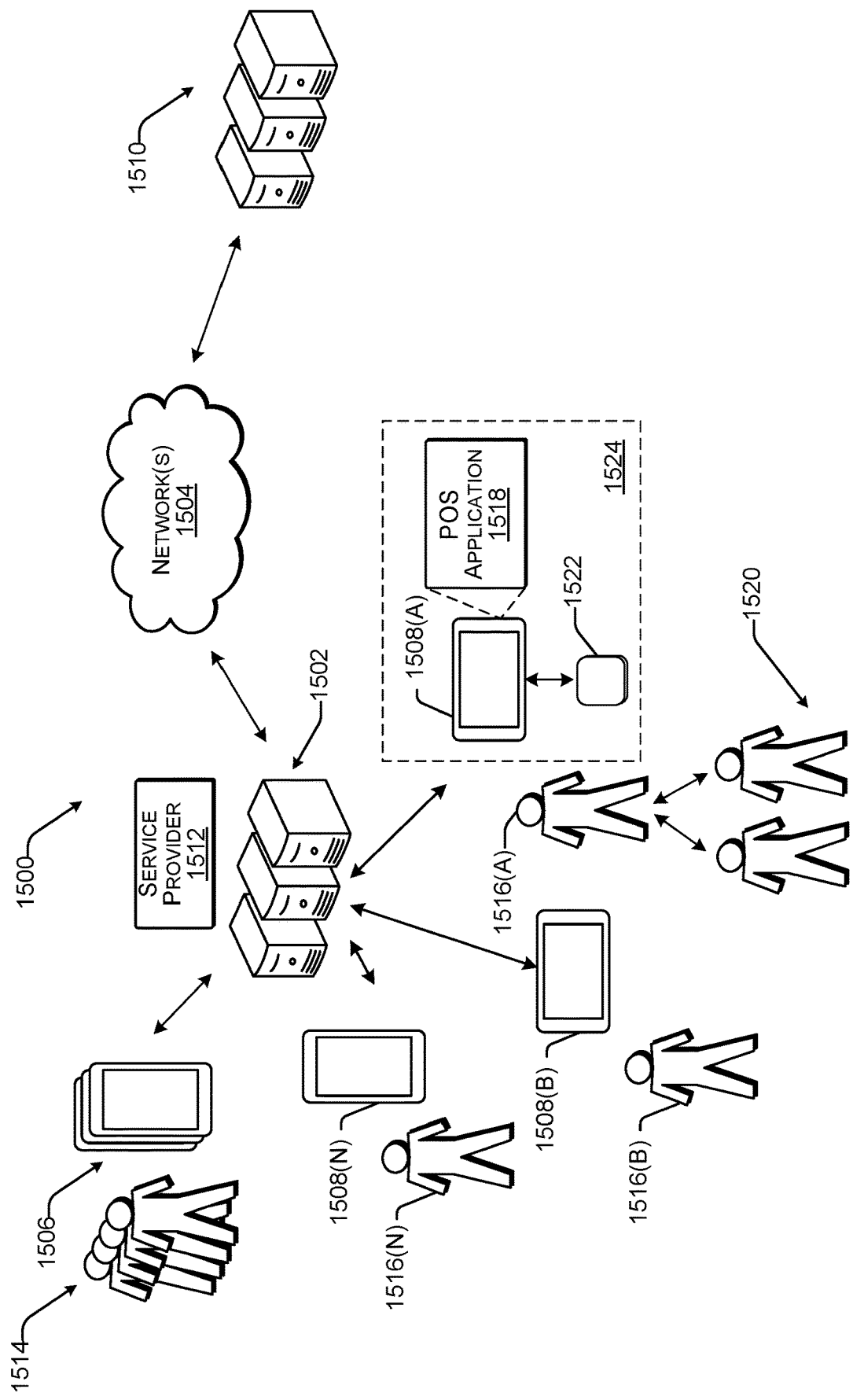
FIG. 15 illustrates an example environment.

FIG. 15 illustrates an example environment 1500. The environment 1500 includes server computing device(s) 1502 that can communicate over a network 1504 with user devices 1506 (which, in some examples can be merchant devices 1508 (individually, 1508(A)-1508(N))) and/or server computing device(s) 1510 associated with third-party service provider(s). The server computing device(s) 1502 can be associated with a service provider 1512 that can provide one or more services for the benefit of users 1514, as described below. Actions attributed to the service provider 1512 can be performed by the server computing device(s) 1502.

The environment 1500 can include a plurality of user devices 1506, as described above. Each one of the plurality of user devices 1506 can be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. In some examples, individual ones of the user devices can be operable by users 1514. The users 1514 can be referred to as customers, buyers, merchants, sellers, borrowers, employees, employers, payor, payee, and so on. The users 1514 can interact with the user devices 1506 via user interfaces presented via the user devices 1506. In at least one example, a user interface can be presented via a web browser, or the like. In other examples, a user interface can be presented via an application, such as a mobile application or desktop application, which can be provided by the service provider 1512 or which can be an otherwise dedicated application. In at least one example, a user 1514 can interact with the user interface via touch input, spoken input, or any other type of input.

As described above, in at least one example, the users 1514 can include merchants 1516 (individually, 1516(A)-1516(N)). In an example, the merchants 1516 can operate respective merchant devices 1508, which can be user devices 1506 configured for use by merchants 1516. For the purpose of this discussion, a "merchant" can be any entity that offers items (e.g., goods or services) for purchase or other means of acquisition (e.g., rent, borrow, barter, etc.). The merchants 1516 can offer items for purchase or other means of acquisition via brick-and-mortar stores, mobile stores (e.g., pop-up shops, food trucks, etc.), online stores, combinations of the foregoing, and so forth. In some examples, at least some of the merchants 1516 can be associated with a same entity but can have different merchant locations and/or can have franchise/franchisee relationships. In additional or alternative examples, the merchants 1516 can be different merchants. That is, in at least one example, the merchant 1516(A) is a different merchant than the merchant 1516(B) and/or the merchant 1516(C).

For the purpose of this discussion, "different merchants" can refer to two or more unrelated merchants. "Different merchants" therefore can refer to two or more merchants that are different legal entities that do not share accounting, employees, branding, etc. "Different merchants," as used herein, have different names, employer identification numbers (EIN)s, lines of business (in some examples), inventories (or at least portions thereof), and/or the like. That is, the use of the term "different merchants" does not refer to a merchant with various merchant locations or franchise/franchisee relationships.

Each merchant device 1508 can have an instance of a POS application 1518 stored thereon. The POS application 1518 can configure the merchant device 1508 as a POS terminal, which enables the merchant 1516(A) to interact with one or more customers 1520. As described above, the users 1514 can include customers, such as the customers 1520 shown as interacting with the merchant 1516(A). For the purpose of this discussion, a "customer" can be any entity that acquires items from merchants. While only two customers 1520 are illustrated in FIG. 15, any number of customers 1520 can interact with the merchants 1516. Further, while FIG. 15 illustrates the customers 1520 interacting with the merchant 1516(A), the customers 1520 can interact with any of the merchants 1516.

In at least one example, interactions between the customers 1520 and the merchants 1516 that involve the exchange of funds (from the customers 1520) for items (from the merchants 1516) can be referred to as "POS transactions" and/or "transactions." In at least one example, the POS application 1518 can determine transaction data associated with the POS transactions. Transaction data can include payment information, which can be obtained from a reader device 1522 associated with the merchant device 1508(A), user authentication data, purchase amount information, point-of-purchase information (e.g., item(s) purchased, date of purchase, time of purchase, etc.), etc. The POS application 1518 can send transaction data to the server computing device(s) 1502. Furthermore, the POS application 1518 can present a UI to enable the merchant 1516(A) to interact with the POS application 1518 and/or the service provider 1512 via the POS application 1518.

In at least one example, the merchant device 1508(A) can be a special-purpose computing device configured as a POS terminal (via the execution of the POS application 1518). In at least one example, the POS terminal may be connected to a reader device 1522, which is capable of accepting a variety of payment instruments, such as credit cards, debit cards, gift cards, short-range communication based payment instruments, and the like, as described below. In some examples, the reader device 1522 can read information from alternative payment instruments including, but not limited to, wristbands and the like.

The POS terminal can be paired with a reader device 1522 to comprise a POS system 1524. The reader device 1522 may physically interact with payment instruments such as magnetic stripe payment cards, EMV payment cards, and/or short-range communication (e.g., near field communication (NFC), radio frequency identification (RFID), Bluetooth®, Bluetooth® low energy (BLE), etc.) payment instruments. The POS terminal may provide a rich user interface, communicate with the reader device 1522, and communicate with the server computing device(s) 1502, which can provide, among other services, a payment processing service. The service provider 1512 can communicate with server computing device(s) 1510, as described below. In this manner, the POS terminal and reader device 1522 may collectively process transaction(s) between the merchants 1516 and customers 1520. In some examples, POS terminals and reader devices can be configured in one-to-one pairings. In other examples, the POS terminals and reader devices can be configured in many-to-one pairings (e.g., one POS terminal coupled to multiple reader devices or multiple POS terminals coupled to one reader device).

While, the POS terminal and the reader device 1522 of the POS system 1524 are shown as separate devices, in additional or alternative examples, the POS terminal and the reader device 1522 can be part of a single device. In some examples, the reader device 1522 can have a display integrated therein for presenting information to the customers 1520. In additional or alternative examples, the POS terminal can have a display integrated therein for presenting information to the customers 1520. POS systems, such as the POS system 1524, may be mobile, such that POS terminals and reader devices may process transactions in disparate locations across the world. POS systems can be used for processing card-present transactions and card-not-present (CNP) transactions, as described below.

A card-present transaction is a transaction where both a customer 1520 and his or her payment instrument are physically present at the time of the transaction. Card-present transactions may be processed by swipes, dips, taps, or any other interaction between a physical payment instrument (e.g., a card) and a reader device 1522 whereby the reader device 1522 is able to obtain payment data from the payment instrument. A swipe is a card-present transaction where a customer 1520 slides a card, or other payment instrument, having a magnetic strip through a reader device 1522 that captures payment data contained in the magnetic strip. A dip is a card-present transaction where a customer 1520 inserts a payment instrument having an embedded microchip (i.e., chip) into a reader device 1522 first. The dipped payment instrument remains in the payment reader until the reader device 1522 prompts the customer 1520 to remove the card, or other payment instrument. While the payment instrument is in the reader device 1522, the microchip can create a one-time code which is sent from the POS system 1524 to the server computing device(s) 1510 (which can be associated with third-party service providers that provide payment services, including but not limited to, an acquirer bank, an issuer, and/or a card payment network (e.g., Mastercard®, VISA®, etc.)) to be matched with an identical one-time code. A tap is a card-present transaction where a customer 1520 may tap or hover his or her payment instrument (e.g., card, electronic device such as a smart phone running a payment application, etc.) over a reader device 1522 to complete a transaction via short-range communication (e.g., NFC, RFID, Bluetooth®, BLE, etc.). Short-range communication enables the payment instrument to exchange information with the reader device 1522. A tap may also be called a contactless payment.

A CNP transaction is a transaction where a card, or other payment instrument, are not physically present at the POS such that payment data is required to be manually keyed in (e.g., by a merchant, customer, etc.), or payment data is required to be recalled from a card-on-file data store, to complete the transaction.

The POS system 1524, the server computing device(s) 1502, and/or the server computing device(s) 1510 may exchange payment information and transaction data to determine whether transactions are authorized. For example, the POS system 120 may provide encrypted payment data, user authentication data, purchase amount information, point-of-purchase information, etc. (collectively, transaction data) to server computing device(s) 1502 over the network(s) 1504. The server computing device(s) 1502 may send the transaction data to the server computing device(s) 1510. As described above, in at least one example, the server computing device(s) 1510 can be associated with third-party service providers that provide payment services, including but not limited to, an acquirer bank, an issuer, and/or a card payment network (e.g., Mastercard®, VISA®, etc.)

For the purpose of this discussion, the "payment service providers" can be acquiring banks ("acquirer"), issuing banks ("issuer"), card payment networks, and the like. In an example, an acquirer is a bank or financial institution that processes payments (e.g., credit or debit card payments) and can assume risk on behalf of merchants(s). An acquirer can be a registered member of a card association (e.g., Visa®, MasterCard®), and can be part of a card payment network. The acquirer (e.g., the server computing device(s) 1510 associated therewith) can send a fund transfer request to a server computing device of a card payment network (e.g., Mastercard®, VISA®, etc.) to determine whether the transaction is authorized or deficient. In at least one example, the service provider 1512 can serve as an acquirer and connect directly with the card payment network.

The card payment network (e.g., the server computing device(s) 1510 associated therewith) can forward the fund transfer request to an issuing bank (e.g., "issuer"). The issuer is a bank or financial institution that offers a financial account (e.g., credit or debit card account) to a user. An issuer can issue payment cards to users and can pay acquirers for purchases made by cardholders to which the issuing bank has issued a payment card. The issuer (e.g., the server computing device(s) 1510 associated therewith) can make a determination as to whether the customer has the capacity to absorb the relevant charge associated with the payment transaction. In at least one example, the service provider 1512 can serve as an issuer and/or can partner with an issuer. The transaction is either approved or rejected by the issuer and/or the card payment network (e.g., the server computing device(s) 1510 associated therewith), and a payment authorization message is communicated from the issuer to the POS device via a path opposite of that described above, or via an alternate path.

As described above, the server computing device(s) 1510, which can be associated with payment service provider(s), may determine whether the transaction is authorized based on the transaction data, as well as information relating to parties to the transaction (e.g., the customer 1520 and/or the merchant 1516(A)). The server computing device(s) 1510 may send an authorization notification over the network(s) 1504 to the server computing device(s) 1502, which may send the authorization notification to the POS system 1524 over the network(s) 1504 to indicate whether the transaction is authorized. The server computing device(s) 1502 may also transmit additional information such as transaction identifiers to the POS system 1524. In one example, the server computing device(s) 1502 may include a merchant application and/or other functional components for communicating with the POS system 1524 and/or the server computing device(s) 1510 to authorize or decline transactions.

Based on the authentication notification that is received by the POS system 1524 from server computing device(s) 1510, the merchant 1516(A) may indicate to the customer 1520 whether the transaction has been approved. In some examples, approval may be indicated at the POS system 1524, for example, at a display of the POS system 1524. In other examples, such as with a smart phone or watch operating as a short-range communication payment instrument, information about the approved transaction may be provided to the short-range communication payment instrument for presentation via a display of the smart phone or watch. In some examples, additional or alternative information can additionally be presented with the approved transaction notification including, but not limited to, receipts, special offers, coupons, or loyalty program information.

As mentioned above, the service provider 1512 can provide, among other services, payment processing services, inventory management services, catalog management services, business banking services, financing services, web-development services, payroll services, employee management services, appointment services, restaurant management services, order management services, delivery services, peer-to-peer payment services, onboarding services, identity verification (IDV) services, and so on. In some examples, the users 1514 can access all of the services of the service provider 1512. In other examples, the users 1514 can have gradated access to the services, which can be based on risk tolerance, IDV outputs, subscriptions, and so on. In at least one example, access to such services can be availed to the merchants 1516 via the POS application 1518. In additional or alternative examples, each service can be associated with its own access point (e.g., application, web browser, etc.).

The service provider 1512 can offer payment processing services for processing payments on behalf of the merchants 1516, as described above. For example, the service provider 1512 can provision payment processing software, payment processing hardware and/or payment processing services to merchants 1516, as described above, to enable the merchants 1516 to receive payments from the customers 1520 when conducting POS transactions with the customers 1520. For instance, the service provider 1512 can enable the merchants 1516 to receive cash payments, payment card payments, and/or electronic payments from customers 1520 for POS transactions and the service provider 1512 can process transactions on behalf of the merchants 1516.

As the service provider 1512 processes transactions on behalf of the merchants 1516, the service provider 1512 can maintain accounts or balances for the merchants 1516 in one or more ledgers. For example, the service provider 1512 can analyze transaction data received for a transaction to determine an amount of funds owed to a merchant 1516(A) for the transaction. In at least one example, such an amount can be a total purchase price less fees charged by the service provider 1512 for providing the payment processing services. Based on determining the amount of funds owed to the merchant 1516(A), the service provider 1512 can deposit funds into an account of the merchant 1516(A). The account can have a stored balance, which can be managed by the service provider 1512. The account can be different from a conventional bank account at least because the stored balance is managed by a ledger of the service provider 1512 and the associated funds are accessible via various withdrawal channels including, but not limited to, scheduled deposit, same-day deposit, instant deposit, and a linked payment instrument.

A scheduled deposit can occur when the service provider 1512 transfers funds associated with a stored balance of the merchant 1516(A) to a bank account of the merchant 1516(A) that is held at a bank or other financial institution (e.g., associated with the server computing device(s) 1510). Scheduled deposits can occur at a prearranged time after a POS transaction is funded, which can be a business day after the POS transaction occurred, or sooner or later. In some examples, the merchant 1516(A) can access funds prior to a scheduled deposit. For instance, the merchant 1516(A) may have access to same-day deposits (e.g., wherein the service provider 1512 deposits funds from the stored balance to a linked bank account of the merchant on a same day as POS transaction, in some examples prior to the POS transaction being funded) or instant deposits (e.g., wherein the service provider 1512 deposits funds from the stored balance to a linked bank account of the merchant on demand, such as responsive to a request). Further, in at least one example, the merchant 1516(A) can have a payment instrument that is linked to the stored balance that enables the merchant to access the funds without first transferring the funds from the account managed by the service provider 1512 to the bank account of the merchant 1516(A).

In at least one example, the service provider 1512 may provide inventory management services. That is, the service provider 1512 may provide inventory tracking and reporting. Inventory management services may enable the merchant 1516(A) to access and manage a database storing data associated with a quantity of each item that the merchant 1516(A) has available (i.e., an inventory). Furthermore, in at least one example, the service provider 1512 can provide catalog management services to enable the merchant 1516(A) to maintain a catalog, which can be a database storing data associated with items that the merchant 1516(A) has available for acquisition (i.e., catalog management services). In at least one example, the catalog may include a plurality of data items and a data item of the plurality of data items may represent an item that the merchant 1561(A) has available for acquisition.

In at least one example, the service provider 1512 can provide business banking services, which allow the merchant 1516(A) to track deposits (from payment processing and/or other sources of funds) into an account of the merchant 1516(A), payroll payments from the account (e.g., payments to employees of the merchant 1516(A)), payments to other merchants (e.g., business-to-business) directly from the account or from a linked debit card, withdrawals made via scheduled deposit and/or instant deposit, etc. Furthermore, the business banking services can enable the merchant 1516(A) to check how much money they are earning (e.g., via presentation of available earned balance), understand where their money is going (e.g., via deposit reports (which can include a breakdown of fees), spend reports, etc.), access/use earned money (e.g., via scheduled deposit, instant deposit, linked payment instrument, etc.), feel in control of their money (e.g., via management of deposit schedule, deposit speed, linked instruments, etc.), etc. Moreover, the business banking services can enable the merchants 1516 to visualize their cash flow to track their financial health, set aside money for upcoming obligations (e.g., savings), organize money around goals, etc.

In at least one example, the service provider 1512 can provide financing services and products, such as via business loans, consumer loans, fixed term loans, flexible term loans, and the like. In at least one example, the service provider 1512 can utilize one or more risk signals to determine whether to extend financing offers and/or terms associated with such financing offers.

In at least one example, the service provider 1512 can provide financing services for offering and/or lending a loan to a borrower that is to be used for, in some instances, financing the borrower's short-term operational needs (e.g., a capital loan). For instance, a potential borrower that is a merchant can obtain a capital loan via a capital loan product in order to finance various operational costs (e.g., rent, payroll, inventory, etc.). In at least one example, the service provider 1512 can offer different types of capital loan products. For instance, in at least one example, the service provider 1512 can offer a daily repayment loan product, wherein a capital loan is repaid daily, for instance, from a portion of transactions processed by the payment processing service on behalf of the borrower. Additionally and/or alternatively, the service provider 1512 can offer a monthly repayment loan product, wherein a capital loan is repaid monthly, for instance, via a debit from a bank account linked to the payment processing service.

Additionally or alternatively, the service provider 1512 can provide financing services for offering and/or lending a loan to a borrower that is to be used for, in some instances, financing the borrower's consumer purchase (e.g., a consumer loan). In at least one example, a borrower can submit a request for a loan to enable the borrower to purchase an item from a merchant, which can be one of the merchants 1516. The service provider 1512 can generate the loan based at least in part on determining that the borrower purchased or intends to purchase the item from the merchant. The loan can be associated with a balance based on an actual purchase price of the item and the borrower can repay the loan overtime. In some examples, the borrower can repay the loan via installments, which can be paid via a stored balance associated with the service provider 1512. The service provider 1512 can offer specific financial products, such as payment instruments, tied specifically to the loan products. For example, in one implementation, the server provider 1512 associate capital to a merchant or customer's debit card, where the use of the debit card is defined by the terms of the loan. In some examples, the merchant may only use the debit card for making specific purchases. In other examples, the "installment" associated with the loan product is credited directly via the payment instrument. The payment instrument is thus customized to the loan and/or the parties associated with the loan.

The service provider 1512 can provide web-development services, which enable users 1514 who are unfamiliar with HTML, XML, Javascript, CSS, or other web design tools to create and maintain professional and aesthetically pleasing websites. Some of these web page editing applications allow users to build a web page and/or modify a web page (e.g., change, add, or remove content associated with a web page). Further, in addition to websites, the web-development services can create and maintain other online omni-channel presence, such as social media posts for example.

Furthermore, the service provider 1512 can provide payroll services to enable employers to pay employees for work performed on behalf of employers. In at least one example, the service provider 1512 can receive data that includes time worked by an employee, sales made by the employee, gratuities received by the employee, and so forth. Based on such data, the service provider 1512 can make payroll payments to employee(s) on behalf of an employer via the payroll service. For instance, the service provider 1512 can facilitate the transfer of a total amount to be paid out for the payroll of an employee from the bank of the employer to the bank of the service provider 1512 to be used to make payroll payments. In at least one example, when the funds have been received at the bank of the service provider 1512, the service provider 1512 can pay the employee, such as by check or direct deposit, often a day, a week, or more after when the work was actually performed by the employee. In additional or alternative examples, the service provider 1512 can enable employee(s) to receive payments via same-day or instant deposit based at least in part on risk and/or reliability analyses performed by the service provider 1512.

Moreover, in at least one example, the service provider 1512 can provide employee management services for managing schedules of employees. Further, the service provider 1512 can provide appointment services for enabling users 1514 to set schedules for scheduling appointments and/or users 1514 to schedule appointments.

In some examples, the service provider 1512 can provide restaurant management services to enable users 1514 to make and/or manage reservations, to monitor front-of-house and/or back-of-house operations, and so on. In at least one example, the service provider 1512 can provide order management services and/or delivery services to enable restaurants to manage open tickets, split tickets, and so on and/or manage delivery services. In some examples, such services can be associated with restaurant merchants, as described above. In additional or alternative examples, such services can be any type of merchant.

In at least one example, the service provider 1512 can provide a peer-to-peer payment service that enables peer-to-peer payments between two or more users 1514. In at least one example, the service provider 1512 can communicate with instances of a payment application (or other access point) installed on devices 1506 configured for operation by users 1514. In an example, an instance of the payment application executing on a first device operated by a payor can send a request to the service provider 1512 to transfer an amount of funds (e.g., fiat currency or non-fiat currency such as cryptocurrency, securities, and related assets) from an account of the payor to an account of a payee (e.g., a peer-to-peer payment). The service provider 1512 can facilitate the transfer and can send a notification to an instance of the payment application executing on a second mobile device operated by the payee that the transfer is in process (or has been completed). In some examples, the service provider 1512 can send additional or alternative information to the instances of the payment application (e.g., low balance to the payor, current balance to the payor or the payee, etc.). In some examples, the payor can transfer funds to the payee unprompted. In other examples, the payee can send a request for funds to the payor prior to the payor initiating the transfer of funds. The funds transferred can be associated with any digital currency type, including, but not limited to, cash, cryptocurrency, etc.

In at least one example, a user 1514 may be new to the service provider 1512 such that the user 1514 that has not registered (e.g., subscribed to receive access to one or more services offered by the service provider) with the service provider 1512. The service provider 1512 can offer onboarding services for registering a potential user 1514 with the service provider 1512. In some examples, onboarding can involve presenting various questions, prompts, and the like to a potential user 1514 to obtain information that can be used to generate a profile for the potential user 1514. Responsive to the potential user 1514 providing all necessary information, the potential user 1514 can be onboarded to the service provider 1512.

The service provider 1512 can be associated with IDV services, which can be used by the service provider 1512 for compliance purposes and/or can be offered as a service, for instance to third-party service providers (e.g., associated with the server computing device(s) 1510). That is, the service provider 1512 can offer IDV services to verify the identity of users 1514 seeking to use or using their services. Identity verification requires a customer (or potential customer) to provide information that is used by compliance departments to prove that the information is associated with an identity of a real person or entity. In at least one example, the service provider 1512 can perform services for determining whether identifying information provided by a user 1514 accurately identifies the customer (or potential customer) (i.e., Is the customer who they say they are?).

The service provider 1512 is capable of providing additional or alternative services and the services described above are offered as a sampling of services. In at least one example, the service provider 1512 can exchange data with the server computing device(s) 1510 associated with third-party service providers. Such third-party service providers can provide information that enables the service provider 1512 to provide services, such as those described above. In additional or alternative examples, such third-party service providers can access services of the service provider 1512. That is, in some examples, the third-party service providers can be subscribers, or otherwise access, services of the service provider 1512.

Techniques described herein can be configured to operate in both real-time/online and offline modes. "Online" modes refer to modes when devices are capable of communicating with the service provider 1512 (e.g., the server computing device(s) 1502) and/or the server computing device(s) 1510 via the network(s) 1504. In some examples, the merchant device(s) 1508 are not capable of connecting with the service provider 1512 (e.g., the server computing device(s) 1502) and/or the server computing device(s) 1510, due to a network connectivity issue, for example. In additional or alternative examples, the server computing device(s) 1502 are not capable of communicating with the server computing device(s) 1510 due to network connectivity issue, for example. In such examples, devices may operate in "offline" mode where at least some payment data is stored (e.g., on the merchant device(s) 1508) and/or the server computing device(s) 1502 until connectivity is restored and the payment data can be transmitted to the server computing device(s) 1502 and/or the server computing device(s) 1510 for processing.

Figure 16:
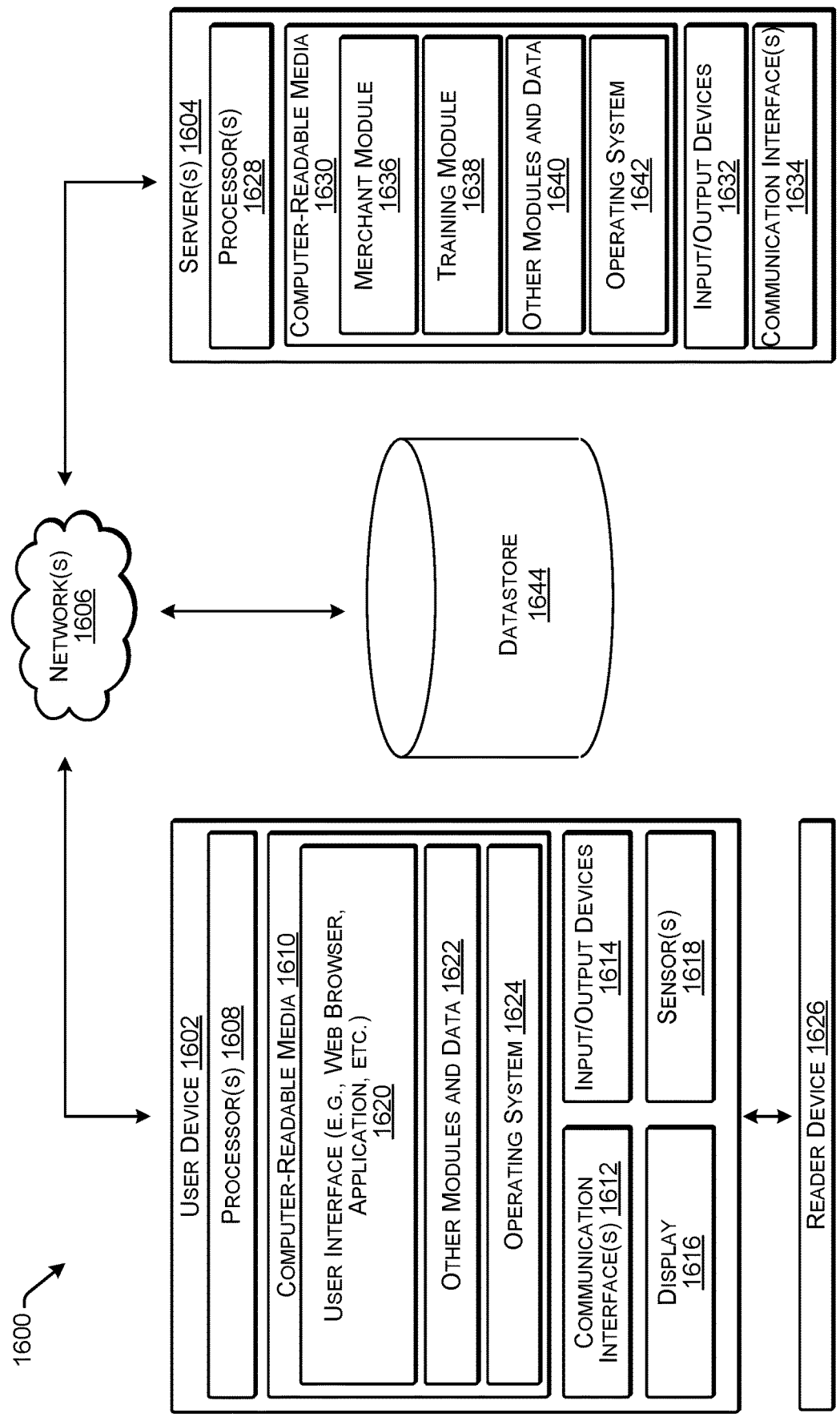
FIG. 16 depicts an illustrative block diagram illustrating a system for performing techniques described herein.

FIG. 16 depicts an illustrative block diagram illustrating a system 1600 for performing techniques described herein. The system 1600 includes a user device 1602, that communicates with server computing device(s) (e.g., server(s) 1604) via network(s) 1606 (e.g., the Internet, cable network(s), cellular network(s), cloud network(s), wireless network(s) (e.g., Wi-Fi) and wired network(s), as well as close-range communications such as Bluetooth®, Bluetooth® low energy (BLE), and the like). While a single user device 1602 is illustrated, in additional or alternate examples, the system 1600 can have multiple user devices, as described above with reference to FIG. 15.

In at least one example, the user device 1602 can be any suitable type of computing device, e.g., portable, semi-portable, semi-stationary, or stationary. Some examples of the user device 1602 can include, but are not limited to, a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. That is, the user device 1602 can be any computing device capable of sending communications and performing the functions according to the techniques described herein. The user device 1602 can include devices, e.g., payment card readers, or components capable of accepting payments, as described below.

In the illustrated example, the user device 1602 includes one or more processors 1608, one or more computer-readable media 1610, one or more communication interface(s) 1612, one or more input/output (I/O) devices 1614, a display 1616, and sensor(s) 1618.

In at least one example, each processor 1608 can itself comprise one or more processors or processing cores. For example, the processor(s) 1608 can be implemented as one or more microprocessors, microcomputers, microcontrollers, digital signal processors, central processing units, state machines, logic circuitries, and/or any devices that manipulate signals based on operational instructions. In some examples, the processor(s) 1608 can be one or more hardware processors and/or logic circuits of any suitable type specifically programmed or configured to execute the algorithms and processes described herein. The processor(s) 1608 can be configured to fetch and execute computer-readable processor-executable instructions stored in the computer-readable media 1610.

Depending on the configuration of the user device 1602, the computer-readable media 1610 can be an example of tangible non-transitory computer storage media and can include volatile and nonvolatile memory and/or removable and non-removable media implemented in any type of technology for storage of information such as computer-readable processor-executable instructions, data structures, program modules or other data. The computer-readable media 1610 can include, but is not limited to, RAM, ROM, EEPROM, flash memory, solid-state storage, magnetic disk storage, optical storage, and/or other computer-readable media technology. Further, in some examples, the user device 1602 can access external storage, such as RAID storage systems, storage arrays, network attached storage, storage area networks, cloud storage, or any other medium that can be used to store information and that can be accessed by the processor(s) 1608 directly or through another computing device or network. Accordingly, the computer-readable media 1610 can be computer storage media able to store instructions, modules or components that can be executed by the processor(s) 1608. Further, when mentioned, non-transitory computer-readable media exclude media such as energy, carrier signals, electromagnetic waves, and signals per se.

The computer-readable media 1610 can be used to store and maintain any number of functional components that are executable by the processor(s) 1608. In some implementations, these functional components comprise instructions or programs that are executable by the processor(s) 1608 and that, when executed, implement operational logic for performing the actions and services attributed above to the user device 1602. Functional components stored in the computer-readable media 1610 can include a user interface 1620 to enable users to interact with the user device 1602, and thus the server(s) 1604 and/or other networked devices. In at least one example, the user interface 1620 can be presented via a web browser, or the like. In other examples, the user interface 1620 can be presented via an application, such as a mobile application or desktop application, which can be provided by a service provider 1512 associated with the server(s) 1604, or which can be an otherwise dedicated application. In some examples, the user interface 1620 can be the buyer user interface 106 (e.g., if the user device 1602 is the buyer computing device 104). In other examples, the user interface 1620 can be the merchant user interface 114 (e.g., if the user device 1602 is the merchant computing device 112). In at least one example, a user can interact with the user interface via touch input, spoken input, gesture, or any other type of input. The word "input" is also used to describe "contextual" input that may not be directly provided by the user via the user interface 1620. For example, user's interactions with the user interface 1620 are analyzed using, e.g., natural language processing techniques, to determine context or intent of the user, which may be treated in a manner similar to "direct" user input.

Depending on the type of the user device 1602, the computer-readable media 1610 can also optionally include other functional components and data, such as other modules and data 1622, which can include programs, drivers, etc., and the data used or generated by the functional components. In addition, the computer-readable media 1610 can also store data, data structures and the like, that are used by the functional components. Further, the user device 1602 can include many other logical, programmatic and physical components, of which those described are merely examples that are related to the discussion herein.

In at least one example, the computer-readable media 1610 can include additional functional components, such as an operating system 1624 for controlling and managing various functions of the user device 1602 and for enabling basic user interactions.

The communication interface(s) 1612 can include one or more interfaces and hardware components for enabling communication with various other devices, such as over the network(s) 1606 or directly. For example, communication interface(s) 1612 can enable communication through one or more network(s) 1606, which can include, but are not limited any type of network known in the art, such as a local area network or a wide area network, such as the Internet, and can include a wireless network, such as a cellular network, a cloud network, a local wireless network, such as Wi-Fi and/or close-range wireless communications, such as Bluetooth®, BLE, NFC, RFID, a wired network, or any other such network, or any combination thereof. Accordingly, network(s) 1606 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

Embodiments of the disclosure may be provided to users through a cloud computing infrastructure. Cloud computing refers to the provision of scalable computing resources as a service over a network, to enable convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

The user device 1602 can further include one or more input/output (I/O) devices 1614. The I/O devices 1614 can include speakers, a microphone, a camera, and various user controls (e.g., buttons, a joystick, a keyboard, a keypad, etc.), a haptic output device, and so forth. The I/O devices 714 can also include attachments that leverage the accessories (audio-jack, USB-C, Bluetooth, etc.) to connect with the user device 702.

In at least one example, user device 1602 can include a display 1616. Depending on the type of computing device(s)

used as the user device 1602, the display 1616 can employ any suitable display technology. For example, the display 1616 can be a liquid crystal display, a plasma display, a light emitting diode display, an OLED (organic light-emitting diode) display, an electronic paper display, or any other suitable type of display able to present digital content thereon. In at least one example, the display 1616 can be an augmented reality display, a virtually reality display, or any other display able to present and/or project digital content. In some examples, the display 1616 can have a touch sensor associated with the display 1616 to provide a touchscreen display configured to receive touch inputs for enabling interaction with a graphic interface presented on the display 1616. Accordingly, implementations herein are not limited to any particular display technology. Alternatively, in some examples, the user device 1602 may not include the display 1616, and information can be presented by other means, such as aurally, haptically, etc.

In addition, the user device 1602 can include sensor(s) 1618. The sensor(s) 1618 can include a GPS device able to indicate location information. Further, the sensor(s) 1618 can include, but are not limited to, an accelerometer, gyroscope, compass, proximity sensor, camera, microphone, and/or a switch.

Additionally, the user device 1602 can include various other components that are not shown, examples of which include removable storage, a power source, such as a battery and power control unit, a barcode scanner, a printer, a cash drawer, and so forth.

In addition, in some examples, the user device 1602 can include, be connectable to, or otherwise be coupled to a reader device 1626, for reading payment instruments and/or identifiers associated with payment objects. In some examples, as described above, the reader device 1626 can plug in to a port in the user device 1602, such as a microphone/headphone port, a data port, or other suitable port. In additional or alternative examples, the reader device 1626 can be coupled to the user device 1602 via another wired or wireless connection, such as via a Bluetooth®, BLE, and so on. The reader device 1626 can include a read head for reading a magnetic strip of a payment card, and further can include encryption technology for encrypting the information read from the magnetic strip. Additionally or alternatively, the reader device 1626 can be an EMV payment reader, which in some examples, can be embedded in the user device 1602. Moreover, numerous other types of readers can be employed with the user device 1602 herein, depending on the type and configuration of the user device 1602.

The reader device 1626 may be a portable magnetic stripe card reader, optical scanner, smartcard (card with an embedded IC chip) reader (e.g., an EMV-compliant card reader or short-range communication-enabled reader), RFID reader, or the like, configured to detect and obtain data off any payment instrument. Accordingly, the reader device 1626 may include hardware implementation, such as slots, magnetic tracks, and rails with one or more sensors or electrical contacts to facilitate detection and acceptance of a payment instrument. That is, the reader device 1626 may include hardware implementations to enable the reader device 1626 to interact with a payment instrument via a swipe (i.e., a card-present transaction where a customer slides a card having a magnetic strip through a payment reader that captures payment data contained in the magnetic strip), a dip (i.e., a card-present transaction where a customer inserts a card having an embedded microchip (i.e., chip) into a payment reader first until the payment reader prompts the customer to remove the card), or a tap (i.e., a card-present transaction where a customer may tap or hover his or her electronic device such as a smart phone running a payment application over a payment reader to complete a transaction via short-range communication) to obtain payment data associated with a customer. Additionally or optionally, the reader device 1626 may also include a biometric sensor to receive and process biometric characteristics and process them as payment instruments, given that such biometric characteristics are registered with the payment service system 100 and connected to a financial account with a bank server.

The reader device 1626 may include processing unit(s), computer-readable media, a reader chip, a transaction chip, a timer, a clock, a network interface, a power supply, and so on. The processing unit(s) of the reader device 1626 may execute one or more modules and/or processes to cause the reader device 1626 to perform a variety of functions, as set forth above and explained in further detail in the following disclosure. In some examples, the processing unit(s) may include a central processing unit (CPU), a graphics processing unit (GPU), a CPU and a GPU, or processing units or components known in the art. Additionally, each of the processing unit(s) may possess its own local memory, which also may store program modules, program data, and/or one or more operating systems. Depending on the exact configuration and type of the reader device 1626, the computer-readable media may include volatile memory (such as RAM), non-volatile memory (such as ROM, flash memory, miniature hard drive, memory card, or the like), or some combination thereof. In at least one example, the computer-readable media of the reader device 1626 may include at least one module for performing various functions as described herein.

The reader chip may perform functionalities to control the operations and processing of the reader device 1626. That is, the reader chip may perform functionalities to control payment interfaces (e.g., a contactless interface, a contact interface, etc.), a wireless communication interface, a wired interface, a user interface (e.g., a signal condition device (FPGA)), etc. Additionally, the reader chip may perform functionality to control the timer, which may provide a timer signal indicating an amount of time that has lapsed following a particular event (e.g., an interaction, a power-down event, etc.). Moreover, the reader chip may perform functionality to control the clock 166, which may provide a clock signal indicating a time. Furthermore, the reader chip may perform functionality to control the network interface, which may interface with the network(s) 1606, as described below.

Additionally, the reader chip may perform functionality to control the power supply. The power supply may include one or more power supplies such as a physical connection to AC power or a battery. Power supply may include power conversion circuitry for converting AC power and generating a plurality of DC voltages for use by components of reader device 1626. When power supply includes a battery, the battery may be charged via a physical power connection, via inductive charging, or via any other suitable method.

The transaction chip may perform functionalities relating to processing of payment transactions, interfacing with payment instruments, cryptography, and other payment-specific functionality. That is, the transaction chip may access payment data associated with a payment instrument and may provide the payment data to a POS terminal, as described above. The payment data may include, but is not limited to, a name of the customer, an address of the customer, a type (e.g., credit, debit, etc.) of a payment instrument, a number associated with the payment instrument, a verification value (e.g., PIN Verification Key Indicator (PVKI), PIN Verification Value (PVV), Card Verification Value (CVV), Card Verification Code (CVC), etc.) associated with the payment instrument, an expiration data associated with the payment instrument, a primary account number (PAN) corresponding to the customer (which may or may not match the number associated with the payment instrument), restrictions on what types of charges/debts may be made, etc. Additionally, the transaction chip may encrypt the payment data upon receiving the payment data.

It should be understood that in some examples, the reader chip may have its own processing unit(s) and computer-readable media and/or the transaction chip may have its own processing unit(s) and computer-readable media. In other examples, the functionalities of reader chip and transaction chip may be embodied in a single chip or a plurality of chips, each including any suitable combination of processing units and computer-readable media to collectively perform the functionalities of reader chip and transaction chip as described herein.

While, the user device 1602, which can be a POS terminal, and the reader device 1626 are shown as separate devices, in additional or alternative examples, the user device 1602 and the reader device 1626 can be part of a single device, which may be a battery-operated device. In such an example, components of both the user device 1602 and the reader device 1626 may be associated with the single device. In some examples, the reader device 1626 can have a display integrated therewith, which can be in addition to (or as an alternative of) the display 1616 associated with the user device 1602.

The server(s) 1604 can include one or more servers or other types of computing devices that can be embodied in any number of ways. For example, in the example of a server, the modules, other functional components, and data can be implemented on a single server, a cluster of servers, a server farm or data center, a cloud-hosted computing service, a cloud-hosted storage service, and so forth, although other computer architectures can additionally or alternatively be used.

Further, while the figures illustrate the components and data of the server(s) 1604 as being present in a single location, these components and data can alternatively be distributed across different computing devices and different locations in any manner Consequently, the functions can be implemented by one or more server computing devices, with the various functionality described above distributed in various ways across the different computing devices. Multiple server(s) 1604 can be located together or separately, and organized, for example, as virtual servers, server banks and/or server farms. The described functionality can be provided by the servers of a single merchant or enterprise, or can be provided by the servers and/or services of multiple different customers or enterprises.

In the illustrated example, the server(s) 1604 can include one or more processors 1628, one or more computer-readable media 1630, one or more I/O devices 1632, and one or more communication interfaces 1634. Each processor 1628 can be a single processing unit or a number of processing units, and can include single or multiple computing units or multiple processing cores. The processor(s) 1628 can be implemented as one or more microprocessors, microcomputers, microcontrollers, digital signal processors, central processing units, state machines, logic circuitries, and/or any devices that manipulate signals based on operational instructions. For example, the processor(s) 1628 can be one or more hardware processors and/or logic circuits of any suitable type specifically programmed or configured to execute the algorithms and processes described herein. The processor(s) 1628 can be configured to fetch and execute computer-readable instructions stored in the computer-readable media 1630, which can program the processor(s) 1628 to perform the functions described herein.

The computer-readable media 1630 can include volatile and nonvolatile memory and/or removable and non-removable media implemented in any type of technology for storage of information, such as computer-readable instructions, data structures, program modules, or other data. Such computer-readable media 1630 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the server(s) 1604, the computer-readable media 1630 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 1630 can be used to store any number of functional components that are executable by the processor(s) 1628. In many implementations, these functional components comprise instructions or programs that are executable by the processors 1628 and that, when executed, specifically configure the one or more processors 1628 to perform the actions attributed above to the service provider 1512 and/or payment processing service. Functional components stored in the computer-readable media 1630 can optionally include a merchant module 1636, a training module 1638, and one or more other modules and data 1640.

The merchant module 1636 can be configured to receive transaction data from POS systems, such as the POS system 1524 described above with reference to FIG. 15. The merchant module 1636 can transmit requests (e.g., authorization, capture, settlement, etc.) to payment service server computing device(s) to facilitate POS transactions between merchants and customers. The merchant module 1636 can communicate the successes or failures of the POS transactions to the POS systems. In some examples, the payment processing module 128 and the merchant module 1636 can perform the same or similar functions.

The training module 1638 can be configured to train models using machine-learning mechanisms. For example, a machine-learning mechanism can analyze training data to train a data model that generates an output, which can be a recommendation, a score, and/or another indication. Machine-learning mechanisms can include, but are not limited to supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.), statistical models, etc. In at least one example, machine-trained data models can be stored in a datastore associated with the user device(s) 1602 and/or the server(s) 1604 for use at a time after the data models have been trained (e.g., at runtime).

The one or more other modules and data 1640 can include the lending module 120, the functionality of which is described, at least partially, above. Further, the one or more other modules and data 1640 can include programs, drivers, etc., and the data used or generated by the functional components. Further, the server(s) 1604 can include many other logical, programmatic and physical components, of which those described above are merely examples that are related to the discussion herein.

The one or more "modules" referenced herein may be implemented as more modules or as fewer modules, and functions described for the modules may be redistributed depending on the details of the implementation. The term "module," as used herein, refers broadly to software stored on non-transitory storage medium (e.g., volatile or non-volatile memory for a computing device), hardware, or firmware (or any combination thereof) modules. Modules are typically functional such that they that may generate useful data or other output using specified input(s). A module may or may not be self-contained. An application program (also called an "application") may include one or more modules, or a module may include one or more application programs that can be accessed over a network or downloaded as software onto a device (e.g., executable code causing the device to perform an action). An application program (also called an "application") may include one or more modules, or a module may include one or more application programs. In some examples, a module may include one or more application programming interfaces (APIs) to perform some or all of its functionality (e.g., operations). In additional and/or alternative examples, the module(s) may be implemented as computer-readable instructions, various data structures, and so forth via at least one processing unit to configure the computing device(s) described herein to execute instructions and to perform operations as described herein.

The computer-readable media 1630 can additionally include an operating system 1642 for controlling and managing various functions of the server(s) 1604.

The communication interface(s) 1634 can include one or more interfaces and hardware components for enabling communication with various other devices, such as over the network(s) 1606 or directly. For example, communication interface(s) 1634 can enable communication through one or more network(s) 1606, which can include, but are not limited any type of network known in the art, such as a local area network or a wide area network, such as the Internet, and can include a wireless network, such as a cellular network, a local wireless network, such as Wi-Fi and/or close-range wireless communications, such as Bluetooth®, BLE, NFC, RFID, a wired network, or any other such network, or any combination thereof. Accordingly, network (s) 1602 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

The server(s) 1604 can further be equipped with various I/O devices 1632. Such I/O devices 1632 can include a display, various user interface controls (e.g., buttons, joystick, keyboard, mouse, touch screen, biometric or sensory input devices, etc.), audio speakers, connection ports and so forth.

In at least one example, the system 1600 can include a datastore 1644 that can be configured to store data that is accessible, manageable, and updatable. In some examples, the datastore 1644 can be integrated with the user device 1602 and/or the server(s) 1604. In other examples, as shown in FIG. 16, the datastore 1644 can be located remotely from the server(s) 1604 and can be accessible to the server(s) 1604. The datastore 1644 can comprise multiple databases and/or servers connected locally and/or remotely via the network(s) 1606.

In at least one example, the datastore 1644 can store user profiles, which can include merchant profiles, customer profiles, and so on.

Merchant profiles can store, or otherwise be associated with, data associated with merchants. For instance, a merchant profile can store, or otherwise be associated with, information about a merchant (e.g., name of the merchant, geographic location of the merchant, operating hours of the merchant, employee information, etc.), a merchant category classification (MCC), item(s) offered for sale by the merchant, hardware (e.g., device type) used by the merchant, transaction data associated with the merchant (e.g., transactions conducted by the merchant, payment data associated with the transactions, items associated with the transactions, descriptions of items associated with the transactions, itemized and/or total spends of each of the transactions, parties to the transactions, dates, times, and/or locations associated with the transactions, etc.), loan information associated with the merchant (e.g., previous loans made to the merchant, previous defaults on said loans, etc.), risk information associated with the merchant (e.g., indications of risk, instances of fraud, chargebacks, etc.), appointments information (e.g., previous appointments, upcoming (scheduled) appointments, timing of appointments, lengths of appointments, etc.), payroll information (e.g., employees, payroll frequency, payroll amounts, etc.), employee information, reservations data (e.g., previous reservations, upcoming (scheduled) reservations, interactions associated with such reservations, etc.), inventory data, customer service data, etc. The merchant profile can securely store bank account information as provided by the merchant. Further, the merchant profile can store payment information associated with a payment instrument linked to a stored balance of the merchant, such as a stored balance maintained in a ledger by the service provider 1512.

Customer profiles can store customer data including, but not limited to, customer information (e.g., name, phone number, address, banking information, etc.), customer preferences (e.g., learned or customer-specified), purchase history data (e.g., identifying one or more items purchased (and respective item information), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, customer service data, etc.

In at least one example, the account(s) 118, described above with reference to FIG. 1, can include or be associated with the merchant profiles and/or customer profiles described above.

Furthermore, in at least one example, the datastore 1644 can store inventory database(s) and/or catalog database(s).

As described above, an inventory can store data associated with a quantity of each item that a merchant has available to the merchant. Furthermore, a catalog can store data associated with items that a merchant has available for acquisition. The datastore 1644 can store additional or alternative types of data as described herein.

The phrases "in some examples," "according to various examples," "in the examples shown," "in one example," "in other examples," "various examples," "some examples," and the like generally mean the particular feature, structure, or characteristic following the phrase is included in at least one example of the present invention, and may be included in more than one example of the present invention. In addition, such phrases do not necessarily refer to the same examples or to different examples.

If the specification states a component or feature "can," "may," "could," or "might" be included or have a characteristic, that particular component or feature is not required to be included or have the characteristic.

Further, the aforementioned description is directed to devices and applications that are related to payment technology. However, it will be understood, that the technology can be extended to any device and application. Moreover, techniques described herein can be configured to operate irrespective of the kind of payment object reader, POS terminal, web applications, mobile applications, POS topologies, payment cards, computer networks, and environments.

Various figures included herein are flowcharts showing example methods involving techniques as described herein. The methods illustrated are described with reference to FIGS. 1, 15, and 16 for convenience and ease of understanding. However, the methods illustrated are not limited to being performed using components described in FIGS. 1, 15, and 16, and such components are not limited to performing the methods illustrated herein.

Furthermore, the methods described above are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the methods can be combined in whole or in part with each other or with other methods.

Example Clauses

A. A computer-implemented method comprising: generating, based at least in part on information associated with a merchant or a buyer of the merchant and at a first time, a finance offer for purchase of an item from the merchant, wherein the finance offer is conditional on satisfaction of a down payment term of the finance offer; determining, at a second time, whether to modify the down payment term of the finance offer based at least in part on one or more signals received between the first time and the second time; determining whether the down payment term or the modified down payment term of the finance offer is satisfied; and finalizing the finance offer after the down payment term or the modified down payment term of the finance offer is satisfied, wherein finalizing the finance offer enables the buyer to purchase the item from the merchant using funds associated with the finance offer.

B. The computer-implemented method of paragraph A, wherein the finance offer is valid for a period of time and the finance offer is finalized only if the down payment terra or the modified down payment term of the finance offer is satisfied prior to lapse of the period of time.

C. The computer-implemented method of paragraph B, further comprising: sending, at a third time corresponding to a beginning of the period of time, an authorization request to authorize a payment instrument of the buyer for an amount of the down payment or the modified down payment; determining, at a fourth time after the third time and within the period of time, that the finance offer has not been finalized and authorization of the payment instrument has expired or is going to expire; and sending, at a fifth time and prior to expiration of the period of time, a new authorization request to authorize the payment instrument for the amount of the down payment or the modified down payment.

D. The computer-implemented method of paragraph C, wherein an amount of time between the third time and the fourth time is determined by a machine-trained data model based at least in part on a characteristic of the merchant, the buyer, or the payment instrument.

E. The computer-implemented method of any of paragraphs A-D, wherein modifying the down payment term of the finance offer comprises varying an amount of the down payment, replacing the down payment term with another terra that secures the finance offer, or eliminating the down payment term.

F. A system comprising: one or more processors; and one or more computer-readable media storing instructions, that when executed, cause the one or more processors to perform acts comprising: generating, at a first time, a finance offer for purchase of an item from a merchant, wherein the finance offer is conditional on satisfaction of a term of the finance offer; determining, at a second time, whether to modify the term of the finance offer; determining whether the term or the modified term of the finance offer is satisfied; and finalizing the finance offer after the term or the modified term of the finance offer is satisfied, wherein finalizing the finance offer enables a buyer to purchase the item from the merchant using funds associated with the finance offer.

G. The system of paragraph F, the operations further comprising: receiving, from a device operable by the buyer, a request for a loan to enable the buyer to purchase the item from the merchant; and generating the finance offer responsive to receiving the request.

H. The system of paragraph G, wherein the request is received at a point-of-sale (POS) of the item, prior to the POS of the item, or after the POS of the item.

I. The system of any of paragraphs F-H, the operations further comprising: determining a level of risk associated with the buyer; and generating the finance offer based at least in part on the level of risk, wherein the term is based at least in part on the level of risk associated with the buyer.

J. The system of any of paragraphs F-I, wherein the term is based on a cost of the item.

K. The system of any of paragraphs F-J, wherein the term is a down payment term, the finance offer is valid for a period of time, and the finance offer is finalized only if the down payment term or the modified down payment term of the finance offer is satisfied prior to lapse of the period of time.

L. The system of paragraph K, the operations further comprising: sending, at a third time corresponding to a beginning of the period of time, an authorization request to authorize a payment instrument of the buyer for an amount of the down payment or the modified down payment; determining, at a fourth time after the third time and within the period of time, that the finance offer has not been finalized and authorization of the payment instrument has expired or is going to expire; and sending, at a fifth time and prior to expiration of the period of time, a new authorization request to authorize the payment instrument for the amount of the down payment or the modified down payment.

M. The system of any of paragraphs F-L, wherein the term is a verification e requiring the buyer to answer a question or verify their identity via another user.

N. The system of any of paragraphs F-M, the operations further comprising determining whether to modify the term based at least in part on one or more signals received between the first time and the second time.

O. The system of paragraph K, wherein the one or more signals comprise a time delay between the first time and the second time, a change to a credit score of the buyer, modified transaction history of the buyer, an addition of a bank account to an account of the buyer, a change to inventory of the merchant, a change to a location of the merchant, or a change to a cost of the item.

P. A computer-implemented method comprising: generating, at a first time, a finance offer for purchase of an item from a merchant, wherein the finance offer is conditional on satisfaction of a term of the finance offer; determining, at a second time, whether to modify the term of the finance offer; determining whether the term or the modified term of the finance offer is satisfied; and finalizing the finance offer after the term or the modified term of the finance offer is satisfied, wherein finalizing the finance offer enables a buyer to purchase the item from the merchant using funds associated with the finance offer.

Q. The computer-implemented method of paragraph P, the operations further comprising: receiving, from a device operable by the buyer, a request for a loan to enable the buyer to purchase the item from the merchant, wherein the request is received at a point-of-sale (POS) of the item, prior to the POS of the item, or after the POS of the item; and generating the finance offer responsive to receiving the request.

R. The computer-implemented method of paragraph P or Q, wherein: the term is a down payment term that is based on a cost of the item; and the finance offer is valid for a period of time and the finance offer is finalized only if the down payment term or the modified down payment term of the finance offer is satisfied prior to lapse of the period of time.

S. The computer-implemented method of any of paragraphs P-R, wherein: the term is a verification term requiring the buyer to answer a question or verify their identity via another user; and the finance offer is valid for a period of time and the finance offer is finalized only if the verification term is satisfied prior to lapse of the period of time.

T. The computer-implemented method of any of paragraphs P-S, the operations further comprising determining whether to modify the term based at least in part on one or more signals received between the first time and the second time.

U. A computer-implemented method comprising: generating, based at least in part on information associated with a merchant or a buyer of the merchant, a finance offer for purchase of an item from the merchant, wherein the finance offer is conditional on satisfaction of a down payment term of the finance offer; receiving, from the buyer, payment information associated with a source of funds for satisfying the down payment term of the finance offer; finalizing the finance offer based at least in part on a determination that the down payment term has been satisfied, wherein finalizing the finance offer causes a loan to be generated and the loan is associated with a balance; withdrawing, from the source of funds, an amount of a payment of the loan; and reducing the balance associated with the loan based at least in part on the payment.

V. The computer-implemented method of paragraph U, wherein the finance offer is valid for a period of time and the finance offer is finalized based at least in part on the payment information associated with the source of funds satisfying the down payment term prior to lapse of the period of time.

W. The computer-implemented method of paragraph V, further comprising: sending, at a first time corresponding to a beginning of the period of time, an authorization request to authorize the payment information for the amount of the down payment; determining, at a second time after the first time and within the period of time, that the finance offer has not been finalized and authorization of the payment instrument has expired or is going to expire; and sending, at a third time and prior to expiration of the period of time, a new authorization request to authorize the payment information for the amount of the down payment.

X. The computer-implemented method of paragraph W, wherein an amount of time between the first time and the second time is determined by a machine-trained data model based at least in part on a characteristic of the merchant, the buyer, or the source of funds.

Y. The computer-implemented method of any of paragraphs U-X, further comprising: determining whether to modify the down payment term of the finance offer, wherein modifying the down payment term of the finance offer comprises increasing an amount of the down payment, decreasing the amount of the down payment, or eliminating the down payment term; determining whether the down payment term or the modified down payment term of the finance offer is satisfied; and finalizing the finance offer after the down payment term or the modified down payment term of the finance offer is satisfied.

Z. A computer-implemented method comprising: generating a finance offer for purchase of an item from a merchant, wherein the finance offer is conditional on satisfaction of a down payment term of the finance offer; receiving, from a buyer, payment information associated with a source of funds for satisfying the down payment term of the finance offer; and finalizing the finance offer based at least in part on a determination that the down payment term has been satisfied, wherein finalizing the finance offer causes a loan to be generated and the loan is associated with a balance, and wherein the payment information, and the source of funds, is involved with at least one other event associated with the finance offer or the loan.

AA. The computer-implemented method as paragraph Z recites, wherein the balance amounts to the lesser of (i) a cost of the item or (ii) an amount for which the buyer was originally approved, and any fees associated with the loan, less an amount of the down payment.

AB. The computer-implemented method as paragraph Z or AA recites, further comprising: withdrawing, from the source of funds, an amount of a payment of the loan; and reducing the balance associated with the loan based at least in part on the payment.

AC. The computer-implemented method of any of paragraphs Z-AB, further comprising: prior to finalizing the finance offer, determining whether to modify the down payment term of the finance offer, wherein modifying the down payment term of the finance offer comprises increasing an amount of the down payment, decreasing the amount of the down payment, or eliminating the down payment term; determining whether the down payment term or the modified down payment term of the finance offer is satisfied; and finalizing the finance offer after the down payment term or the modified down payment term of the finance offer is satisfied AD. The computer-implemented method of any of paragraphs Z-AC, further comprising: receiving, from a device operable by the buyer, a request for a loan to enable the buyer to purchase the item from the merchant, wherein the request is received at a point-of-sale (POS) of the item, prior to the POS of the item, or after the POS of the item; and generating the finance offer responsive to receiving the request.

AE. The computer-implemented method of any of paragraphs Z-AD, further comprising: determining a level of risk associated with the buyer; and generating the finance offer based at least in part on the level of risk, wherein the down payment term is based at least in part on the level of risk associated with the buyer.

AF. The computer-implemented method of any of paragraphs Z-AE, wherein the down payment term is based on a cost of the item.

AG. The computer-implemented method of any of paragraphs Z-AF, wherein the payment information is associated with a debit card.

AH. The computer-implemented method of any of paragraphs Z-AG, wherein the source of funds is a stored balance of the buyer that is maintained by a service provider that provides at least financing services for managing finance offers and loans.

AI. A system comprising: one or more processors; and one or more computer-readable medium storing instructions that, when executed by the one or more processors, cause the one or more processors to perform acts comprising: generating a finance offer for purchase of an item from a merchant, wherein the finance offer is conditional on satisfaction of a down payment term of the finance offer; receiving, from a buyer, payment information associated with a source of funds for satisfying the down payment term of the finance offer; and finalizing the finance offer based at least in part on a determination that the down payment term has been satisfied, wherein finalizing the finance offer causes a loan to be generated and the loan is associated with a balance, and wherein the payment information, and the source of funds, is involved with at least one other event associated with the finance offer or the loan.

AJ. The system as paragraph AI recites, wherein the balance amounts to a cost of the item and any fees associated with the loan, less an amount of the down payment, and the operations further comprise: withdrawing, from the source of funds, an amount of a payment of the loan; and reducing the balance associated with the loan based at least in part on the payment.

AK. The system of paragraph AI or AJ, the operations further comprising: receiving, from a device operable by the buyer, a request for a loan to enable the buyer to purchase the item from the merchant, wherein the request is received at a point-of-sale (POS) of the item, prior to the POS of the item, or after the POS of the item; and generating the finance offer responsive to receiving the request.

AL. The system of any of paragraphs AI-AK, wherein the down payment term is based at least in part on one or more characteristics of at least one of the buyer, the merchant, or the item.

AM. The system of any of paragraphs AI-AL, wherein the source of funds is a bank account of the buyer or a stored balance of the buyer that is maintained by a service provider that provides at least financing services for managing finance offers and loans.

AN. The system of any of paragraphs AI-AM, wherein the finance offer is valid for a period of time and the finance offer is finalized based at least in part on the payment information associated with the source of funds satisfying the down payment term prior to lapse of the period of time.

AO. A computer-implemented method comprising: determining, based at east in part on information associated with a customer and at a first time that the customer is approved for a financing offer to purchase an item from a merchant, wherein the financing offer includes a down payment term based on cost of the item; receiving, from the customer, a payment instrument to be associated with the down payment term of the loan; sending an authorization request to an issuer server associated with the payment instrument, wherein the authorization request causes the merchant to hold funds corresponding to the down payment term for an authorization time period, and wherein the authorization time period is computed based on analysis of prior requests associated with the merchant and other merchants; receiving, from the issuer server, an indication that the authorization request is successful; associating an active state to the authorization request with validity maintained by the authorization time period; prior to the lapse of the authorization time period, determining whether the customer has initiated purchase of the item; based on the determination that the authorization time period will lapse and the determination that the customer is yet to purchase the item, sending another authorization request to the issuer server without customer intervention/using card on file such that state of the authorization request stays active; receiving, from the device at a second time later than the first time and within the authorization time period, an indication that the customer has purchased the item; and initiating capture of the funds corresponding to the down payment term from the associated payment instrument.

While the example clauses described above are described with respect to one particular implementation, it should be understood that, in the context of this document, the content of the example clauses can also be implemented via a method, device, system, a computer-readable medium, and/or another implementation.

What is claimed is:

1. A system comprising:
one or more computing devices associated with a payment service and configured by executable instructions to perform operations including:
providing an application for installation on a user device of a user of the payment service, wherein the user device is associated with a user profile stored in a datastore associated with the payment service;
receiving transaction data associated with transactions of the user by a first graphical user interface (GUI) configured to receive input from the user associated with a transaction, wherein the first GUI includes features that dynamically update based on the user profile;
receiving, via the first GUI overlaid on a user interface presented by the application, a first request to finance the transaction for the user;
determining, based at least in part on the transaction data, customized terms associated with financing the transaction for the user, wherein at least one customized term indicates a down payment to be received to satisfy the at least one customized term prior to the user receiving the financing;
notifying the user of the at least one customized term via a second GUI overlaid on the user interface, wherein the second GUI is configured to receive data associated with the down payment and securely transmit payment information to the payment service;
identifying a locked state associated with an instrument, wherein the locked state indicates an availability of the instrument, wherein the instrument is associated with the transaction, and wherein access to funds associated with the financing is linked to the instrument;
presenting, by the application and through the user interface, a digital card associated with the instrument, and wherein the digital card presented through the user interface is associated with an identifier that is temporarily withheld from presentation to the user through the user interface while the instrument is in the locked state and until the instrument enters an unlocked state;
receiving an indication that the at least one customized term has been satisfied;
upon receiving the indication, automatically causing the instrument to be reconfigured from the locked state to the unlocked state, wherein the unlocked state indicates that the instrument is usable for at least the transaction and that the funds associated with the financing are accessible via the instrument;
temporarily maintaining the instrument in the unlocked state for a duration of time and until a conclusion of the duration of time, wherein the duration of time is based on the customized terms, and wherein the conclusion of the duration of time causes the instrument to automatically revert from the unlocked state to the locked state;
updating, by the application, the digital card associated with the instrument at least in part by presenting the identifier through the user interface at least while the instrument is in the unlocked state;
causing transmission of the identifier to a merchant, wherein the merchant is associated with a merchant profile stored in the datastore;
receiving a second request associated with the transaction, wherein the second request includes payment data associated with the instrument;
issuing, in response to the second request, the financing via the instrument in association with the transaction;
generating a customized repayment schedule based on the second request and in accordance with the customized terms;
associating the customized repayment schedule with the user profile of the user device of the user; and
facilitating one or more payments according to the customized repayment schedule.

2. The system of claim 1, wherein the user interface presented by the application on the user device is configured to receive payment information of the user for use in satisfying the down payment.

3. The system of claim 1, wherein the user interface presented by the application on the user device further includes a third GUI for searching for one or more merchants for conducting the transaction and for which the financing is available.

4. The system of claim 3, the operations further comprising:
receiving, via the third GUI, a search query requesting a search for the one or more merchants offering an item and for which financing is available;
inputting, to a machine-trained data model, information related to the search query and the user to determine the one or more merchants relevant to the user based on the search query; and
sending a query result to the user device to cause the application to present, in the user interface on the user device, an indication of the one or more merchants determined by the machine-trained data model to be relevant to the user.

5. The system of claim 1, wherein determining, based at least in part on the transaction data, the customized terms associated with financing the transaction for the user comprises:
determining one or more characteristics of the user based on the transaction data; and
determining an amount of the down payment based at least on the one or more characteristics and an amount associated with the transaction.

6. A method implemented at least in part by a computing device of a payment service, the method comprising:
providing an application for installation on a user device of a user of the payment service, wherein the user device is associated with a user profile stored in a datastore associated with the payment service;
receiving transaction data associated with transactions of the user by a first graphical user interface (GUI) configured to receive input from the user associated with a transaction, wherein the first GUI includes features that dynamically update based on the user profile;
receiving, via the first GUI overlaid on a user interface presented by the application, a first request to finance the transaction for the user;
determining, based at least in part on the transaction data, customized terms associated with financing the transaction for the user, wherein at least one customized term indicates a down payment to be received to satisfy the at least one customized term prior to the user receiving the financing;

notifying the user of the at least one customized term via a second GUI overlaid on the user interface, wherein the second GUI is configured to receive data associated with the down payment and securely transmit payment information to the payment service;

identifying a locked state associated with an instrument, wherein the locked state indicates an availability of the instrument, wherein the instrument is associated with the transaction, and wherein access to funds associated with the financing is linked to the instrument;

presenting, by the application and through the user interface, a digital card associated with the instrument, and wherein the digital card presented through the user interface is associated with an identifier that is temporarily withheld from presentation to the user through the user interface while the instrument is in the locked state and until the instrument enters an unlocked state;

receiving an indication that the at least one customized term has been satisfied;

upon receiving the indication, automatically causing the instrument to be reconfigured from the locked state to the unlocked state, wherein the unlocked state indicates that the instrument is usable for at least the transaction and that the funds associated with the financing are accessible via the instrument;

temporarily maintaining the instrument in the unlocked state for a duration of time and until a conclusion of the duration of time, wherein the duration of time is based on the customized terms, and wherein the conclusion of the duration of time causes the instrument to automatically revert from the unlocked state to the locked state;

updating, by the application, the digital card associated with the instrument at least in part by presenting the identifier through the user interface at least while the instrument is in the unlocked state;

causing transmission of the identifier to a merchant, wherein the merchant is associated with a merchant profile stored in the datastore;

receiving a second request associated with the transaction, wherein the second request includes payment data associated with the instrument;

issuing, in response to the second request, the financing via the instrument in association with the transaction;

generating a customized repayment schedule based on the second request and in accordance with the customized terms;

associating the customized repayment schedule with the user profile of the user device of the user; and facilitating one or more payments according to the customized repayment schedule.

7. The method of claim 6, wherein the user interface presented by the application on the user device is configured to receive payment information of the user for use in satisfying the down payment.

8. The method of claim 6, wherein the user interface presented by the application on the user device further includes a third GUI for searching for one or more merchants for conducting the transaction and for which the financing is available.

9. The method of claim 8, further comprising:
receiving, via the third GUI, a search query requesting a search for the one or more merchants offering an item and for which financing is available;
inputting, to a machine-trained data model, information related to the search query and the user to determine the one or more merchants relevant to the user based on the search query; and sending a query result to the user device to cause the application to present, in the user interface on the user device, an indication of the one or more merchants determined by the machine-trained data model to be relevant to the user.

10. The method of claim 6, wherein determining, based at least in part on the transaction data, the customized terms associated with financing the transaction for the user comprises:
determining one or more characteristics of the user based on the transaction data; and
determining an amount of the down payment based at least on the one or more characteristics and an amount associated with the transaction.

11. One or more non-transitory computer-readable media storing instructions executable by a computing device associated with a payment service to cause the computing device to perform operations comprising:
providing an application for installation on a user device of a user of the payment service, wherein the user device is associated with a user profile stored in a datastore associated with the payment service;
receiving transaction data associated with transactions of the user by a first graphical user interface (GUI) configured to receive input from the user associated with a transaction, wherein the first GUI includes features that dynamically update based on the user profile;
receiving, via the first GUI overlaid on a user interface presented by the application, a first request to finance the transaction for the user;
determining, based at least in part on the transaction data, customized terms associated with financing the transaction for the user, wherein at least one customized term indicates a down payment to be received to satisfy the at least one customized term prior to the user receiving the financing;
notifying the user of the at least one customized term via a second GUI overlaid on the user interface, wherein the second GUI is configured to receive data associated with the down payment and securely transmit payment information to the payment service;
identifying a locked state associated with an instrument, wherein the locked state indicates an availability of the instrument, wherein the instrument is associated with the transaction, and wherein access to funds associated with the financing is linked to the instrument;
presenting, by the application and through the user interface, a digital card associated with the instrument, and wherein the digital card presented through the user interface is associated with an identifier that is temporarily withheld from presentation to the user through the user interface while the instrument is in the locked state and until the instrument enters an unlocked state;
receiving an indication that the at least one customized term has been satisfied;
upon receiving the indication, automatically causing the instrument to be reconfigured from the locked state to the unlocked state, wherein the unlocked state indicates that the instrument is usable for at least the transaction and that the funds associated with the financing are accessible via the instrument;
temporarily maintaining the instrument in the unlocked state for a duration of time and until a conclusion of the duration of time, wherein the duration of time is based on the customized terms, and wherein the conclusion of the duration of time causes the instrument to automatically revert from the unlocked state to the locked state;

updating, by the application, the digital card associated with the instrument at least in part by presenting the identifier through the user interface at least while the instrument is in the unlocked state;

causing transmission of the identifier to a merchant, wherein the merchant is associated with a merchant profile stored in the datastore;

receiving a second request associated with the transaction, wherein the second request includes payment data associated with the instrument;

issuing, in response to the second request, the financing via the instrument in association with the transaction;

generating a customized repayment schedule based on the second request and in accordance with the customized terms;

associating the customized repayment schedule with a user account of the user device of the user; and facilitating one or more payments according to the customized repayment schedule.

12. The one or more non-transitory computer-readable media of claim 11, wherein the user interface presented by the application on the user device is configured to receive payment information of the user for use in satisfying the down payment.

13. The one or more non-transitory computer-readable media of claim 11, wherein the user interface presented by the application on the user device further includes a third GUI for searching for one or more merchants for conducting the transaction and for which the financing is available.

14. The one or more non-transitory computer-readable media of claim 13, the operations further comprising:

receiving, via the third GUI, a search query requesting a search for the one or more merchants offering an item and for which financing is available;

inputting, to a machine-trained data model, information related to the search query and the user to determine the one or more merchants relevant to the user based on the search query; and sending a query result to the user device to cause the application to present, in the user interface on the user device, an indication of the one or more merchants determined by the machine-trained data model to be relevant to the user.

15. The system of claim 1, wherein the second GUI is at least one of the first GUI or a modified variant of the first GUI.

16. The method of claim 6, wherein the second GUI is at least one of the first GUI or a modified variant of the first GUI.

17. The one or more non-transitory computer-readable media of claim 11, wherein the second GUI is at least one of the first GUI or a modified variant of the first GUI.

* * * * *